United States Patent
Baloga

(10) Patent No.: US 11,443,254 B1
(45) Date of Patent: Sep. 13, 2022

(54) EMISSIVE SHAPES AND CONTROL SYSTEMS

(71) Applicant: Steelcase Inc., Grand Rapids, MI (US)

(72) Inventor: Mark A. Baloga, East Grand Rapids, MI (US)

(73) Assignee: Steelcase Inc., Grand Rapids, MI (US)

( * ) Notice: Subject to any disclaimer, the term of this patent is extended or adjusted under 35 U.S.C. 154(b) by 0 days.

(21) Appl. No.: 17/191,416

(22) Filed: Mar. 3, 2021

Related U.S. Application Data

(63) Continuation of application No. 14/995,367, filed on Jan. 14, 2016, now Pat. No. 10,977,588, which is a
(Continued)

(51) Int. Cl.
*G06Q 10/06* (2012.01)
*H04L 67/50* (2022.01)
(Continued)

(52) U.S. Cl.
CPC ...... *G06Q 10/06311* (2013.01); *A47B 21/007* (2013.01); *A47B 83/001* (2013.01); *G06V 40/70* (2022.01); *H04L 63/102* (2013.01); *H04L 67/22* (2013.01); *A47B 2021/0076* (2013.01); *A47B 2083/006* (2013.01)

(58) Field of Classification Search
CPC ............... A47B 21/007; A47B 83/001; A47B 2021/0076; A47B 2083/006
See application file for complete search history.

(56) References Cited

U.S. PATENT DOCUMENTS

| 3,514,871 A | 6/1970 | Tucker |
| 4,740,779 A | 4/1988 | Cleary et al. |

(Continued)

FOREIGN PATENT DOCUMENTS

| AU | 2011101160 B4 | 10/2011 |
| CA | 2806804 A1 | 8/2013 |

(Continued)

OTHER PUBLICATIONS

Beaudouin-Lafon, et al., Multisurface Interaction in the WILD Room, IEEE Computer, IEEE, 2012, Special Issue on Interaction Beyond the Keyboard, 45(4):48-56.
(Continued)

*Primary Examiner* — Evan P Dzierzynski
(74) *Attorney, Agent, or Firm* — Quarles & Brady LLP

(57) ABSTRACT

An apparatus for sharing information in a space comprising a first two dimensional outer emissive surface, a first two dimensional inner emissive surface, a support structure resting on and extending upward from the support floor, the support structure supporting the first outer emissive surface with a first outer surface bottom edge at a work surface height, a first outer surface top edge at a ridge height above the work surface height and supporting the first inner emissive surface with a first inner surface bottom edge at a valley height below the work surface height, a first inner surface top edge at a height above the work surface height, the first inner emissive surface spaced behind the first outer emissive surface by at least twelve inches to form a space between the first outer emissive surface and the first inner emissive surfaces.

21 Claims, 45 Drawing Sheets

Related U.S. Application Data continuation of application No. 14/159,589, filed on Jan. 21, 2014, now Pat. No. 9,261,262.

(60) Provisional application No. 61/756,753, filed on Jan. 25, 2013.

(51) Int. Cl.
| | | |
|---|---|---|
| *A47B 83/00* | (2006.01) | |
| *H04L 9/40* | (2022.01) | |
| *A47B 21/007* | (2006.01) | |
| *G06V 40/70* | (2022.01) | |

(56) References Cited

U.S. PATENT DOCUMENTS

| | | | |
|---|---|---|---|
| 4,838,177 A * | 6/1989 | Vander Park | A47B 21/06 108/50.02 |
| 4,920,458 A | 4/1990 | Jones | |
| 5,340,978 A | 8/1994 | Rostoker et al. | |
| 5,732,227 A | 3/1998 | Kuzunuki et al. | |
| 6,540,094 B1 | 4/2003 | Baloga et al. | |
| 6,813,074 B2 | 11/2004 | Starkweather | |
| 7,068,254 B2 | 6/2006 | Yamazaki et al. | |
| 7,095,387 B2 | 8/2006 | Lee et al. | |
| 7,136,282 B1 | 11/2006 | Rebeske | |
| 7,161,590 B2 | 1/2007 | Daniels | |
| 7,166,029 B2 | 1/2007 | Enzminger | |
| 7,198,393 B2 | 4/2007 | Tubidis et al. | |
| 7,274,413 B1 | 9/2007 | Sullivan et al. | |
| 7,352,340 B2 | 4/2008 | Utt et al. | |
| 7,368,307 B2 | 5/2008 | Cok | |
| 7,463,238 B2 | 12/2008 | Funkhouser et al. | |
| 7,492,577 B2 | 2/2009 | Tomizuka et al. | |
| 7,509,588 B2 | 3/2009 | Van Os et al. | |
| 7,535,468 B2 | 5/2009 | Uy | |
| 7,583,252 B2 | 9/2009 | Kurtenbach et al. | |
| 7,667,891 B2 | 2/2010 | Cok et al. | |
| 7,785,190 B2 | 8/2010 | Aida | |
| 7,821,510 B2 | 10/2010 | Aksemit et al. | |
| 7,847,912 B2 | 12/2010 | Nishizawa et al. | |
| 7,884,823 B2 | 2/2011 | Bertolami et al. | |
| 7,889,425 B1 | 2/2011 | Connor | |
| 7,922,267 B2 | 4/2011 | Gevaert | |
| 7,957,061 B1 | 6/2011 | Connor | |
| 8,009,412 B2 | 8/2011 | Chen | |
| 8,018,579 B1 | 9/2011 | Krah | |
| 8,046,701 B2 | 10/2011 | Chiu et al. | |
| 8,072,437 B2 | 12/2011 | Miller et al. | |
| 8,077,235 B2 | 12/2011 | Street | |
| 8,125,461 B2 | 2/2012 | Weber et al. | |
| 8,190,908 B2 | 5/2012 | Jazayeri et al. | |
| 8,191,001 B2 | 5/2012 | Van Wie et al. | |
| 8,199,471 B2 | 6/2012 | Bemelmans et al. | |
| 8,217,869 B2 | 7/2012 | Weisberg et al. | |
| 8,340,268 B2 | 12/2012 | Knaz | |
| 8,396,923 B2 | 3/2013 | Salesky et al. | |
| 8,433,759 B2 | 4/2013 | Styles et al. | |
| 8,464,184 B1 | 6/2013 | Cook et al. | |
| 8,600,084 B1 | 12/2013 | Garrett | |
| 8,682,973 B2 | 3/2014 | Kikin-Gil et al. | |
| 8,825,121 B2 | 9/2014 | Aoki et al. | |
| 8,902,184 B2 | 12/2014 | Rydenhag et al. | |
| 8,947,488 B2 | 2/2015 | Han et al. | |
| 8,965,975 B2 | 2/2015 | Salesky et al. | |
| 9,070,229 B2 | 6/2015 | Williamson et al. | |
| 9,104,302 B2 | 8/2015 | Chai et al. | |
| 9,161,166 B2 | 10/2015 | Johansson et al. | |
| 9,207,833 B2 | 12/2015 | Doray et al. | |
| 9,253,270 B2 | 2/2016 | Bharshankar et al. | |
| 9,261,262 B1 | 2/2016 | Baloga | |
| 9,759,420 B1 | 9/2017 | Baloga | |
| 9,804,731 B1 | 10/2017 | Baloga | |
| 10,754,491 B1 | 8/2020 | Baloga | |
| 2003/0054800 A1 | 3/2003 | Miyashita | |
| 2003/0088570 A1 | 5/2003 | Hilbert et al. | |
| 2003/0134488 A1 | 7/2003 | Yamazaki et al. | |
| 2003/0223113 A1 | 12/2003 | Starkweather | |
| 2003/0227441 A1 | 12/2003 | Hioki et al. | |
| 2004/0135160 A1 | 7/2004 | Cok | |
| 2004/0201628 A1 | 10/2004 | Johanson et al. | |
| 2005/0030255 A1 | 2/2005 | Chiu et al. | |
| 2005/0091359 A1 | 4/2005 | Soin et al. | |
| 2005/0126446 A1 * | 6/2005 | Nobles | A47C 7/72 108/27 |
| 2005/0188314 A1 | 8/2005 | Matthews et al. | |
| 2006/0220981 A1 | 10/2006 | Murai et al. | |
| 2006/0238494 A1 | 10/2006 | Narayanaswami et al. | |
| 2007/0002130 A1 | 1/2007 | Hartkop | |
| 2007/0069975 A1 | 3/2007 | Gettemy et al. | |
| 2007/0150842 A1 | 6/2007 | Chaudhri et al. | |
| 2007/0157089 A1 | 7/2007 | Van Os et al. | |
| 2007/0220794 A1 | 9/2007 | Pitcher et al. | |
| 2008/0068566 A1 | 3/2008 | Denoue et al. | |
| 2008/0158171 A1 | 7/2008 | Wong et al. | |
| 2008/0291225 A1 | 11/2008 | Arneson | |
| 2009/0076920 A1 | 3/2009 | Feldman et al. | |
| 2009/0096965 A1 | 4/2009 | Nagata | |
| 2009/0124062 A1 | 5/2009 | Yamazaki et al. | |
| 2009/0132925 A1 | 5/2009 | Koehler et al. | |
| 2009/0149249 A1 | 6/2009 | Sum | |
| 2009/0219247 A1 | 9/2009 | Watanabe et al. | |
| 2009/0254843 A1 | 10/2009 | Van Wie et al. | |
| 2009/0271848 A1 | 10/2009 | Leung et al. | |
| 2009/0285131 A1 | 11/2009 | Knaz | |
| 2010/0020026 A1 | 1/2010 | Benko et al. | |
| 2010/0023895 A1 | 1/2010 | Benko et al. | |
| 2010/0053173 A1 | 3/2010 | Cohen et al. | |
| 2010/0085382 A1 | 4/2010 | Lundqvist et al. | |
| 2010/0148647 A1 | 6/2010 | Burgess et al. | |
| 2010/0169791 A1 | 7/2010 | Pering et al. | |
| 2010/0182518 A1 | 7/2010 | Kirmse et al. | |
| 2010/0302130 A1 | 12/2010 | Kikuchi et al. | |
| 2010/0302454 A1 | 12/2010 | Epstein et al. | |
| 2010/0318921 A1 | 12/2010 | Trachtenberg et al. | |
| 2011/0043479 A1 | 2/2011 | van Aerle et al. | |
| 2011/0095974 A1 | 4/2011 | Moriwaki | |
| 2011/0096138 A1 | 4/2011 | Grimshaw | |
| 2011/0102539 A1 | 5/2011 | Ferren | |
| 2011/0183722 A1 | 7/2011 | Vartanian | |
| 2011/0298689 A1 | 12/2011 | Bhomer et al. | |
| 2012/0004030 A1 | 1/2012 | Kelly et al. | |
| 2012/0013539 A1 | 1/2012 | Hogan et al. | |
| 2012/0030567 A1 | 2/2012 | Victor | |
| 2012/0050075 A1 | 3/2012 | Salmon | |
| 2012/0066602 A1 | 3/2012 | Chai et al. | |
| 2012/0102111 A1 | 4/2012 | Salesky et al. | |
| 2012/0133728 A1 | 5/2012 | Lee | |
| 2012/0162351 A1 | 6/2012 | Feldman et al. | |
| 2012/0176465 A1 | 7/2012 | Triplett et al. | |
| 2012/0216129 A1 | 8/2012 | Ng et al. | |
| 2012/0242571 A1 | 9/2012 | Takamura et al. | |
| 2013/0019195 A1 | 1/2013 | Gates | |
| 2013/0091205 A1 | 4/2013 | Kotler et al. | |
| 2013/0091440 A1 | 4/2013 | Kotler et al. | |
| 2013/0103446 A1 | 4/2013 | Bragdon et al. | |
| 2013/0120912 A1 | 5/2013 | Ladouceur et al. | |
| 2013/0125016 A1 | 5/2013 | Pallakoff et al. | |
| 2013/0159917 A1 | 6/2013 | Loebach | |
| 2013/0169687 A1 | 7/2013 | Williamson et al. | |
| 2013/0185666 A1 | 7/2013 | Kenna, III et al. | |
| 2013/0194238 A1 | 8/2013 | Sakai | |
| 2013/0222266 A1 | 8/2013 | Gardenfors et al. | |
| 2013/0226444 A1 | 8/2013 | Johansson et al. | |
| 2013/0227433 A1 | 8/2013 | Doray et al. | |
| 2013/0227478 A1 | 8/2013 | Rydenhag et al. | |
| 2013/0232440 A1 | 9/2013 | Brown et al. | |
| 2013/0246529 A1 | 9/2013 | Salesky et al. | |
| 2013/0249815 A1 | 9/2013 | Dolan et al. | |
| 2013/0275883 A1 | 10/2013 | Bharshankar et al. | |
| 2013/0288603 A1 | 10/2013 | Iwasaki | |
| 2014/0029190 A1 | 1/2014 | Sato et al. | |

(56) References Cited

U.S. PATENT DOCUMENTS

| | | | |
|---|---|---|---|
| 2014/0226275 A1 | 8/2014 | Ko et al. | |
| 2015/0103133 A1* | 4/2015 | Epstein | H04N 7/147 348/14.07 |
| 2017/0224102 A1* | 8/2017 | Randolph | A47B 9/12 |

FOREIGN PATENT DOCUMENTS

| | | | |
|---|---|---|---|
| CN | 202602701 U | 12/2012 | |
| CN | 202773002 U | 3/2013 | |
| EP | 1659487 A2 | 5/2006 | |
| EP | 1986087 A2 | 10/2008 | |
| EP | 1780584 B1 | 7/2009 | |
| EP | 2400764 A2 | 12/2011 | |
| EP | 2444882 A1 | 4/2012 | |
| EP | 2464082 A1 | 6/2012 | |
| EP | 2632187 A1 | 8/2013 | |
| EP | 2665296 A2 | 11/2013 | |
| EP | 2680551 A1 | 1/2014 | |
| WO | 0243386 A1 | 5/2002 | |
| WO | 2004075169 A2 | 9/2004 | |
| WO | 2006048189 A1 | 5/2006 | |
| WO | 2007143297 A2 | 12/2007 | |
| WO | 2008022464 A1 | 2/2008 | |
| WO | 2008036931 A3 | 3/2008 | |
| WO | 2008043182 A1 | 4/2008 | |
| WO | 2010017039 A2 | 2/2010 | |
| WO | 2010033036 A1 | 3/2010 | |
| WO | 2011005318 A2 | 1/2011 | |
| WO | 2011041427 A2 | 4/2011 | |
| WO | 2011084245 A2 | 7/2011 | |
| WO | 2011133590 A1 | 10/2011 | |
| WO | 2011149560 A1 | 12/2011 | |
| WO | 2012015625 A2 | 2/2012 | |
| WO | 2012036389 A3 | 3/2012 | |
| WO | 2012037523 A1 | 3/2012 | |
| WO | 2012048007 A2 | 4/2012 | |
| WO | 2012100001 A1 | 7/2012 | |
| WO | 2012116464 A1 | 9/2012 | |
| WO | 2012162411 A1 | 11/2012 | |
| WO | 2013009092 A2 | 1/2013 | |
| WO | 2013021385 A2 | 2/2013 | |
| WO | 2013023183 A1 | 2/2013 | |
| WO | 2013029162 A1 | 3/2013 | |
| WO | 2013074102 A1 | 5/2013 | |
| WO | 2013124530 A1 | 8/2013 | |
| WO | 2013154827 A1 | 10/2013 | |
| WO | 2013154829 A1 | 10/2013 | |
| WO | 2013154831 A1 | 10/2013 | |
| WO | 2013156092 A1 | 10/2013 | |

OTHER PUBLICATIONS

Karma Laboratory, The Petri Dish: Pretty Lights, http://karma-laboratory.com/petridish/2004/11/pretty_lights.html, Nov. 20, 2004, 2 pages.

Takanashi, et al., Human-Computer Interaction Technology Using Image Projection and Gesture-Based Input, NEC Technical Journal, 2013, 7(3):122-126.

Weiss, et al., BendDesk: Dragging Across the Curve, ITS 2010: Displays, Nov. 7-10, 2010, Saarbrucken, Germany, Copyright 2010 ACM, pp. 1-10.

* cited by examiner

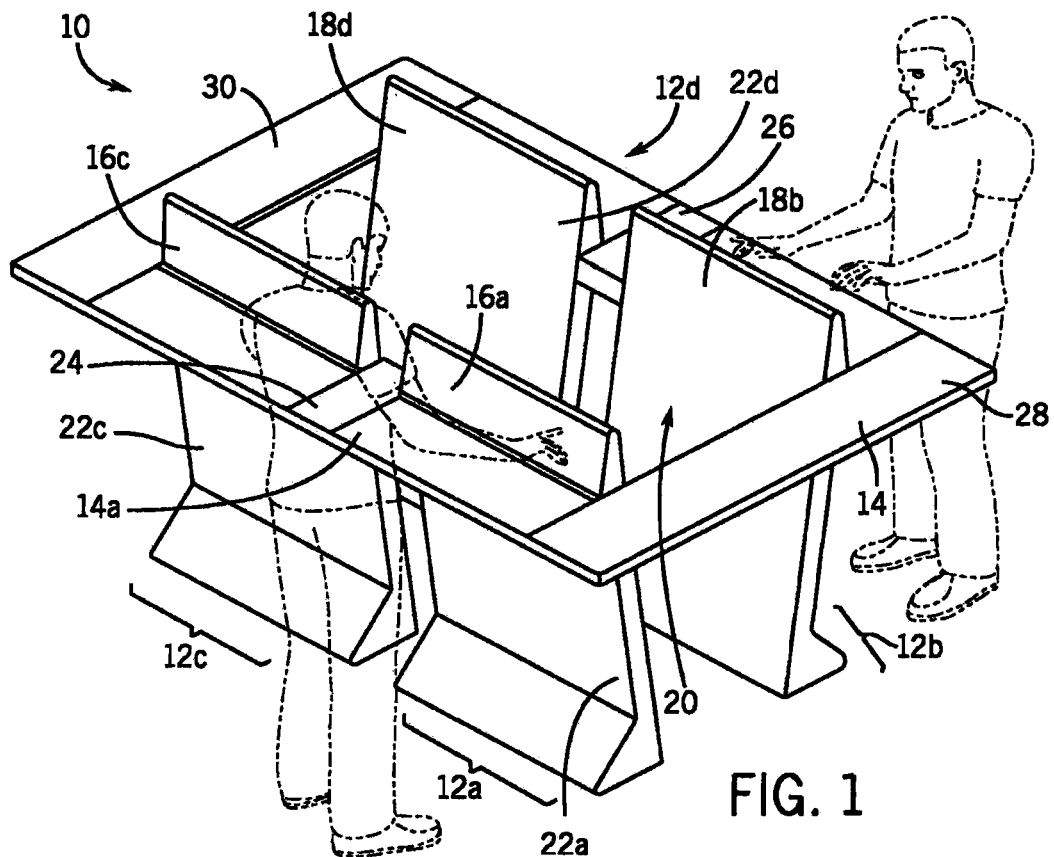
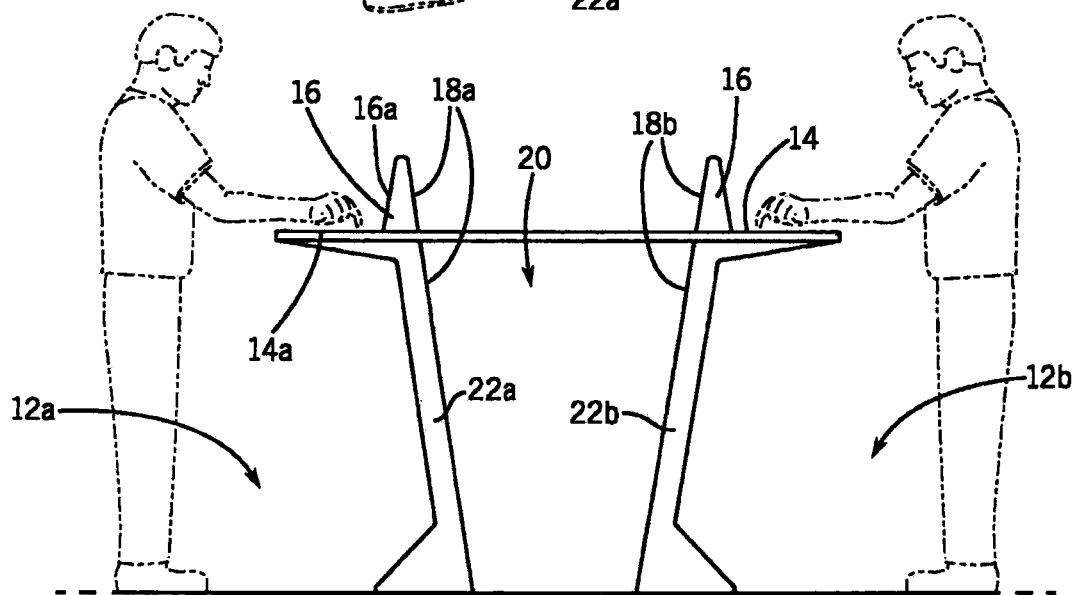

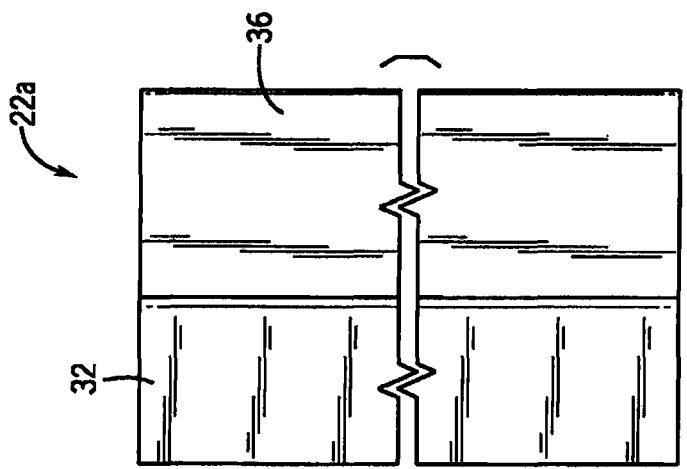
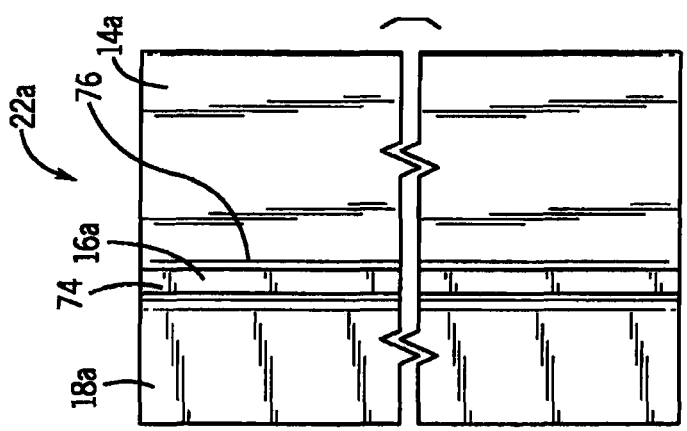

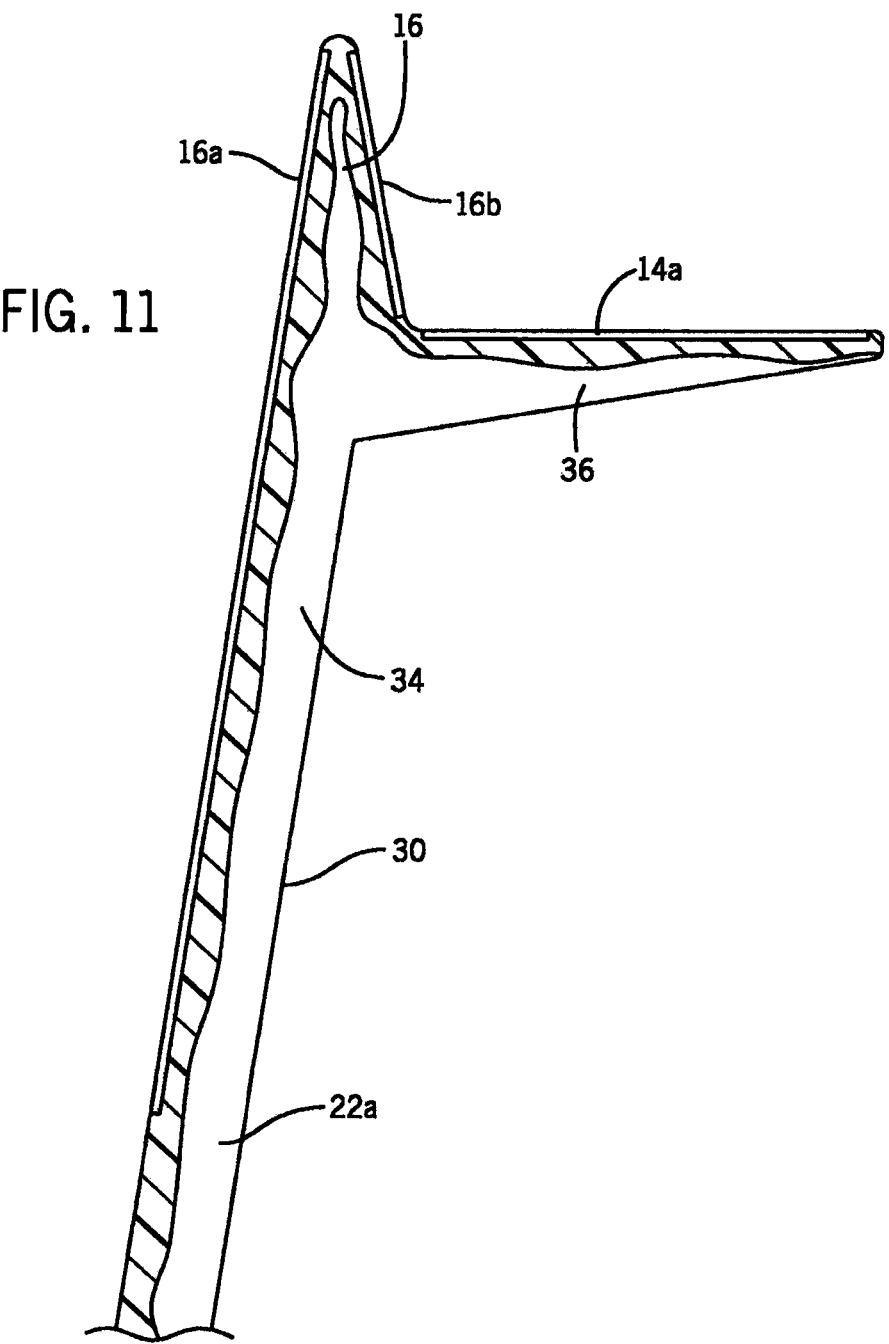

EMISSIVE SHAPES AND CONTROL SYSTEMS

CROSS-REFERENCE TO RELATED APPLICATIONS

This application is a continuation of U.S. patent application Ser. No. 14/995,367 filed Jan. 14, 2016 which is a continuation of U.S. patent application Ser. No. 14/159,589 filed on Jan. 21, 2014, and claims priority to provisional U.S. patent application No. 61/756,753 filed on Jan. 25, 2013, each of which are hereby incorporated by reference in their entireties.

STATEMENT REGARDING FEDERALLY SPONSORED RESEARCH OR DEVELOPMENT

Not applicable.

BACKGROUND OF THE INVENTION

The present invention relates to shaped emissive surfaces and more specifically to emissive shapes configured to support several persons working together to share information in a dyadic or multi-person environment as well as to systems that support ubiquitous information and virtual desktop access.

Many high tech and service sector jobs require employees to work in many different environments including individually at personal work stations, in a collaborative setting with other employees and sometimes customers or clients and remotely in airports, at client locations, at employer locations distant from an employee's work station, etc. Many of these jobs require employees to access, manipulate and share electronically stored information regardless of employee location. To access and share information, employees often use some type of computing device as an interface and information sharing device. Thus, for instance, when an employee is located at a work station at a company headquarters, the employee may use a computing device to access and manipulate computer applications, documents, CAD drawings, etc., for various purposes. Often in these cases an employee works at an assigned and non-portable work station. Because these stations are not intended to be portable, these stations often have relatively large and heavy displays that provide large emissive surfaces for presenting user content.

When the employee is located in an airport and traveling to visit a client, the employee may use a portable computing device to access and manipulate applications and other content. When the employee is located in a conference room at a client site, the employee may use a computing device to access and share information with the client.

The most common way to provide employees with ubiquitous access to and ability to manipulate and share information has been to provide portable personal computing devices to each employee. For instance, a laptop, pad computing device, smart phone, etc., is often provided to each company employee enabling the employee to access information at a personal work station, remotely or in a shared collaboration space.

Because portable personal computing devices often have relatively small display screens, it is common to provide additional relatively stationary peripheral input and output devices for use in combination with the portable devices. For instance, many work stations are equipped with one or more stationary relatively large display screens that can be linked to a personal computing device so that an employee can view and manipulate content in several different computer applications at the same time. As another instance, many shared collaboration spaces are equipped with a projector and large screen or a large flat panel display adjacent a conference table where a personal computing device can be linked to the projector or display to share information with a group of employees in the shared space.

A laptop computer is generally larger than other personal computing devices and therefore is more difficult to transport. Nevertheless, there are several advantages to the laptop form factor that make the laptop the personal computing device of choice for many employees in many industries. In this regard, most laptops include both a display screen and a mechanical keyboard that is particularly useful for entering text information into a computing device. In addition, while other personal computing devices include displays, the display on a typical laptop is large enough for a user to interact generally effectively with at least one application at a time. Moreover, people generally like to read from surfaces that are at least somewhat vertically oriented (as opposed to on a horizontal surface). A laptop computer typically includes a display supported at an adjustable display angle so that the angle of the display surface can be oriented at any desired angle. Furthermore, laptop displays offer at least some privacy for information displayed thereon (i.e., persons across from or to the side of a laptop user around a conference table cannot easily see information presented on the laptop display) which makes the laptop advantageous in a shared collaboration space. In addition, while providing at least some privacy for information displayed, the top edge of a laptop display is low enough that most users can peer over the top edge thereof to make or maintain eye contact with conferees across a conference table which facilitates better communication.

Because of the advantages of the laptop form factor, many peripherals for these devices have been developed that can be combined with the smaller devices so that the combinations have form factors more like traditional laptops. For instance, hundreds of products now exist for holding a pad type display screen at a somewhat vertical angle for reading purposes. As another instance there are hundreds of different types of mechanical keyboards on the market that link with pad type devices to aid text entry.

While laptops and combinations of relatively large peripheral display screens have worked well in the past, this solution to facilitating ubiquitous acces to information has several shortcomings. First, this solution requires employees to transport computing devices. While small devices are relatively simple to transport, they do not provide the advantages associated with the laptop form factor discussed above. Laptops are relatively large and burdensome to carry.

Second, portable personal computing devices can be damaged or destroyed if dropped during transport or if exposed to liquids (e.g., a cup of coffee is spilled on the device). Similarly, portable devices can be lost. These devices are often expensive to replace and it can take several days to replace or repair a damaged device or to replace a lost device which can adversely affect employee productivity.

Third, portable personal computing devices can be stolen. In at least some operating states, confidential personal and company information may be accessible via a stolen portable device.

Fourth, while typical laptop display screens are large enough to adequately interact with at least one application, the screens are often too small to provide optimal screen space to support all applications and supporting on screen tools that most employees would like to access at one time. Thus, when an employee uses a laptop to work remotely or to work in a shared collaboration space, the personal and somewhat private screen space provided by the laptop display makes individual work difficult at best.

Fifth, while employees can move between personal work station spaces and shared collaboration spaces to optimally facilitate individual activities and shared collaborative activities using large peripheral displays, it is believed that in at least some cases the best working environment is one where employees have the option, within a single setting, to work individually with optimized tools for individual work and to work with others in a sharing fashion, again with optimized tools for sharing information and collaborating. To this end, instead of working individually for 7 hours in personal work station spaces and then having a one hour collaboration session in a shared collaboration space, in at least some cases it will be better for employees to work together, on and off, during an entire work day period, where conferees can share ideas and information immediately and personally as the ideas are formed and the information comes to light, aided and effectively encouraged by the tools provided within the space.

Sixth, where personal work stations are separate from shared collaboration spaces, the costs associated with the space including tools and square footage increase appreciably.

BRIEF SUMMARY OF THE INVENTION

It has been recognized that technologies have been developed that enable many different emissive shapes in addition to flat panel shapes to be configured. It has also been recognized that emissive surfaces can be formed into different shapes and that certain shapes have particular advantages related to supporting collaborative activities among groups of people. In short, while current technology makes it possible to design many different emissive shapes, certain shapes are particularly important in facilitating collaborative activities.

It has also been recognized that we are at the point with computer and communication network infrastructures at which people can travel without personal computing devices or in the alternative with relatively small personal computing devices and still be able to have a full complement of personal content delivered in many locations either via storage on their personal devices or via a network connection to a server that stores the personal content. Emissive surfaces located at various locations can provide windows into a user's personal content (e.g., access to a user's work station applications, files, documents, etc. This disclosure describes certain emissive surface shapes and surface juxtapositions that invite users to access their personal content and that encourage sharing of content during group activities.

Consistent with at least some aspects of the present disclosure, many embodiments described herein include several emissive surfaces arranged in several different planes that can be used to generate a work station for a user to use to access the user's personal content. In many cases the surfaces that comprise a work station include a horizontal emissive surface having front and rear edges, a ridge emissive surface that slopes upward from a bottom edge adjacent the rear edge of the horizontal surface to a top edge above the horizontal surface and a valley emissive surface that is spaced behind and separated from the ridge emissive surface. In many cases two stations are constructed in an intertwined fashion where the valley surface for a second station slopes downward from a top edge adjacent the top edge of the ridge surface of a first station to a bottom edge and the valley surface of the first station slopes downward from a top edge adjacent the top edge of a ridge surface of the second station to a bottom edge so that the first and second station valley surfaces face each other. Here, when users of the first and second stations intend to share content, one of the user's can drive both valley surfaces so that both users have a view of the same content via the valley surfaces. When a user wants to use a station to facilitate individual activities, the user can simply use all surfaces associated with the user's station to access and control personal content without sharing.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL
VIEWS OF THE DRAWINGS

FIG. 1 is a perspective view of a furniture assembly that is consistent with at least some aspects of the present disclosure;

FIG. 2 is a side plan view of the assembly shown in FIG. 1;

Figure 3:
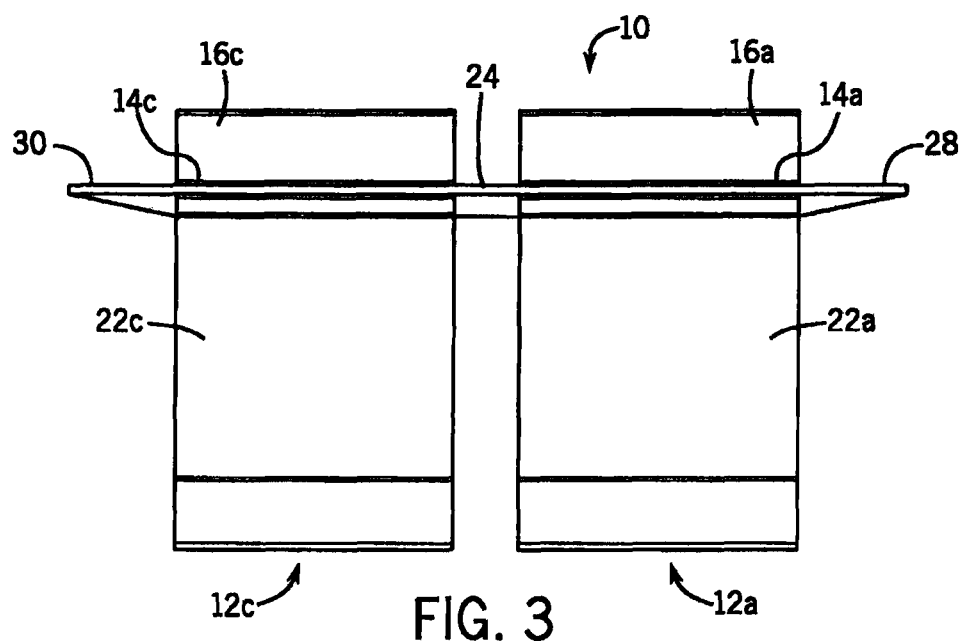
FIG. 3 is a front perspective view of the assembly shown in FIG. 1.
Figure 4:
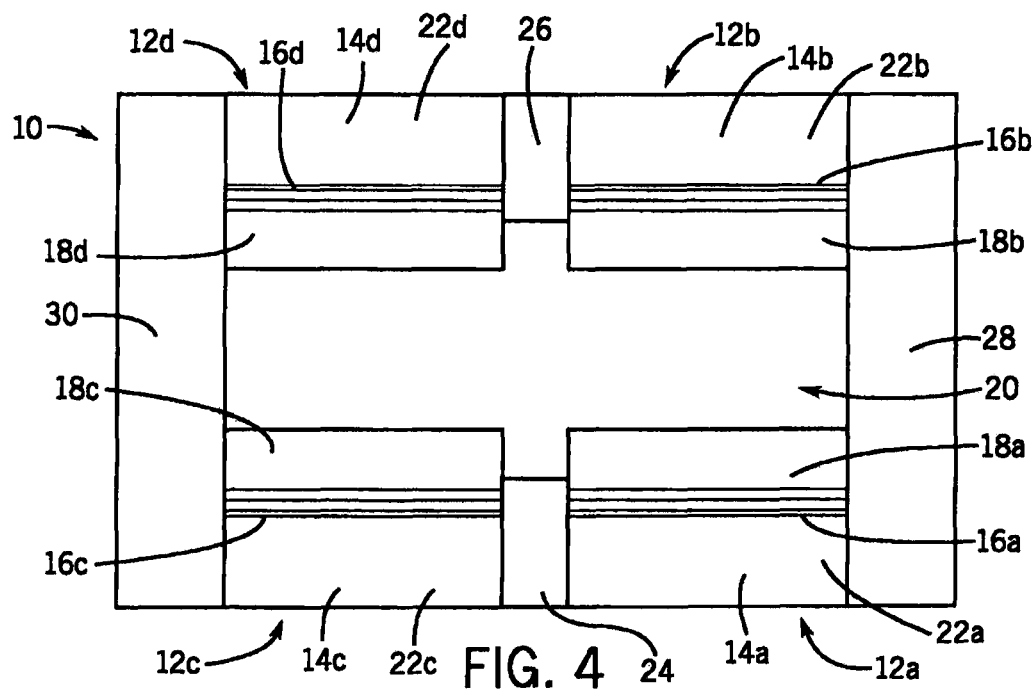
FIG. 4 is a top plan view of the assembly shown in FIG. 1
Figure 6:
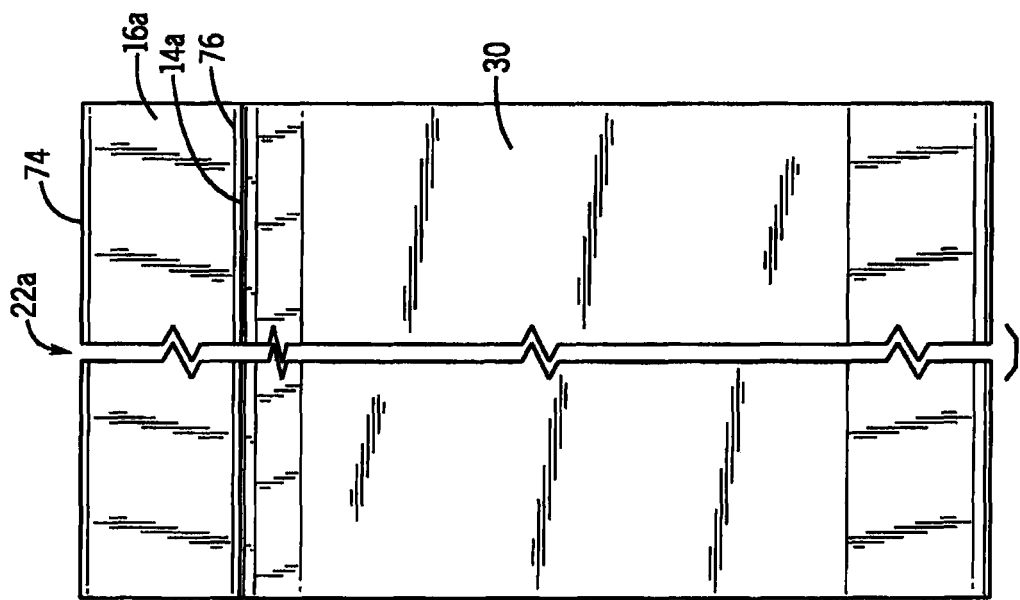
FIG. 6 is a front plan view the subassembly of FIG. 5.
Figure 5:
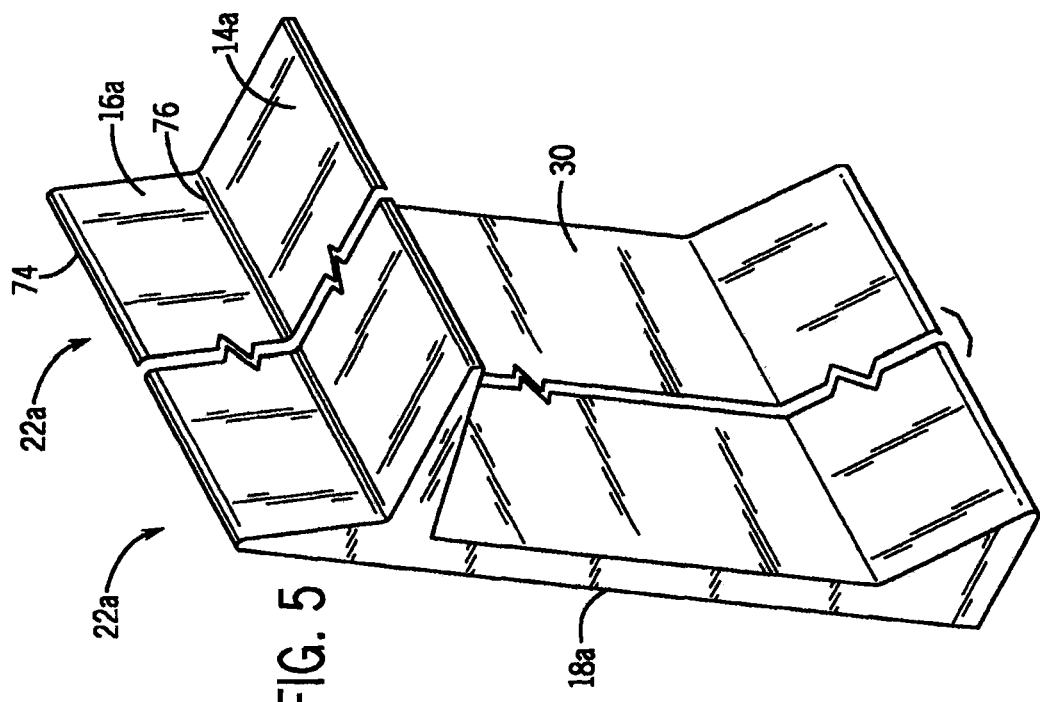
FIG. 5 is a perspective view of one of the work station subassemblies that forms the assembly shown in FIG. 1.
Figure 8:
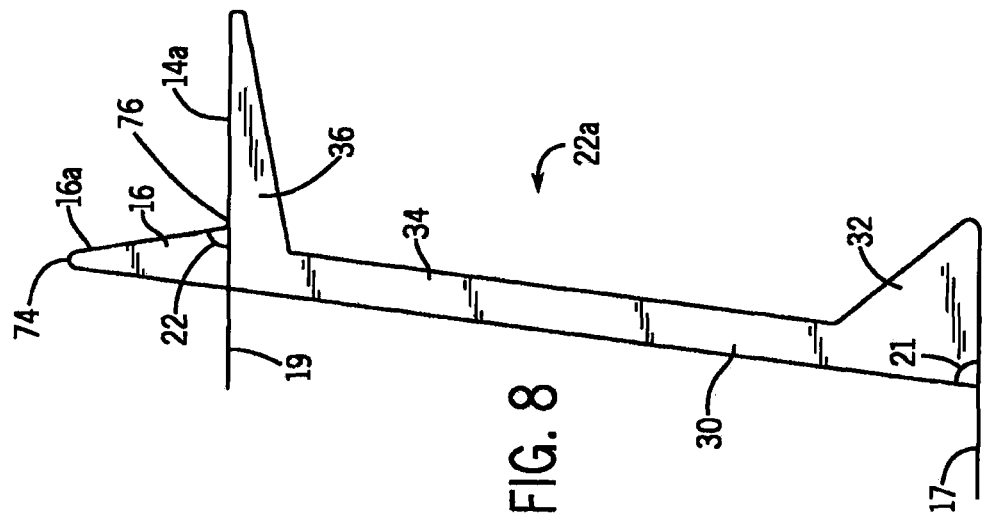
Figure 7:
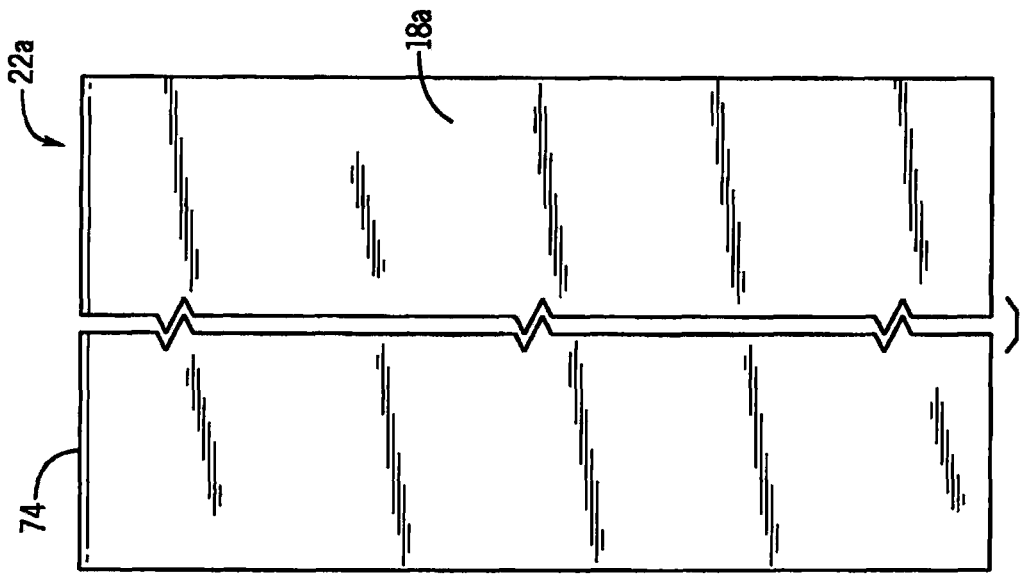
Figure 12:
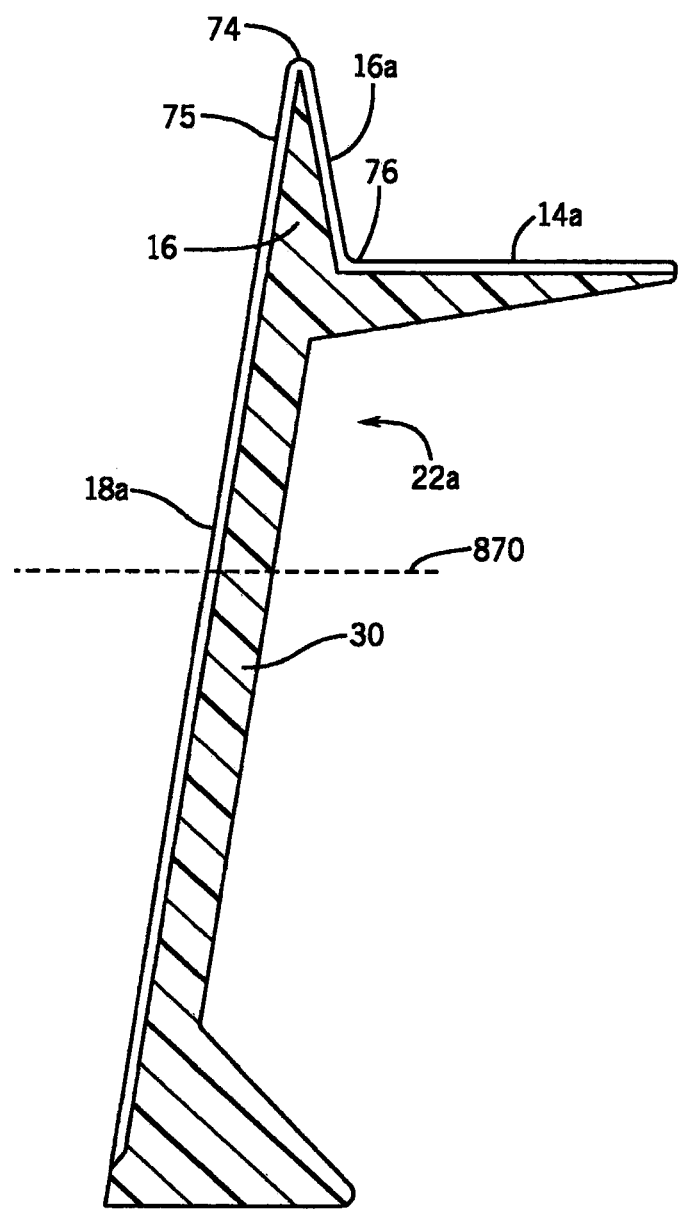
Figure 13:
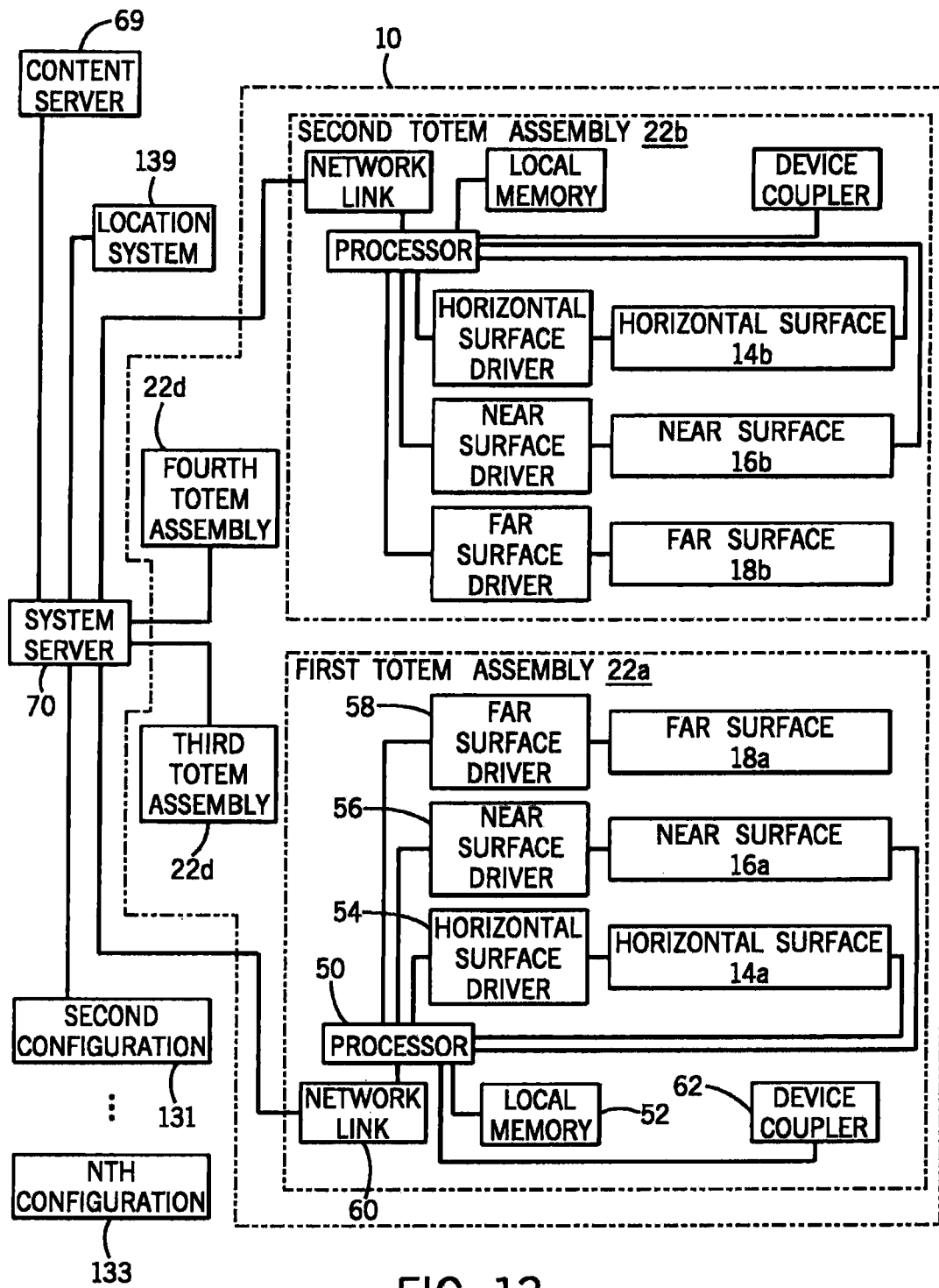
Figure 14:
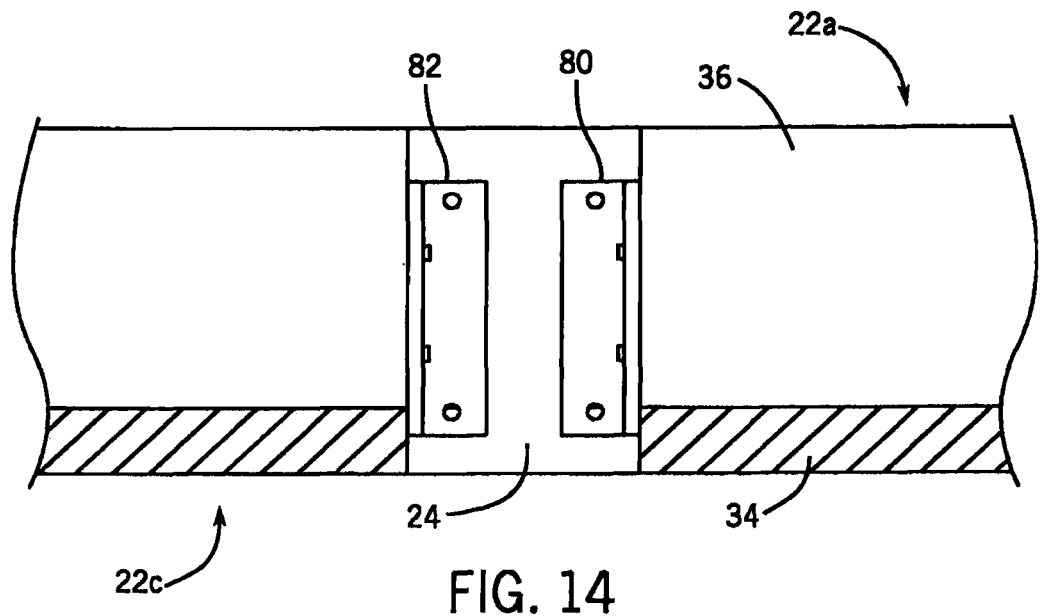
Figure 15:
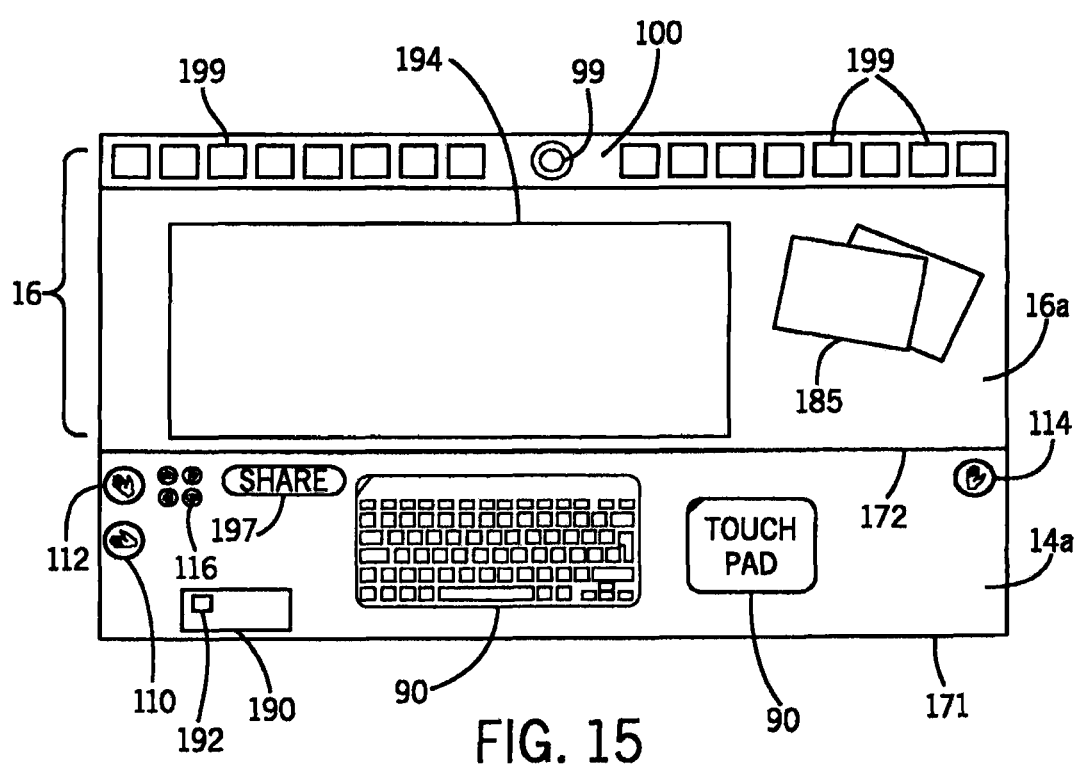
Figure 16:
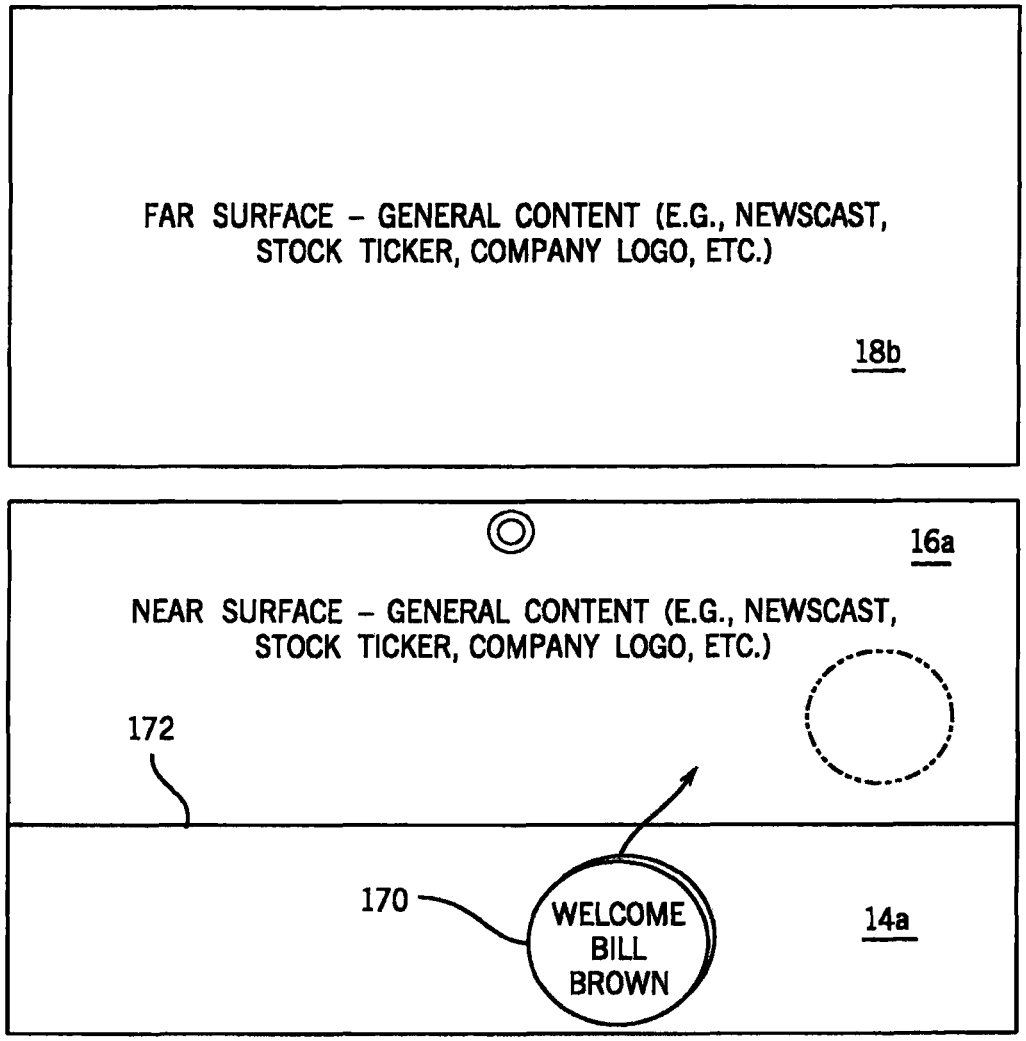
Figure 17:
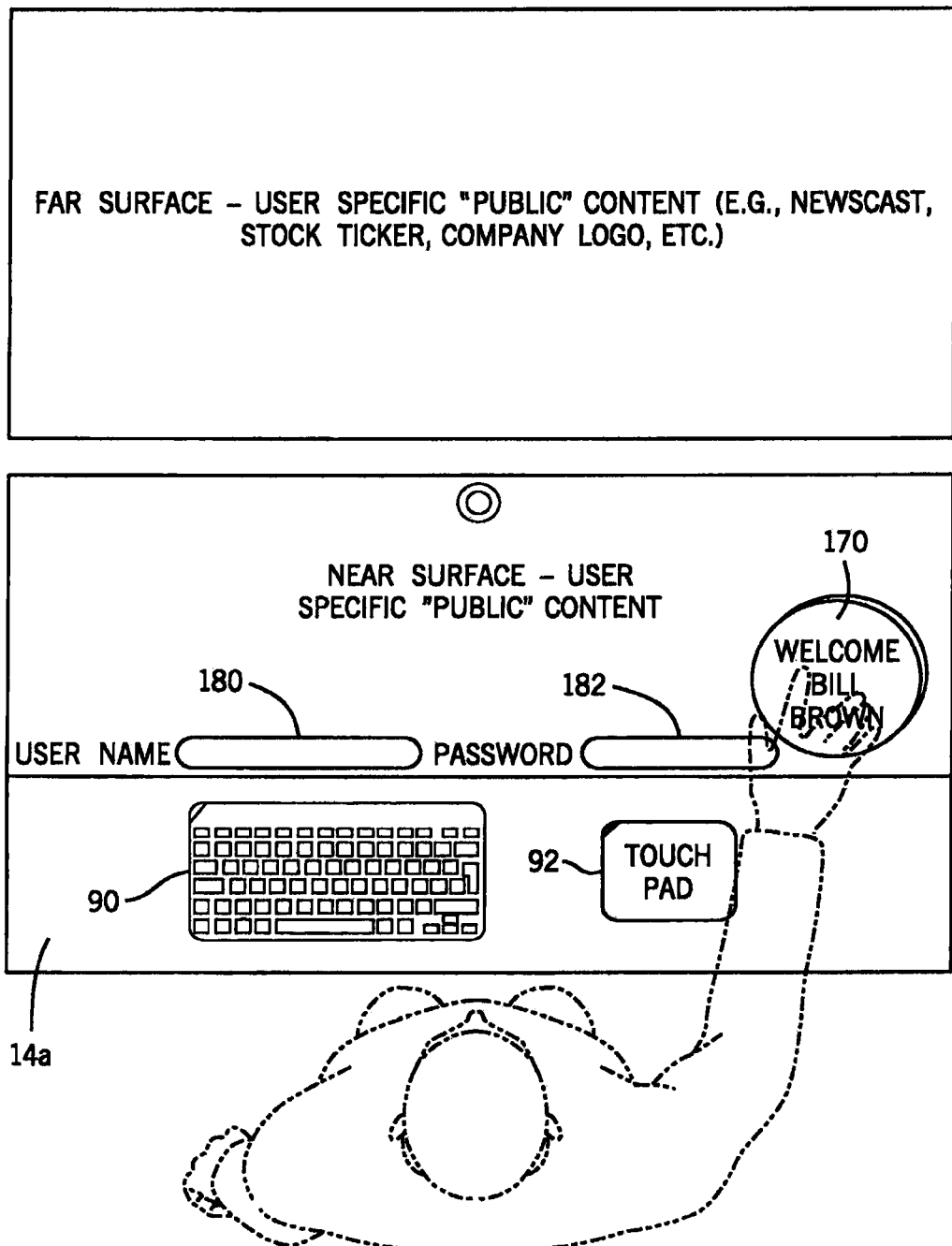
Figure 18:
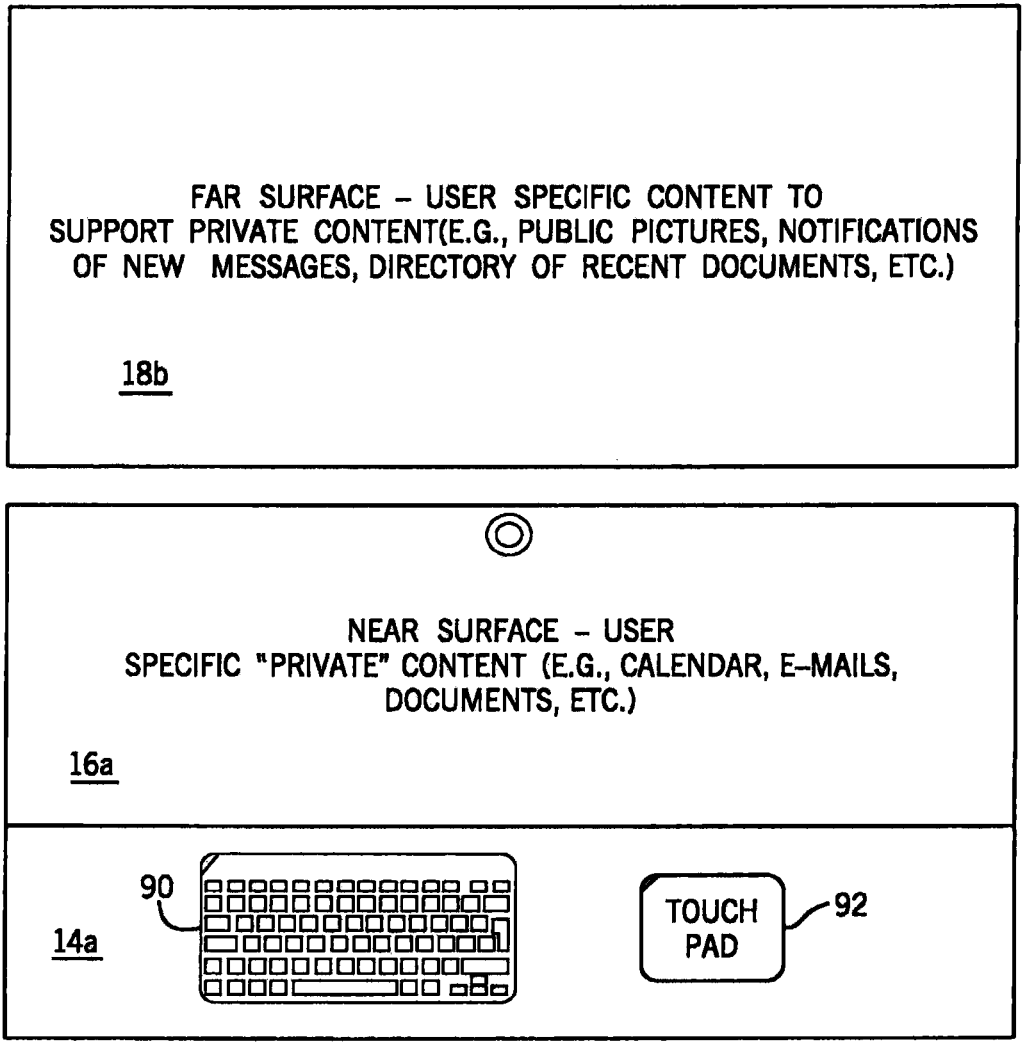
Figure 19:
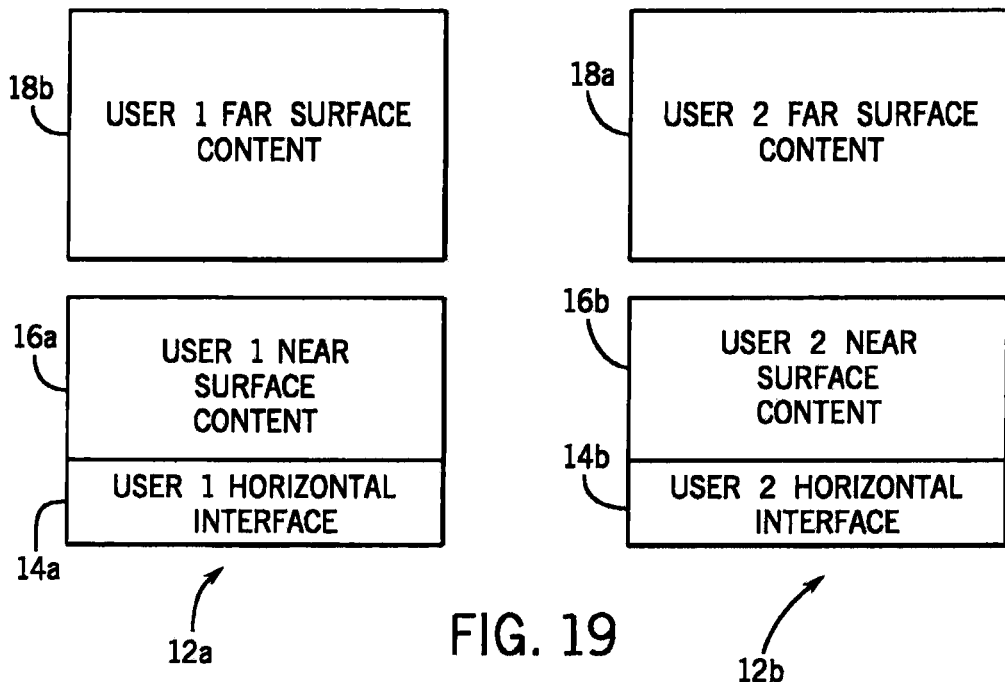
Figure 20:
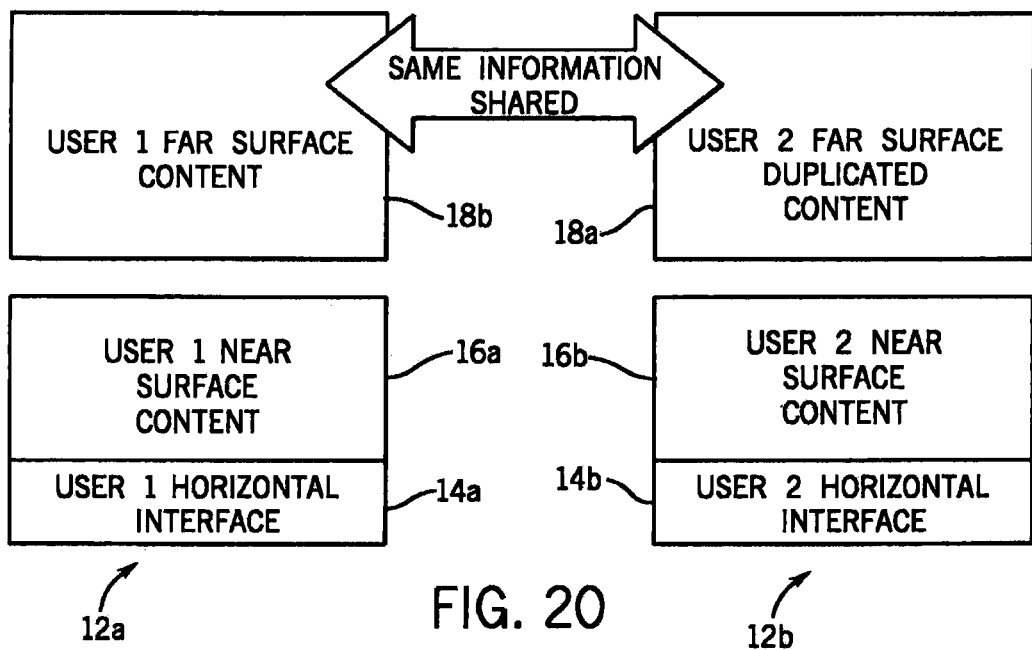
Figure 21:
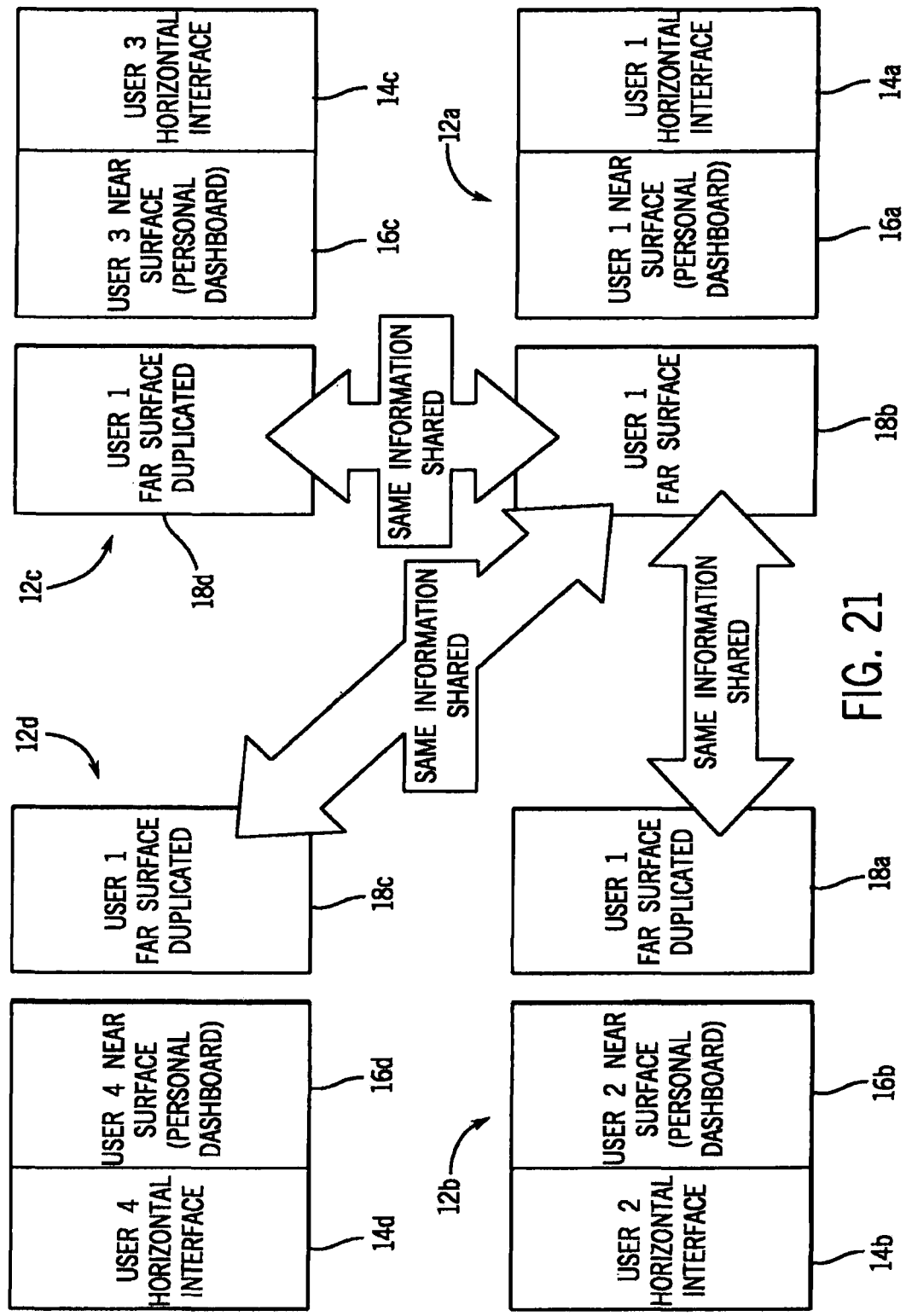
Figure 22:
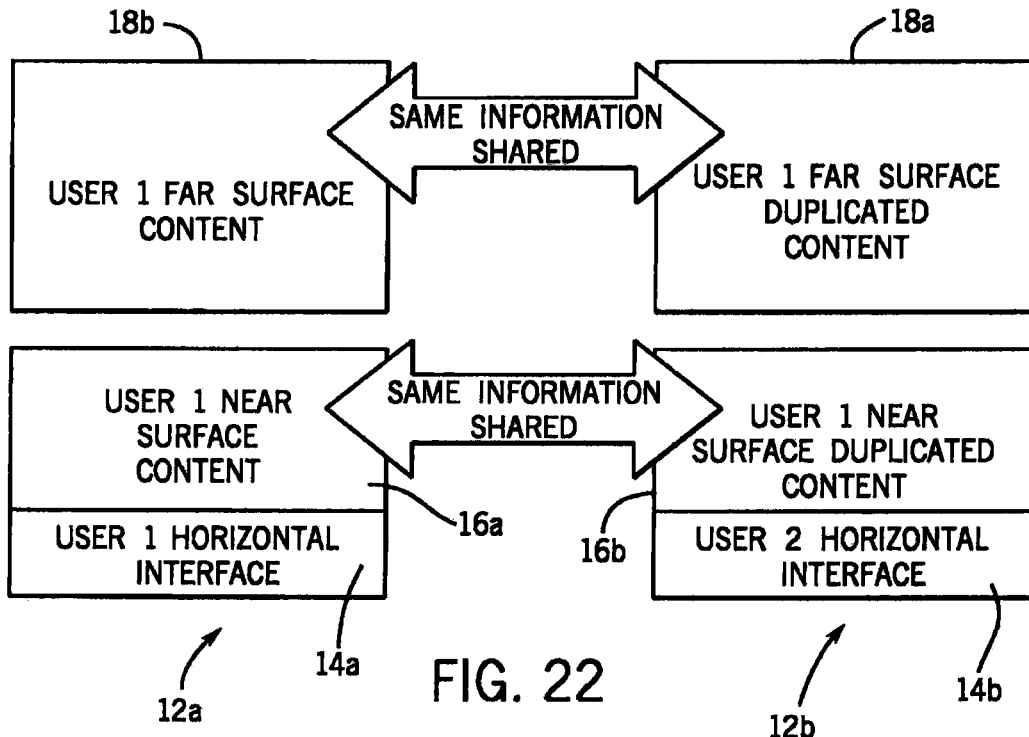
Figure 23:
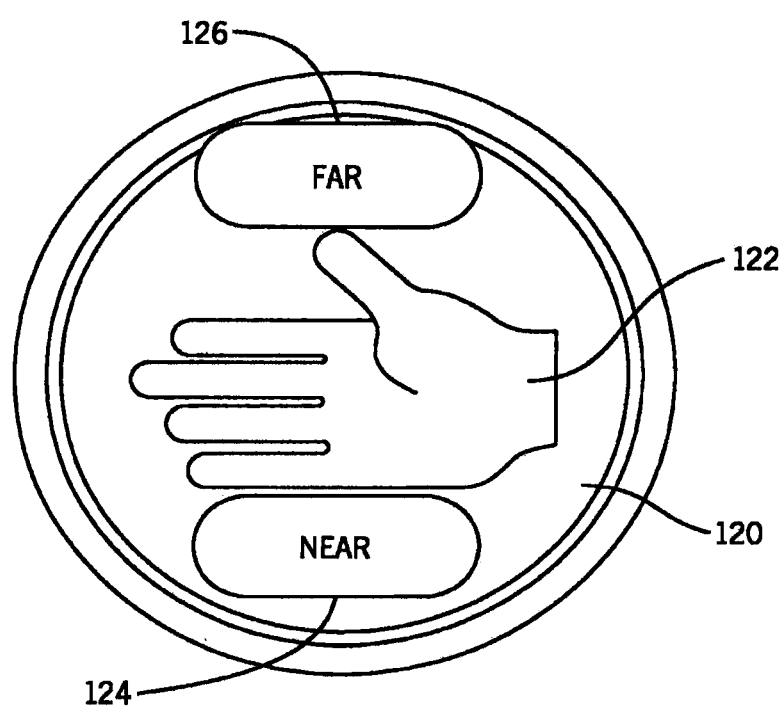
Figure 24:
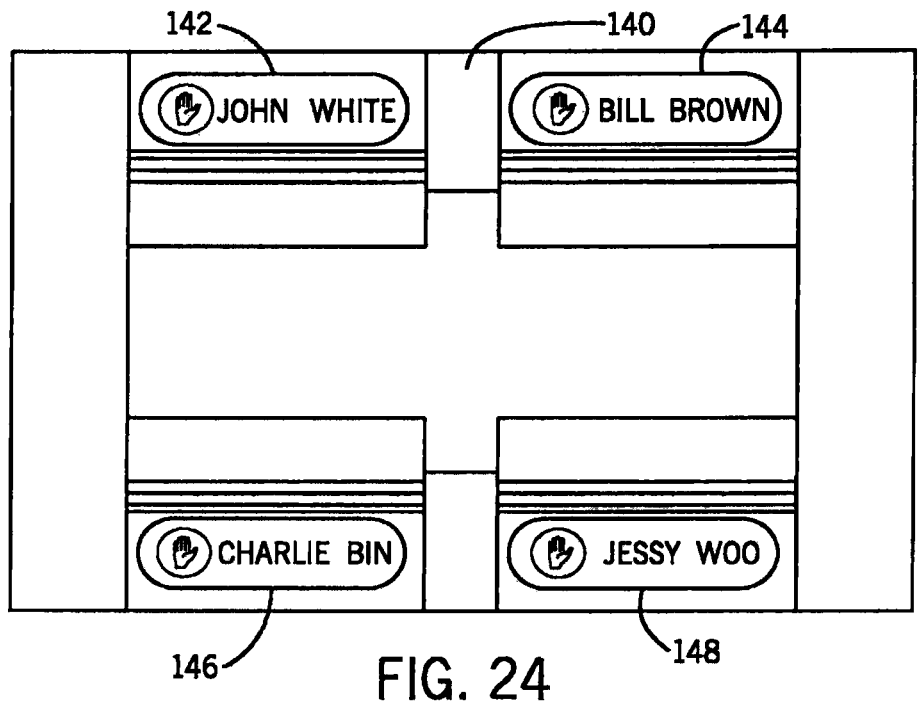
Figure 25:
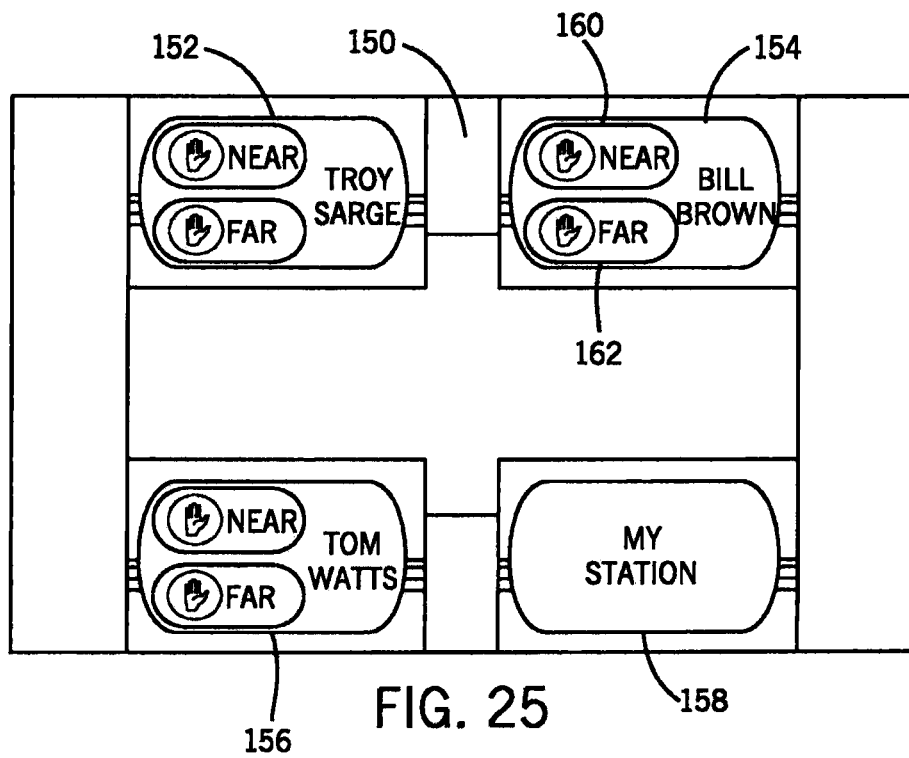
Figure 26:
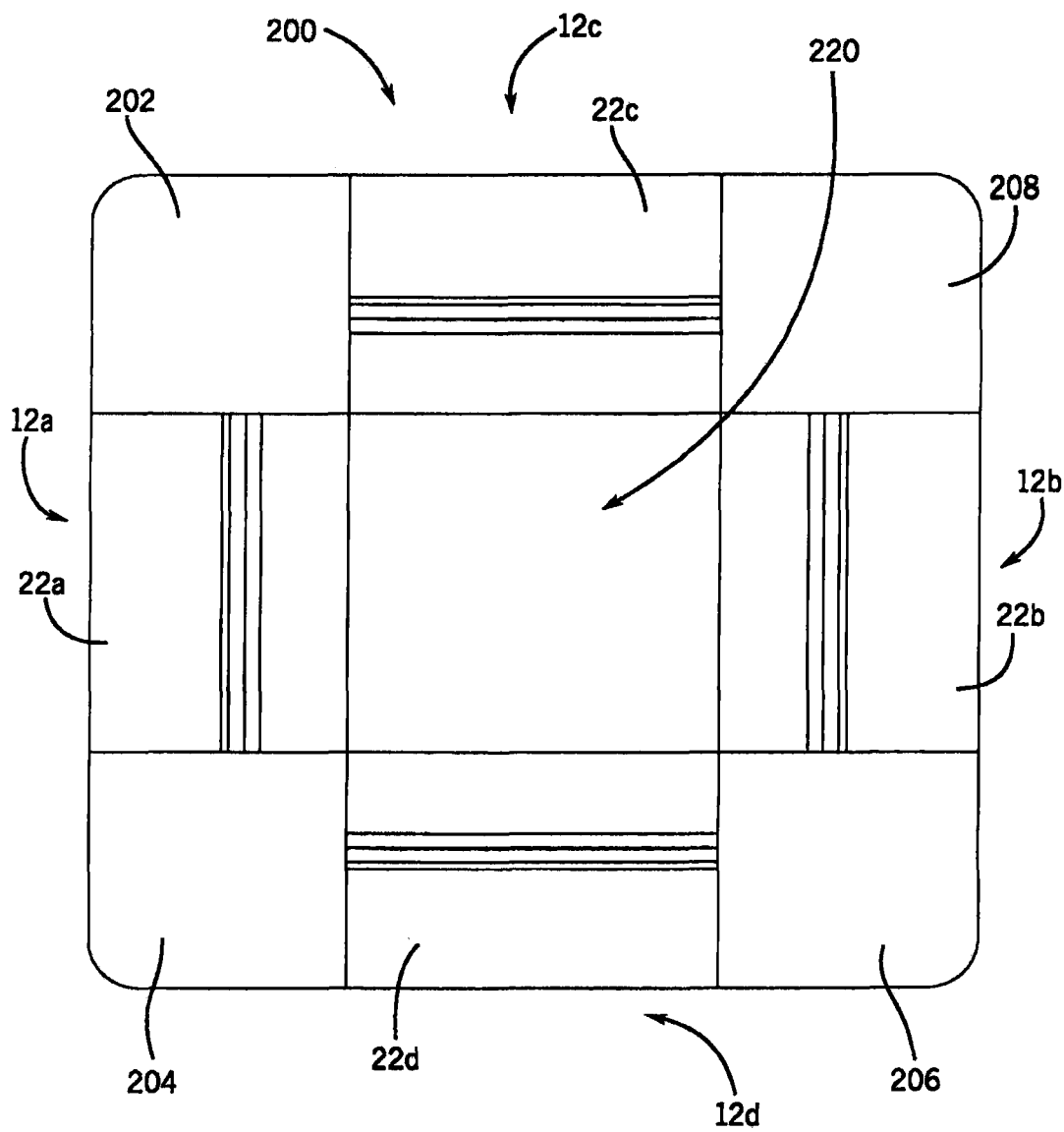
Figure 27:
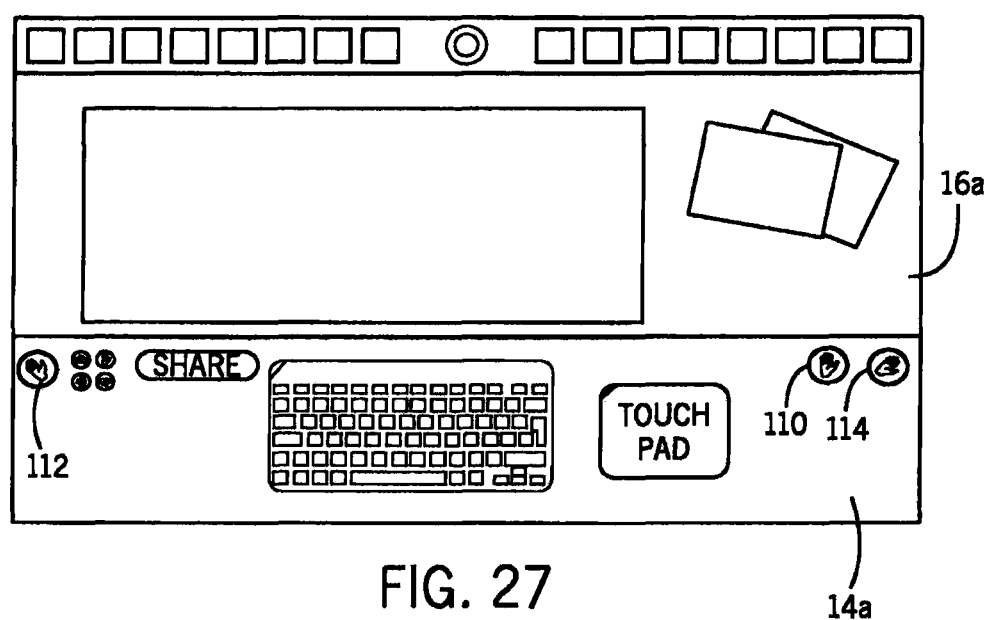
Figure 28:
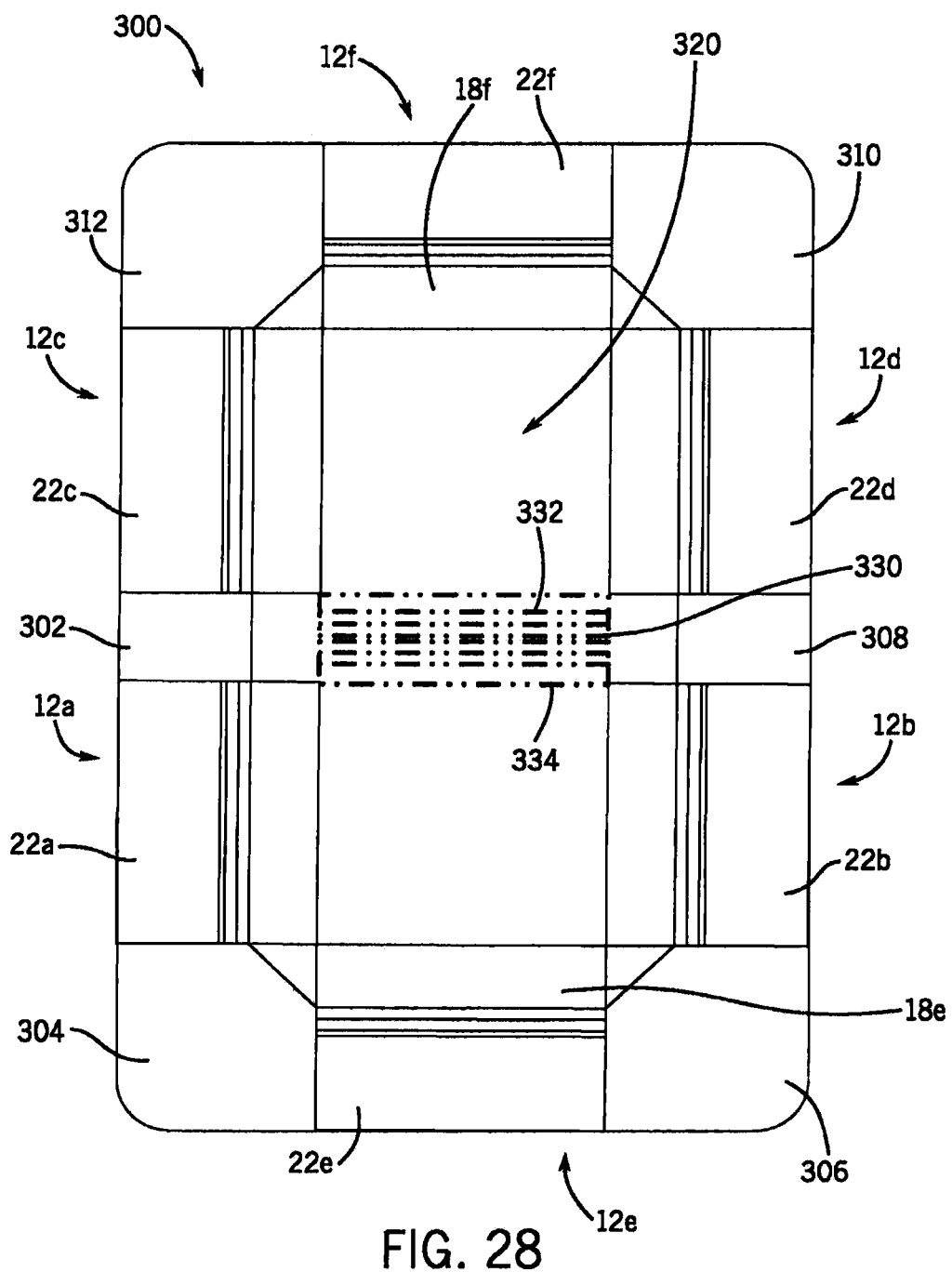
Figure 29:
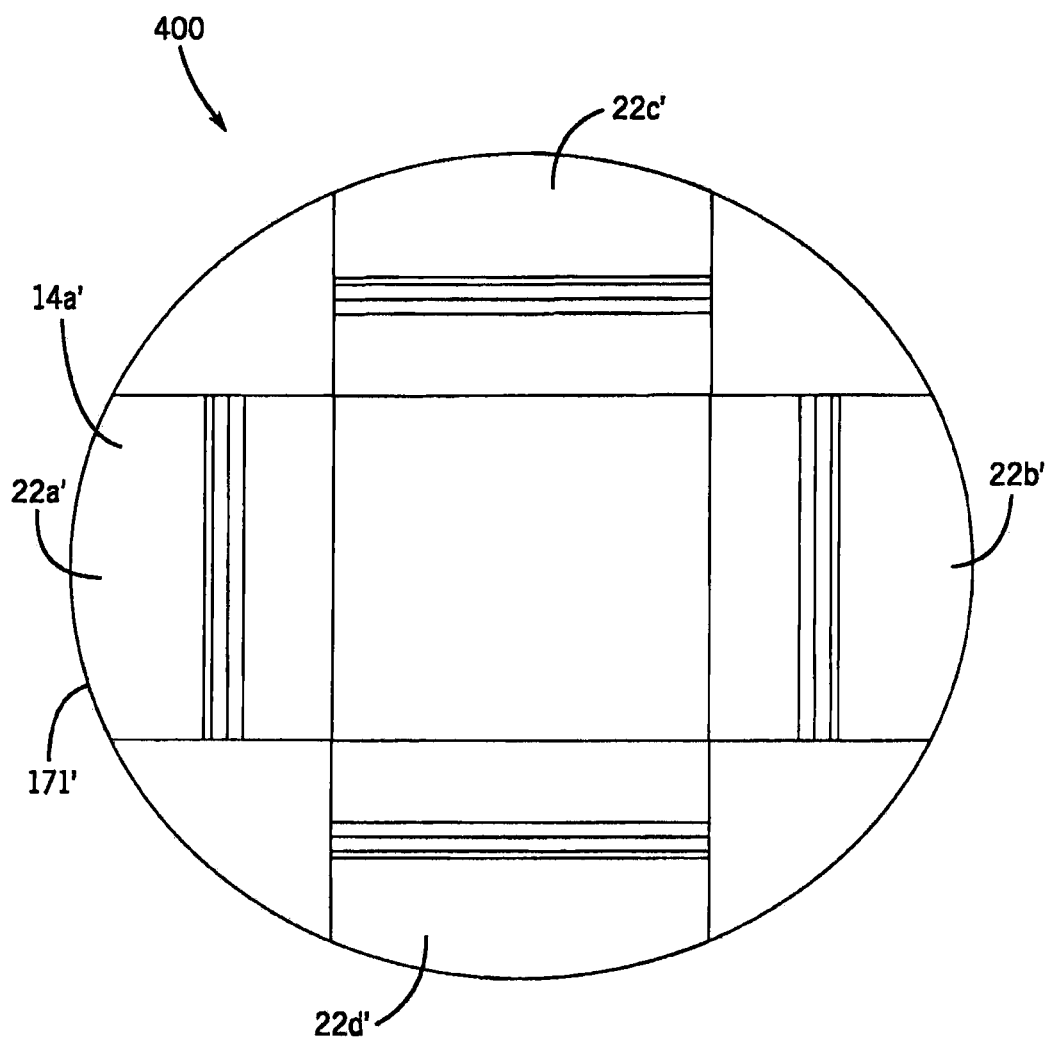
Figure 30:
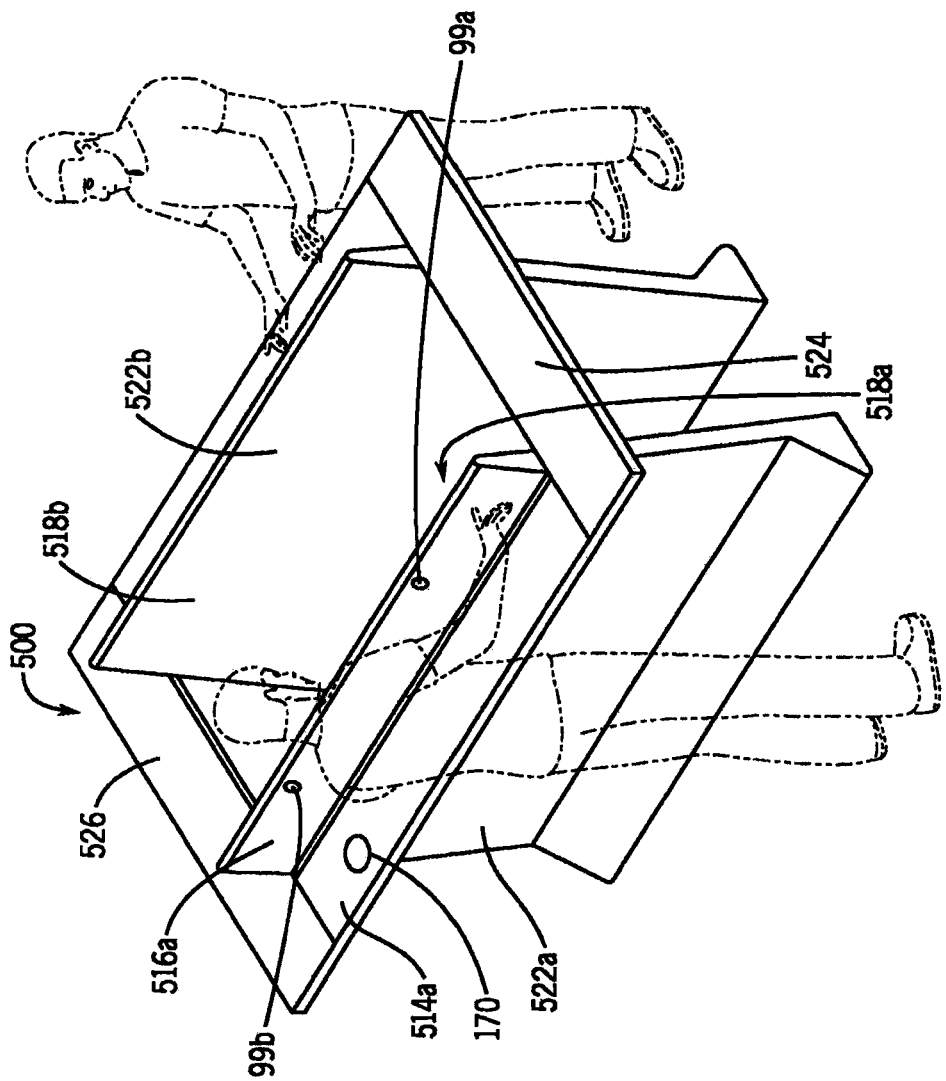
Figure 31:
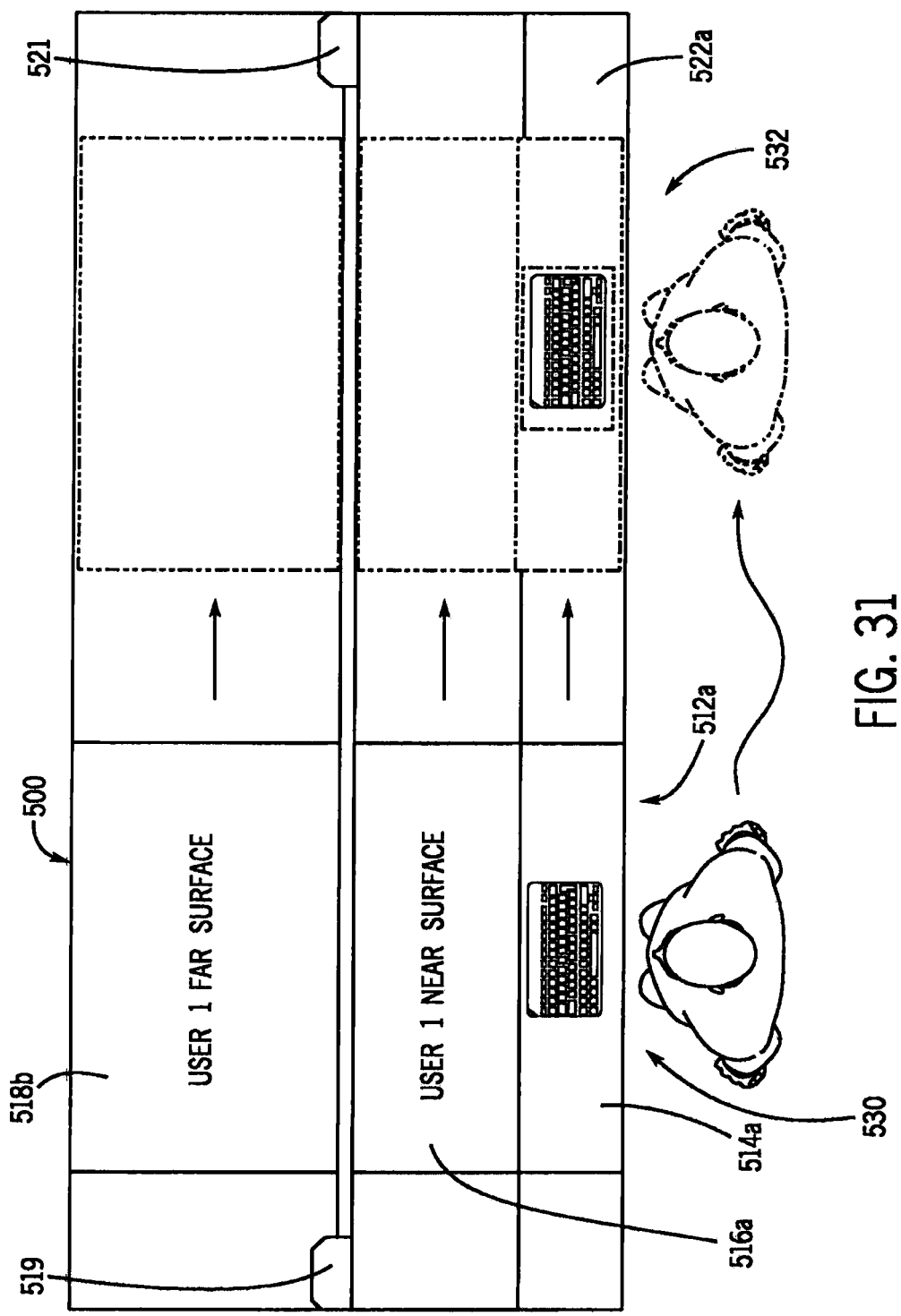
Figure 32:
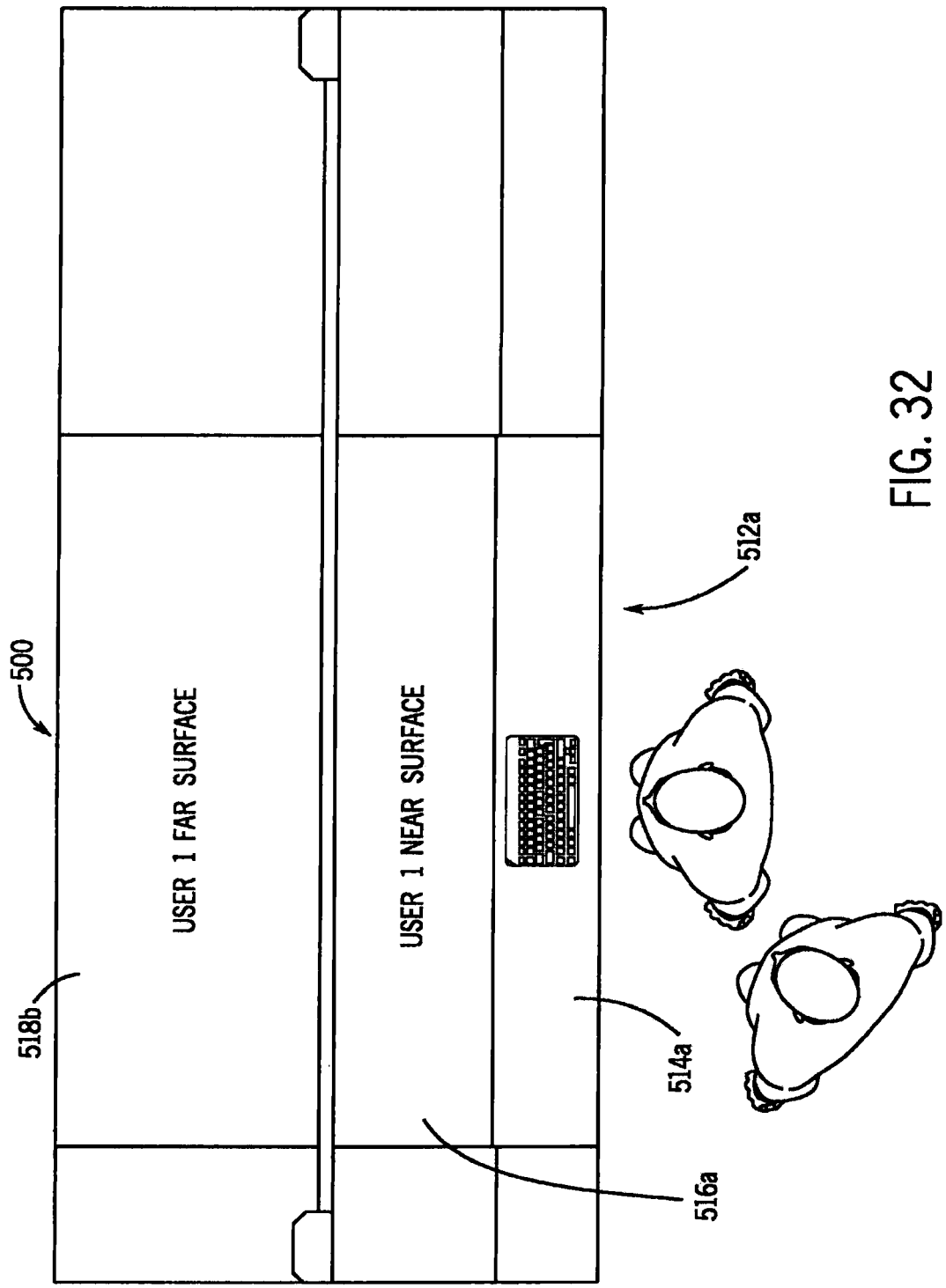
Figure 33:
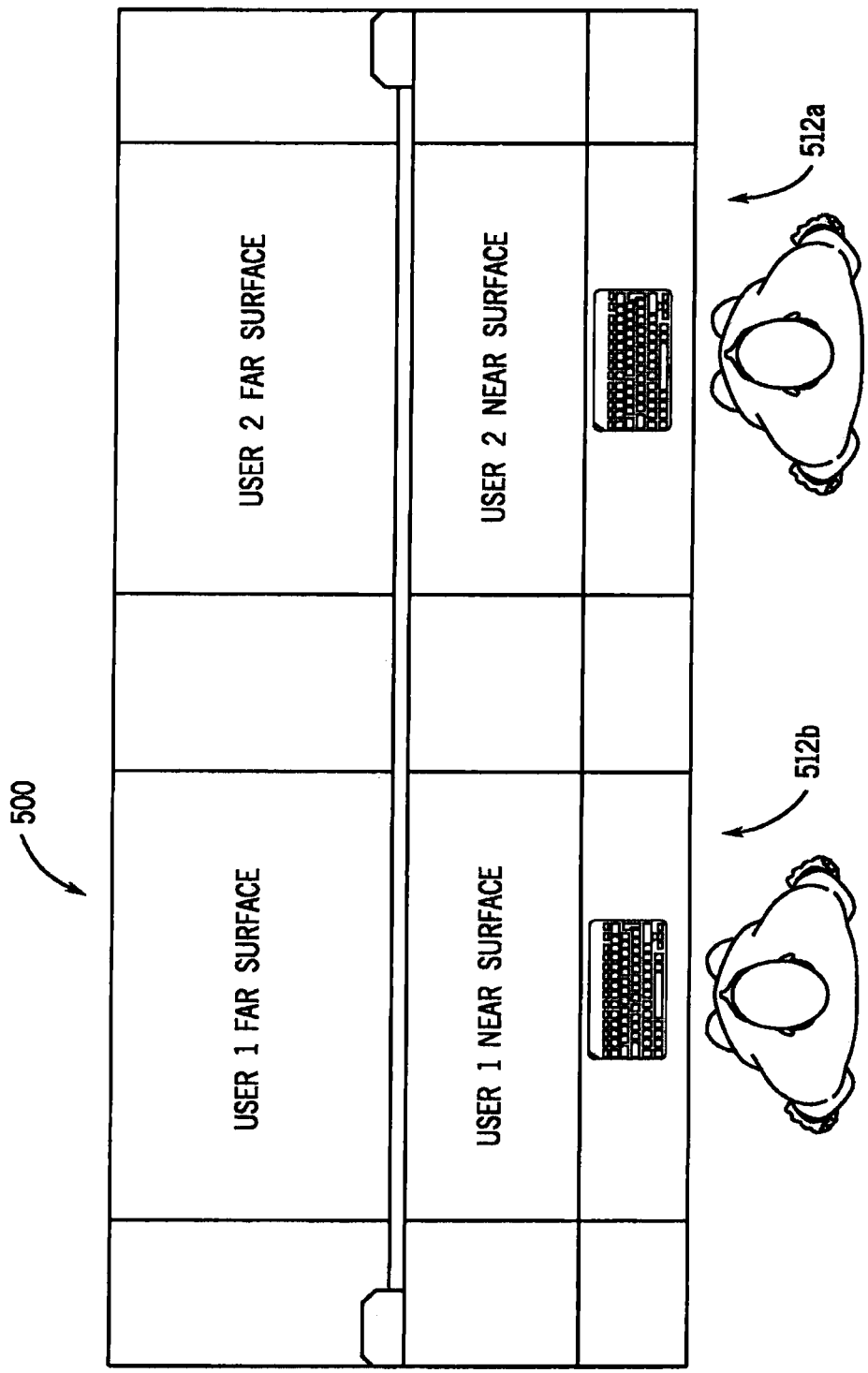
Figure 34:
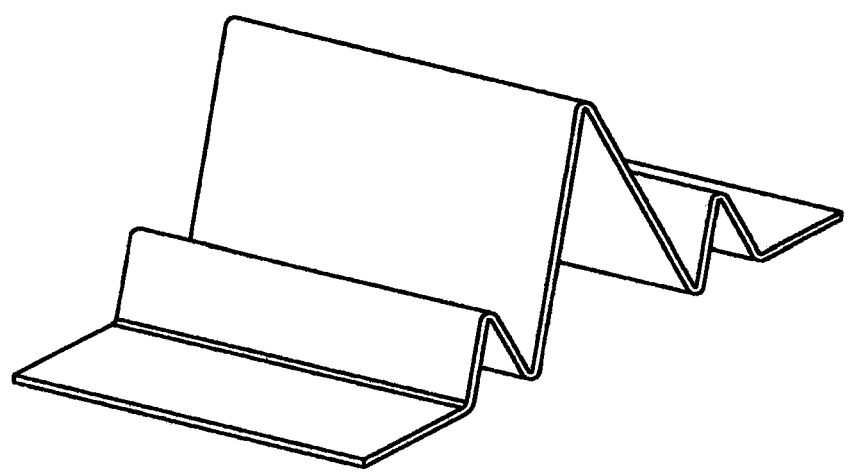
Figure 35:
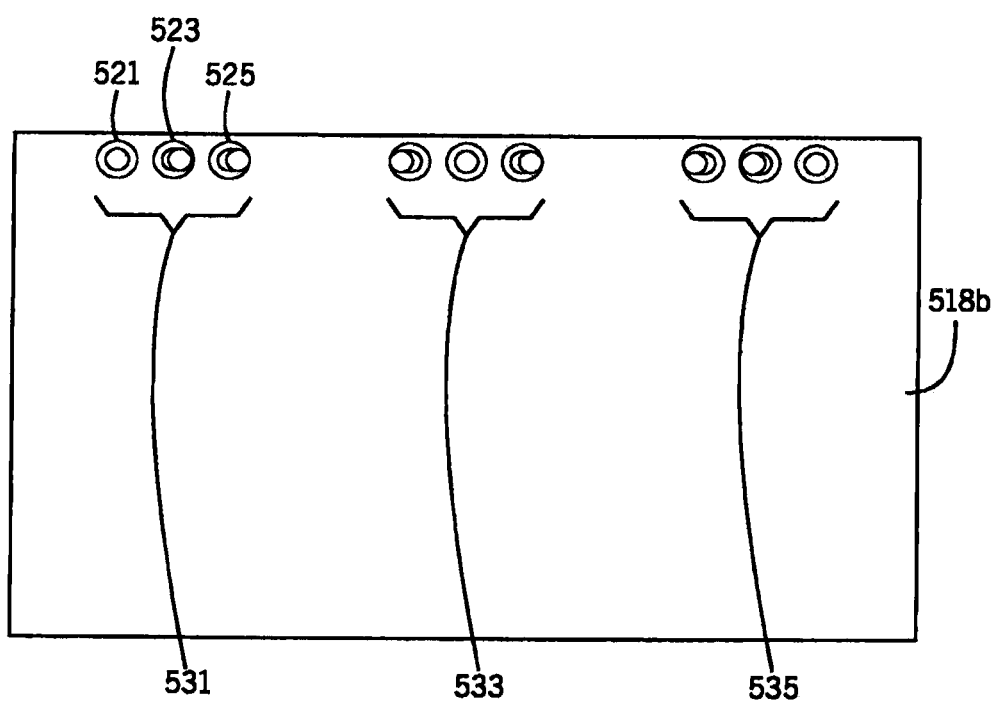
Figure 36:
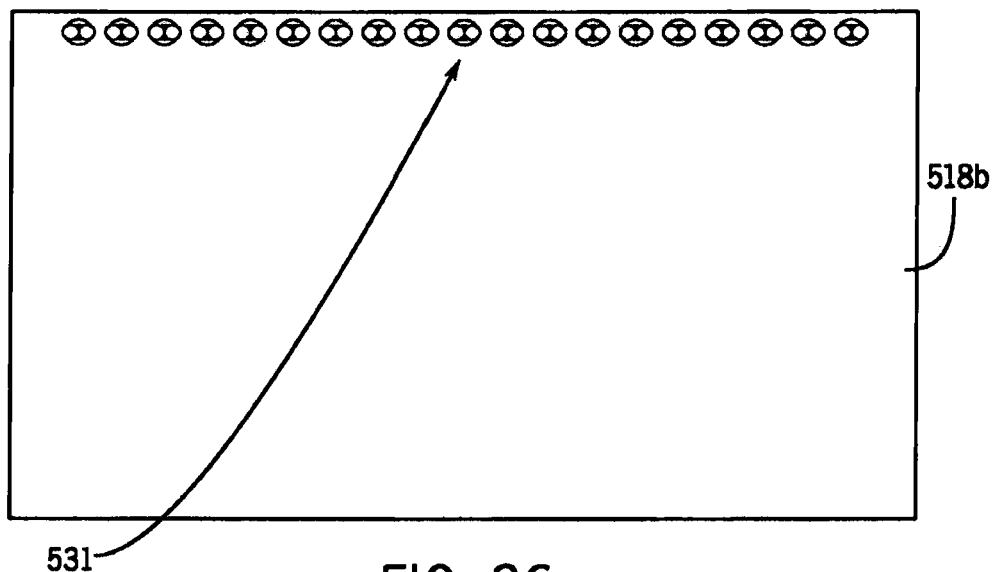
Figure 37:
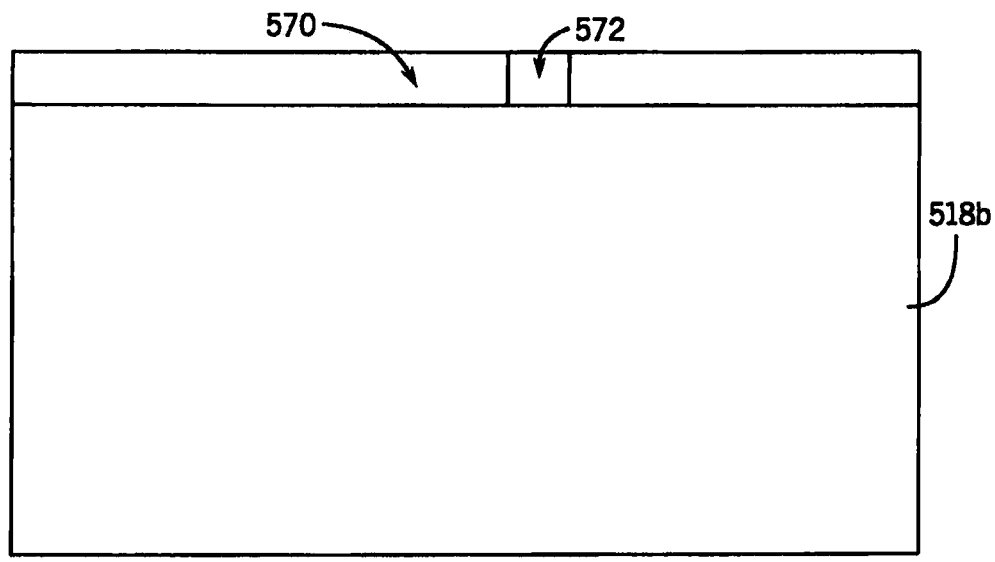
Figure 38:
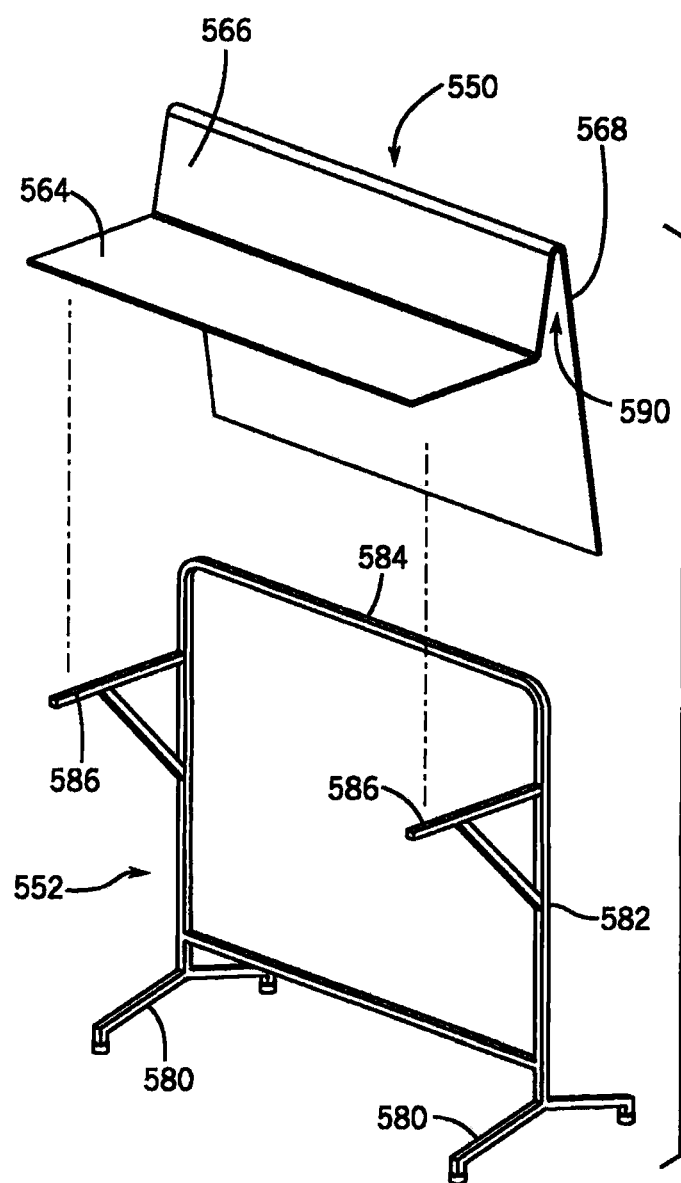
Figure 39:
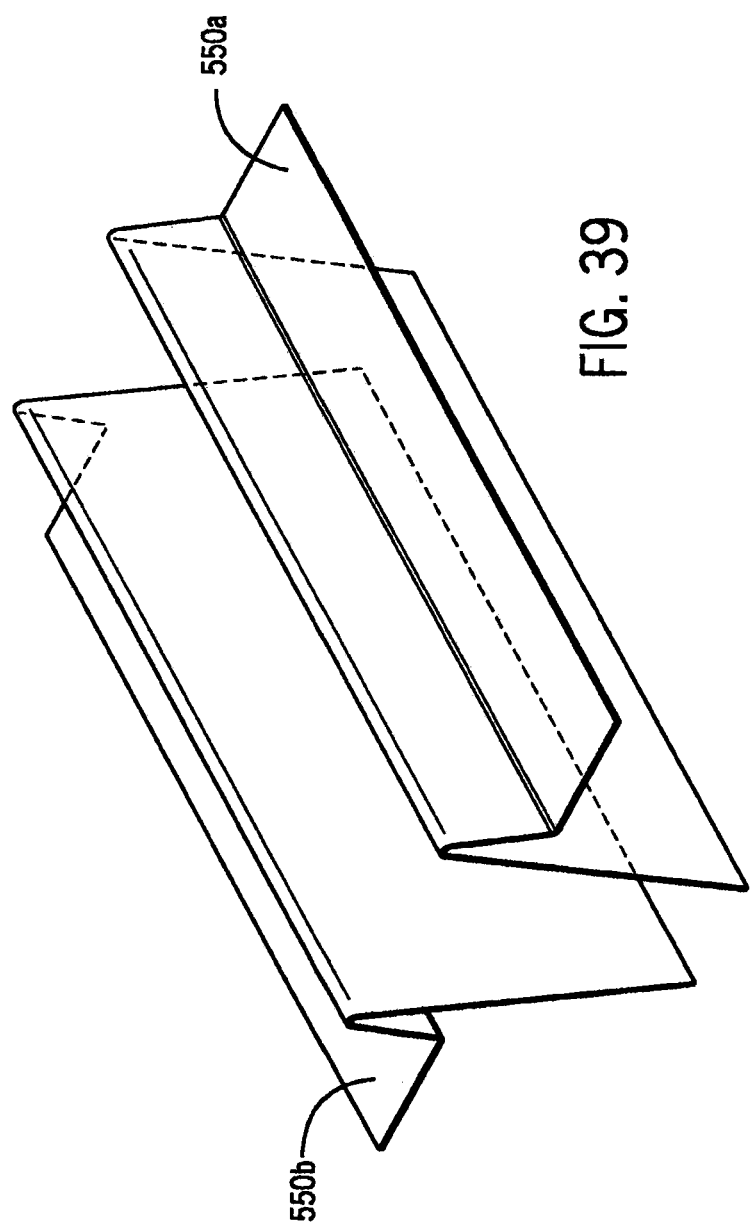
Figure 40:
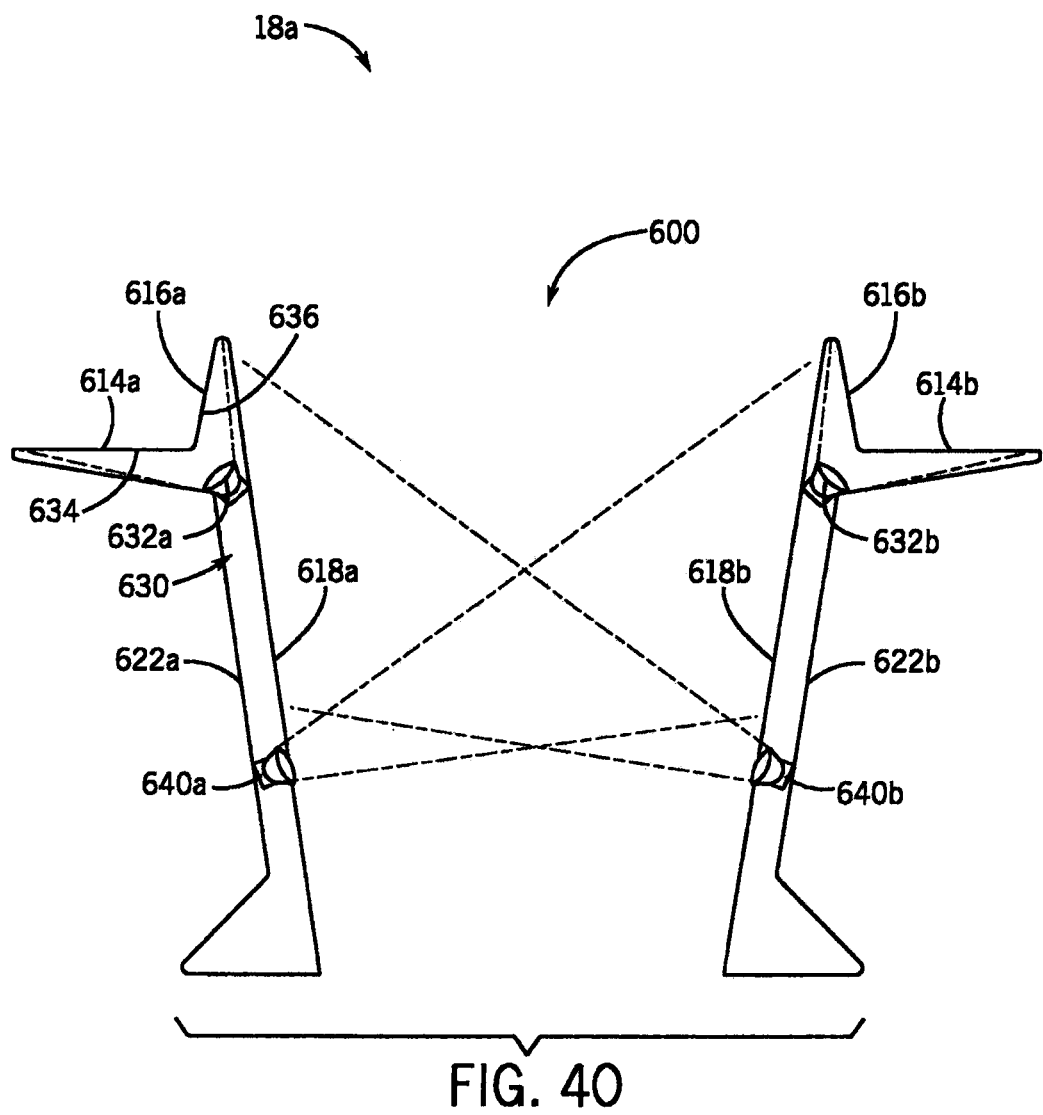
Figure 41:
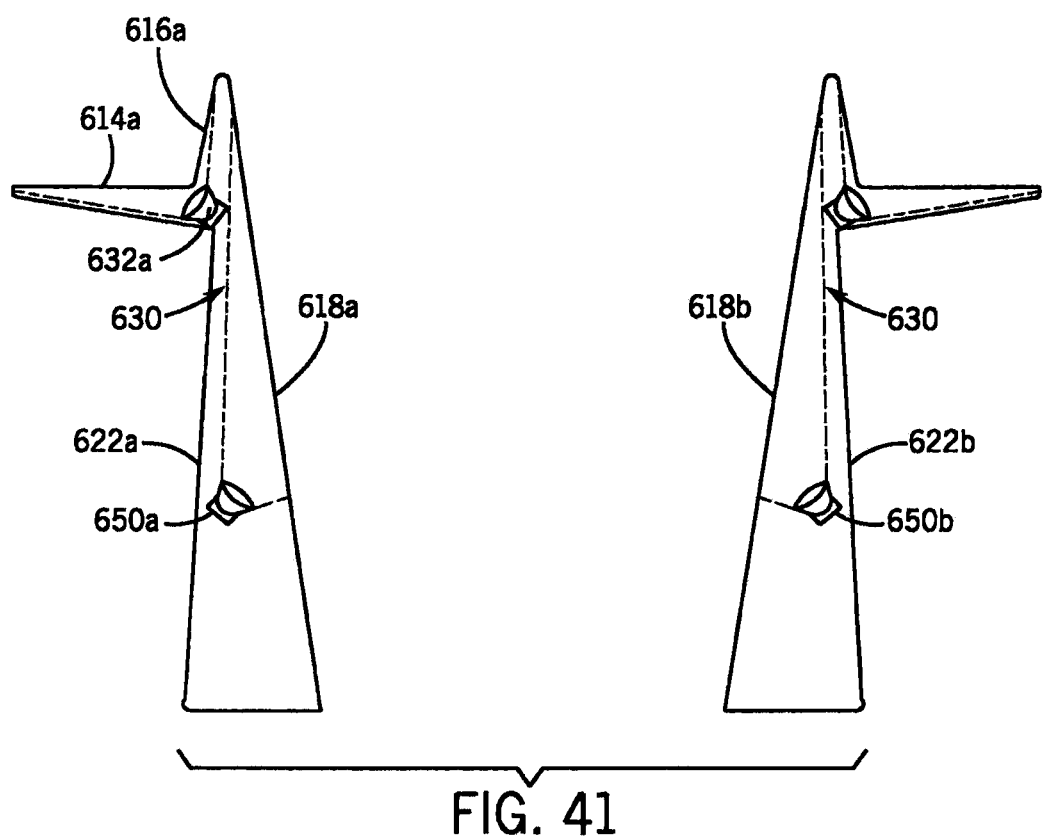
Figure 42:
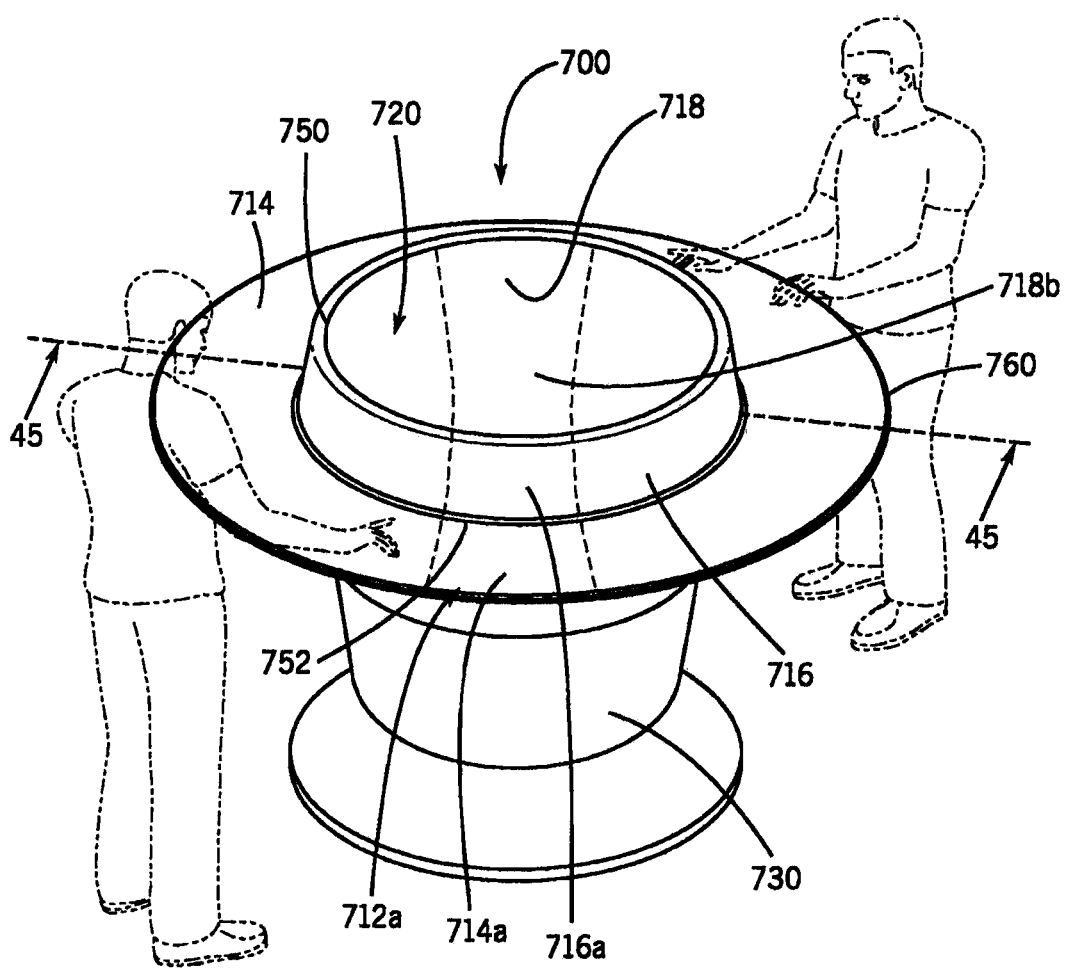
Figure 43:
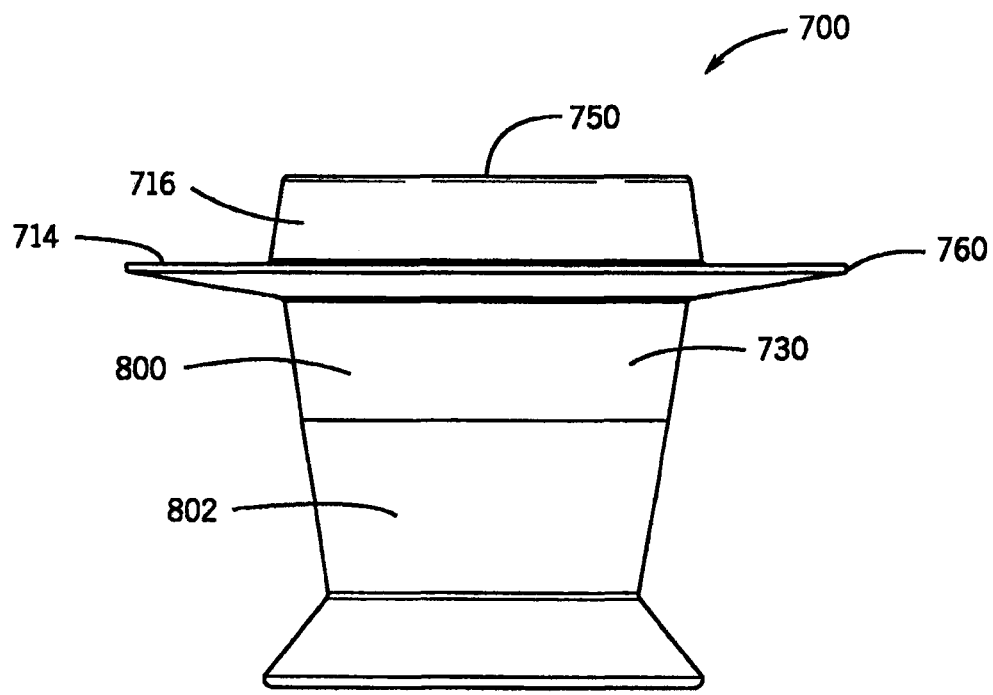
Figure 44:
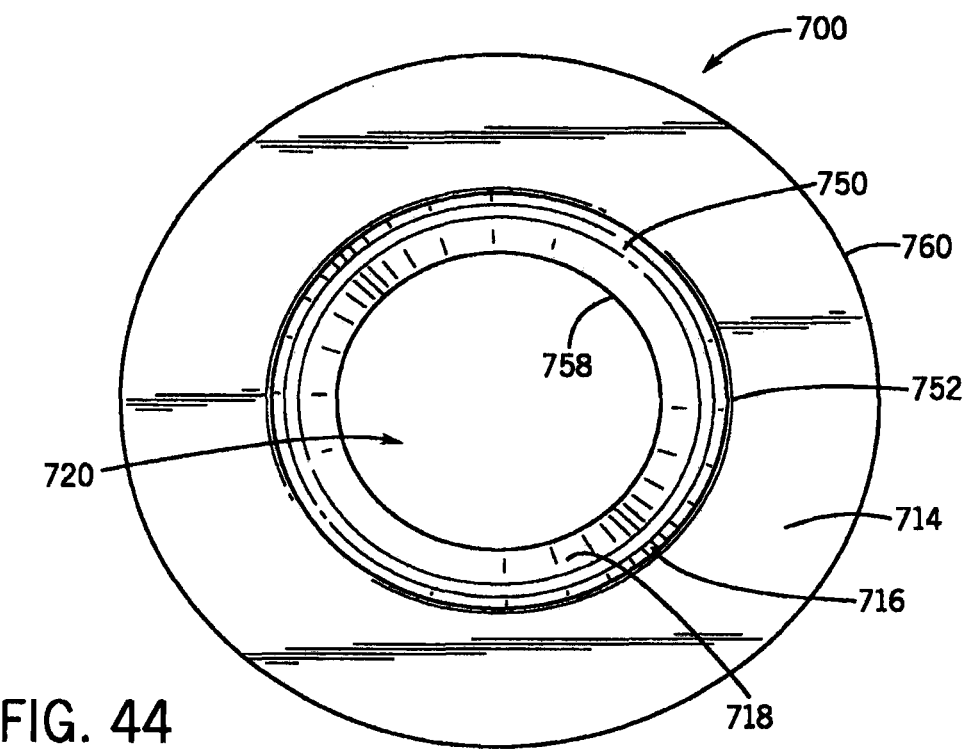
Figure 45:
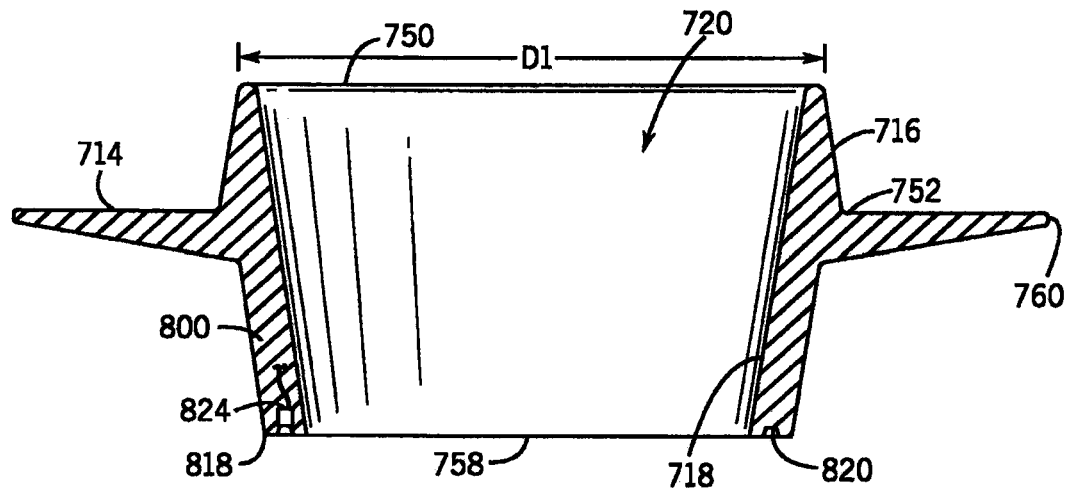
Figure 46:
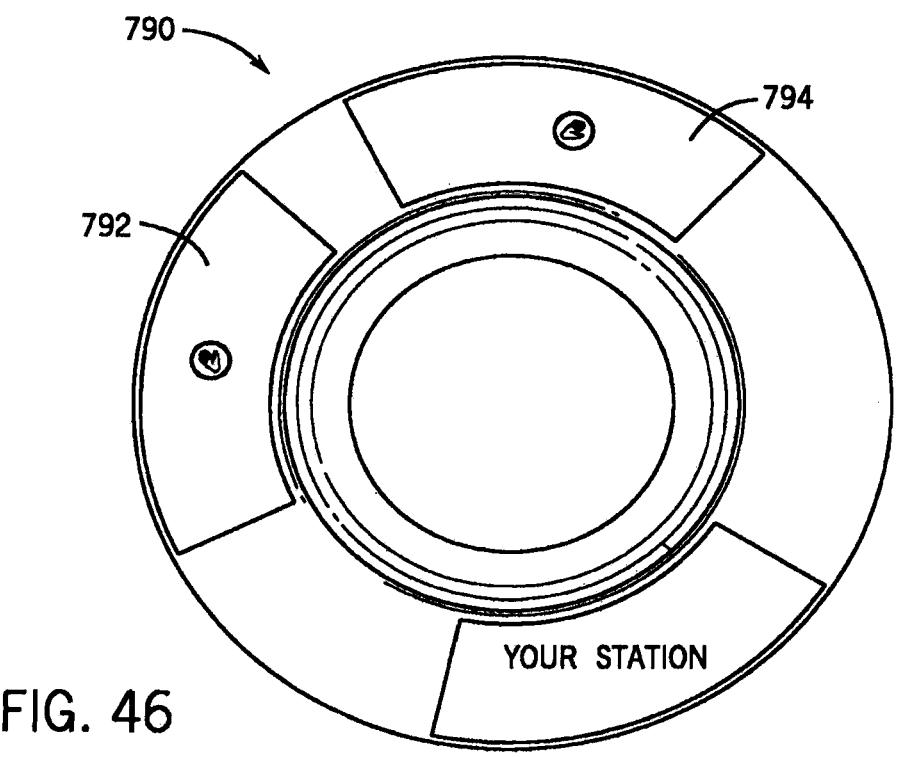
Figure 47:
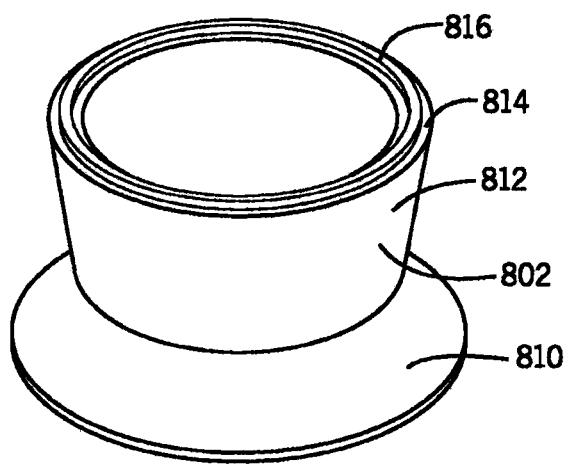
Figure 48:
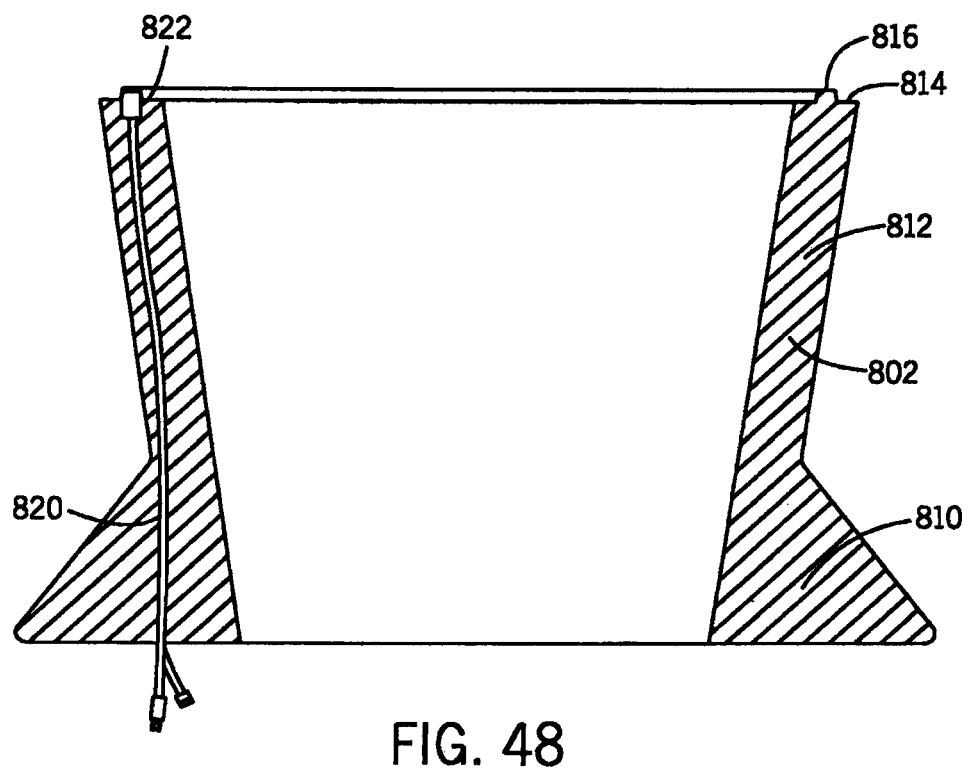
Figure 49:
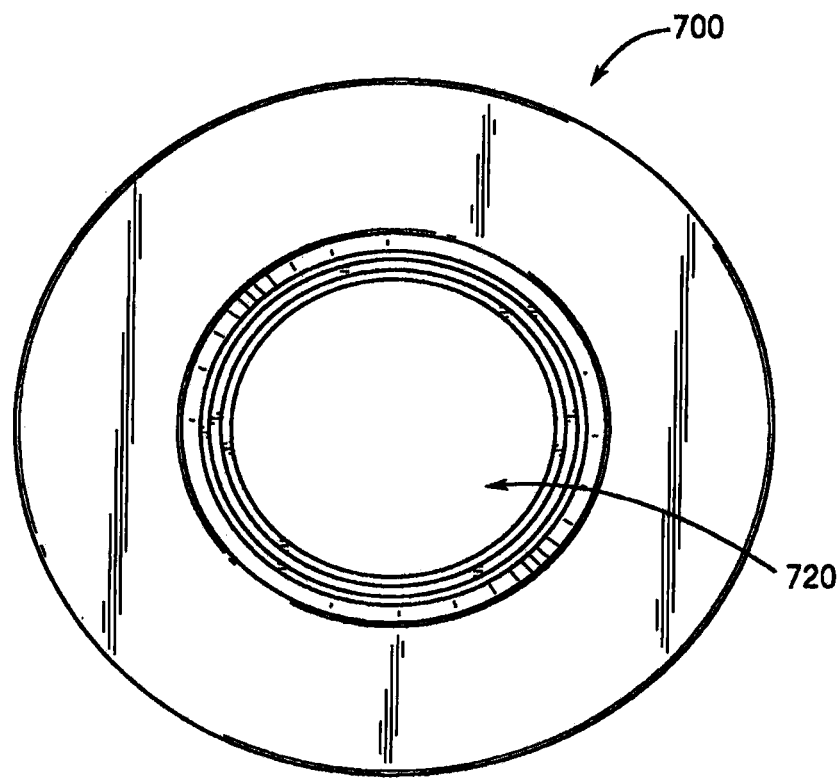
Figure 50:
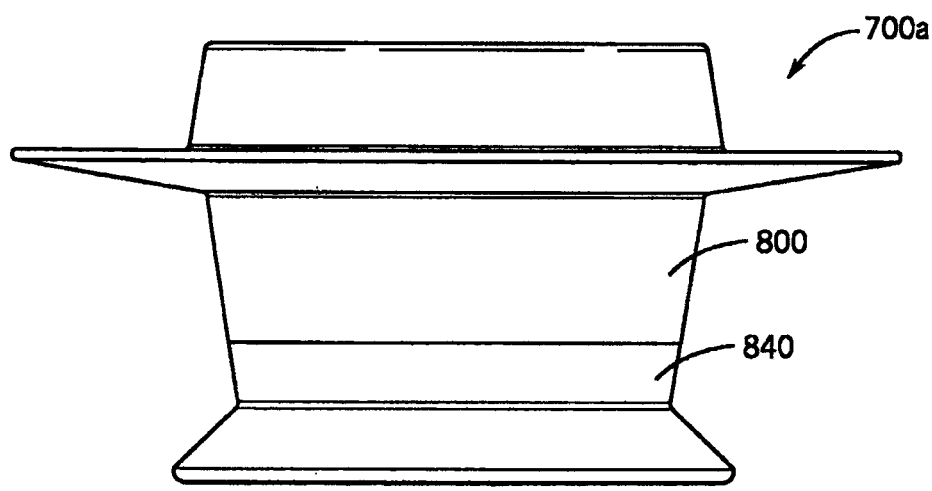
Figure 51:
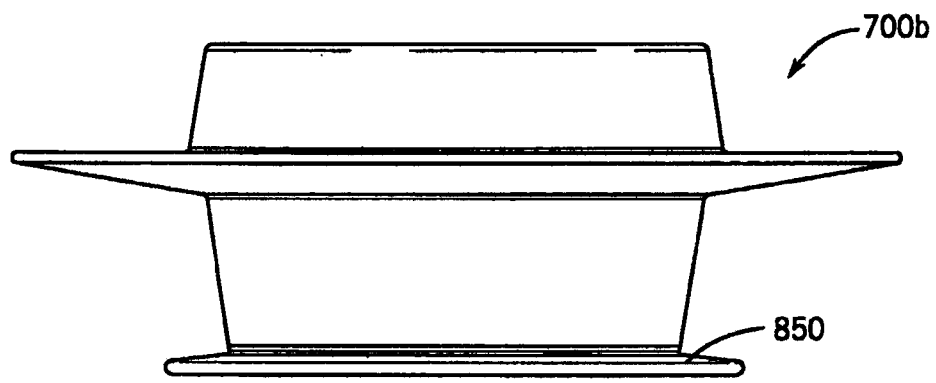
Figure 52:
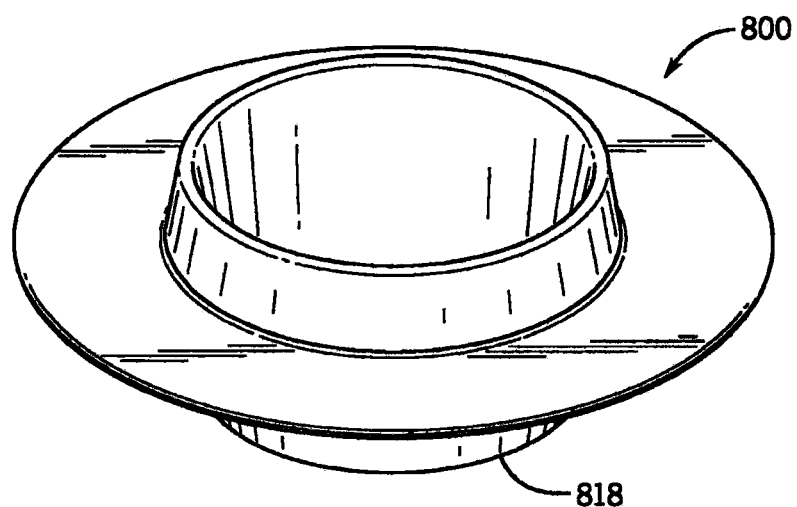
Figure 53:
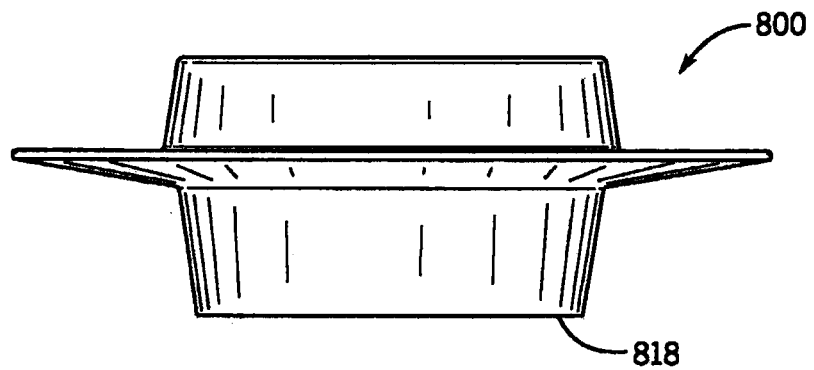
Figure 54:
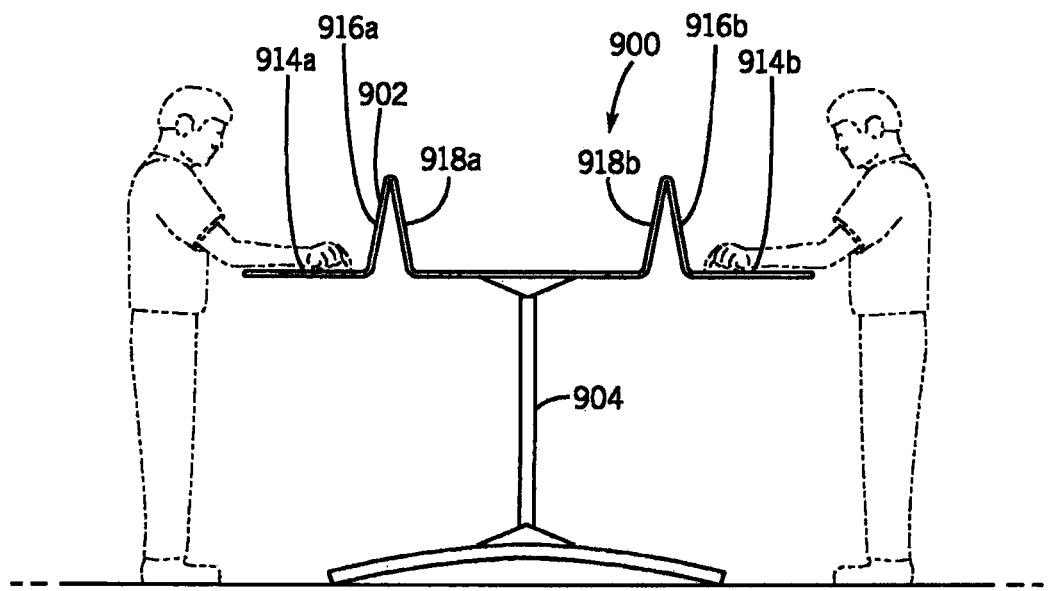
Figure 55:
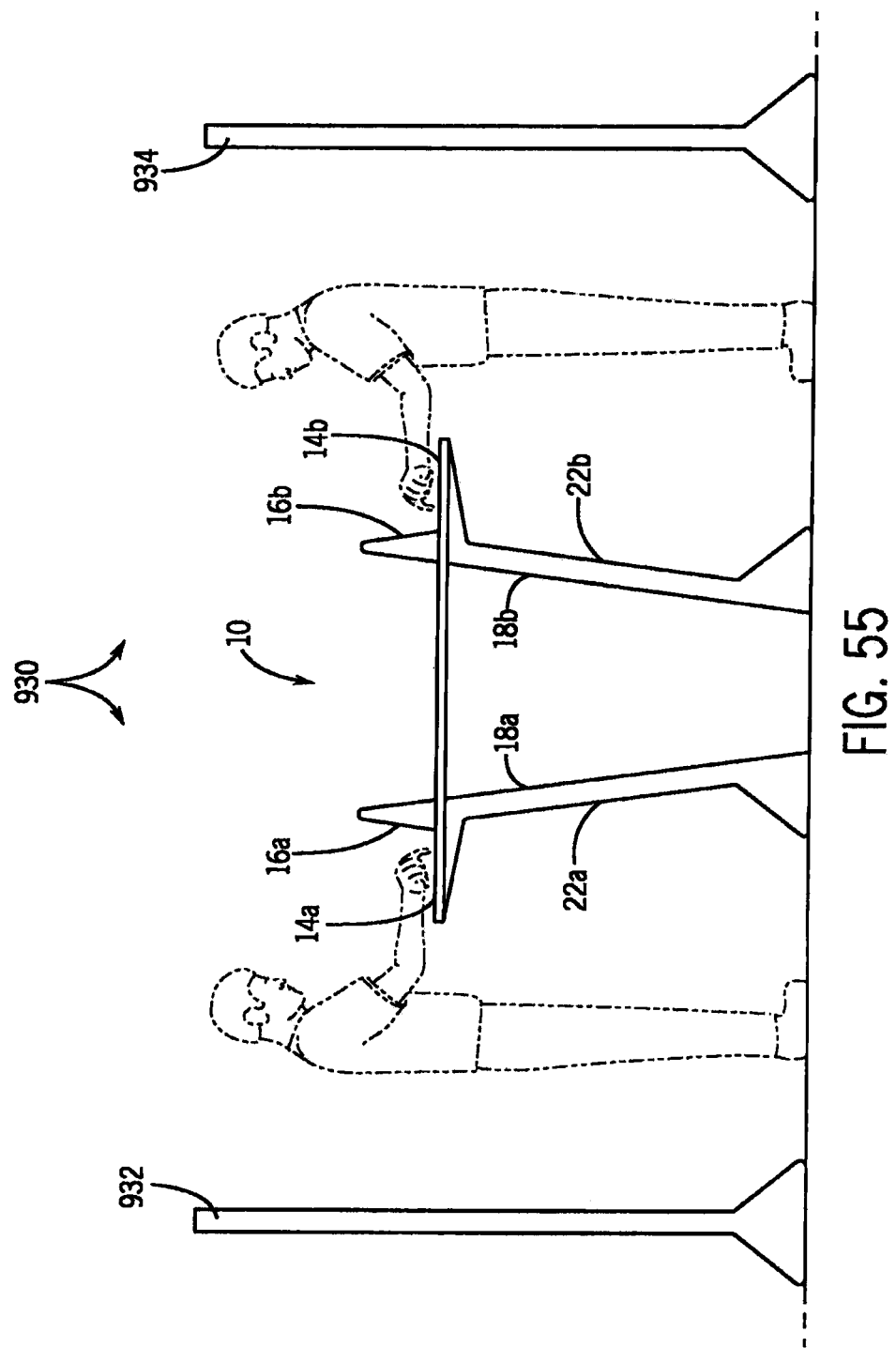
Figure 56:
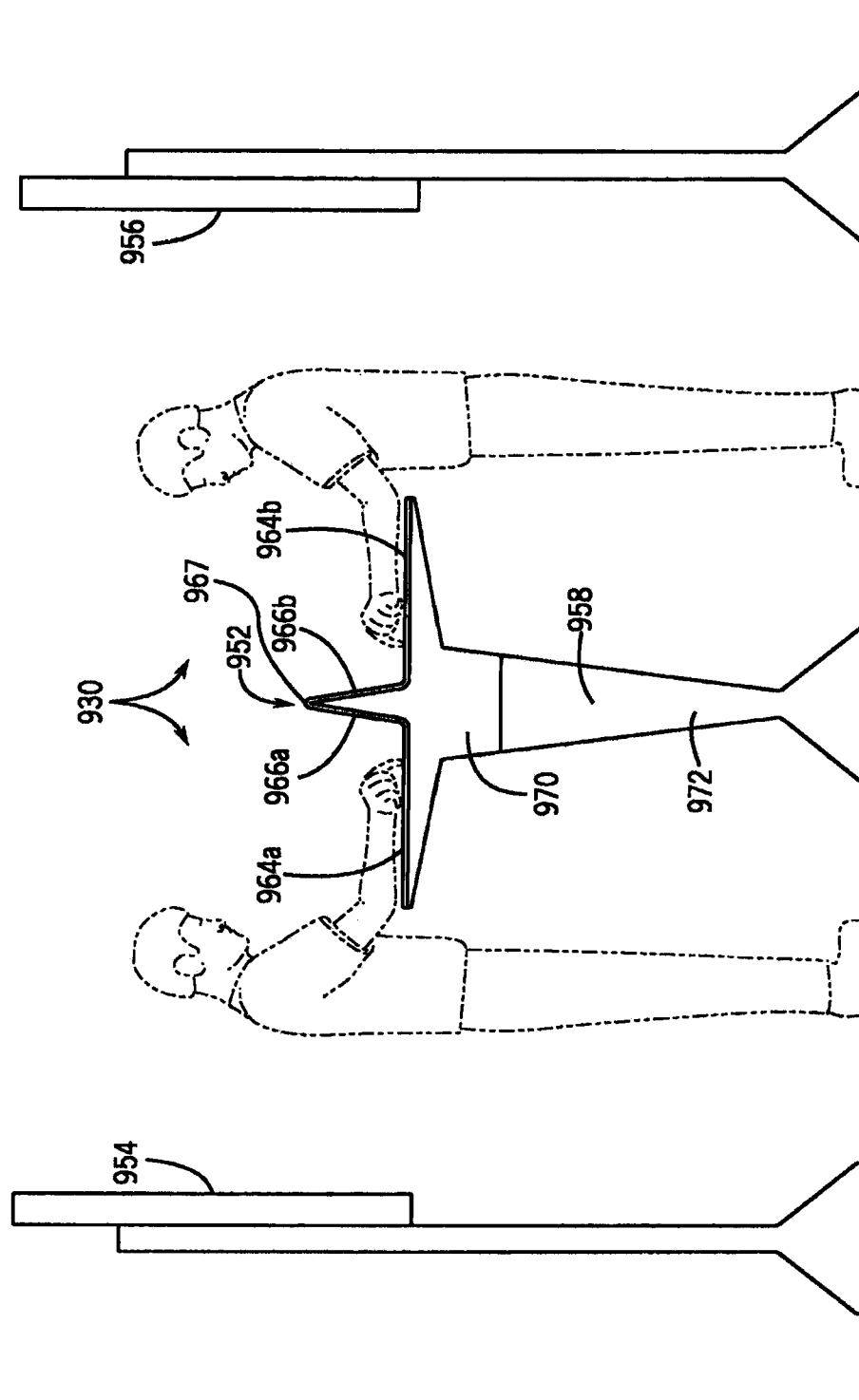
Figure 57:
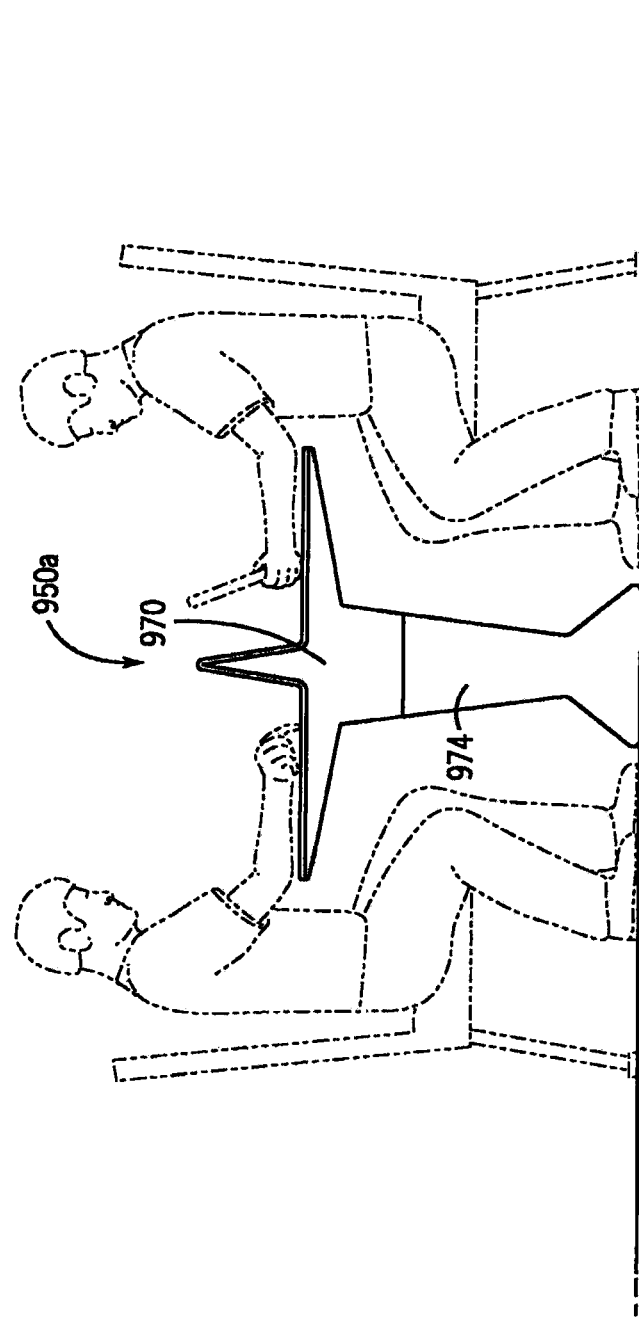
Figure 58:
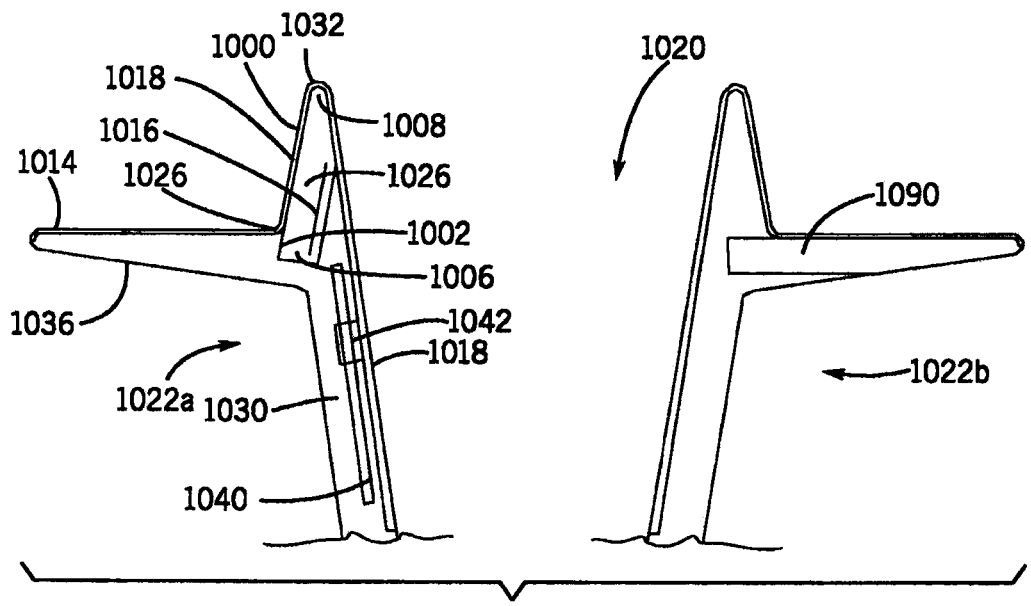
Figure 59:
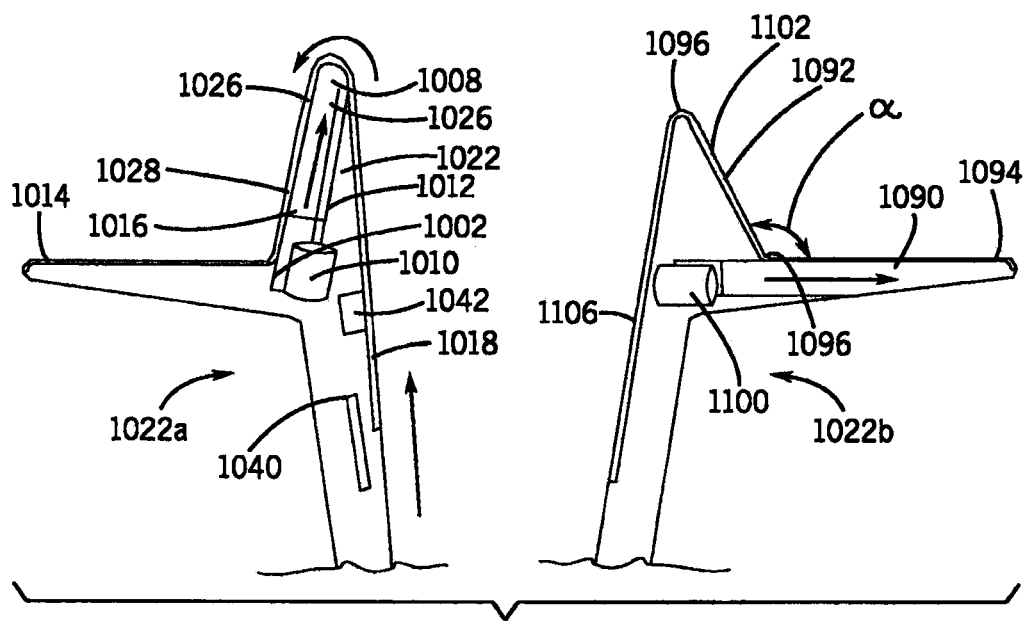
Figure 60:
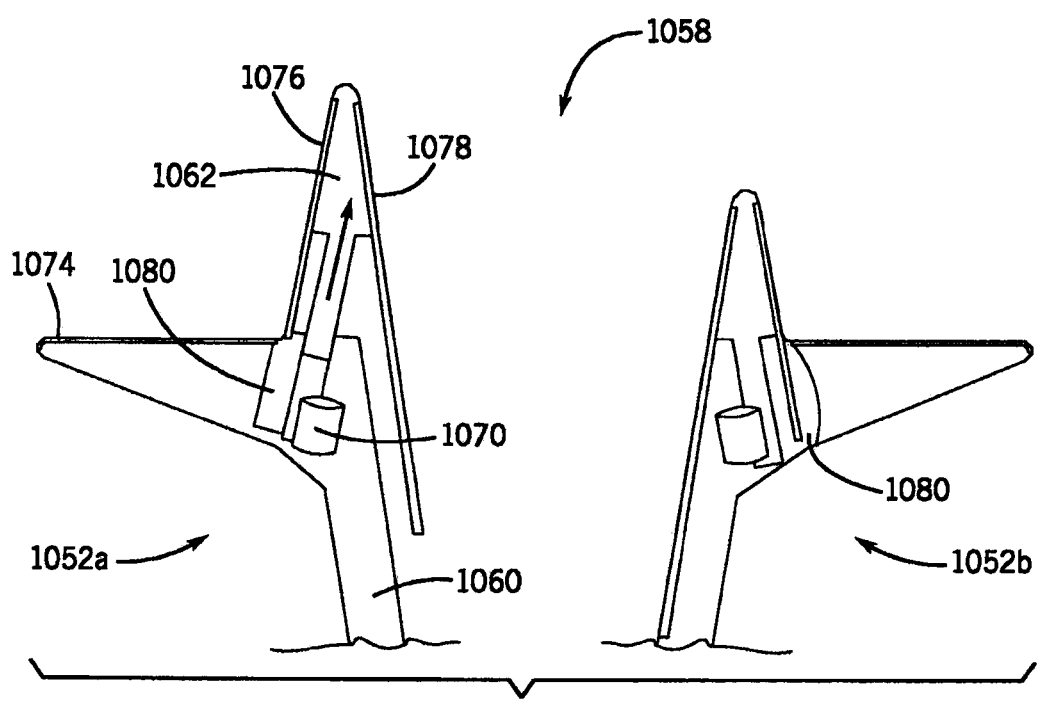
Figure 61:
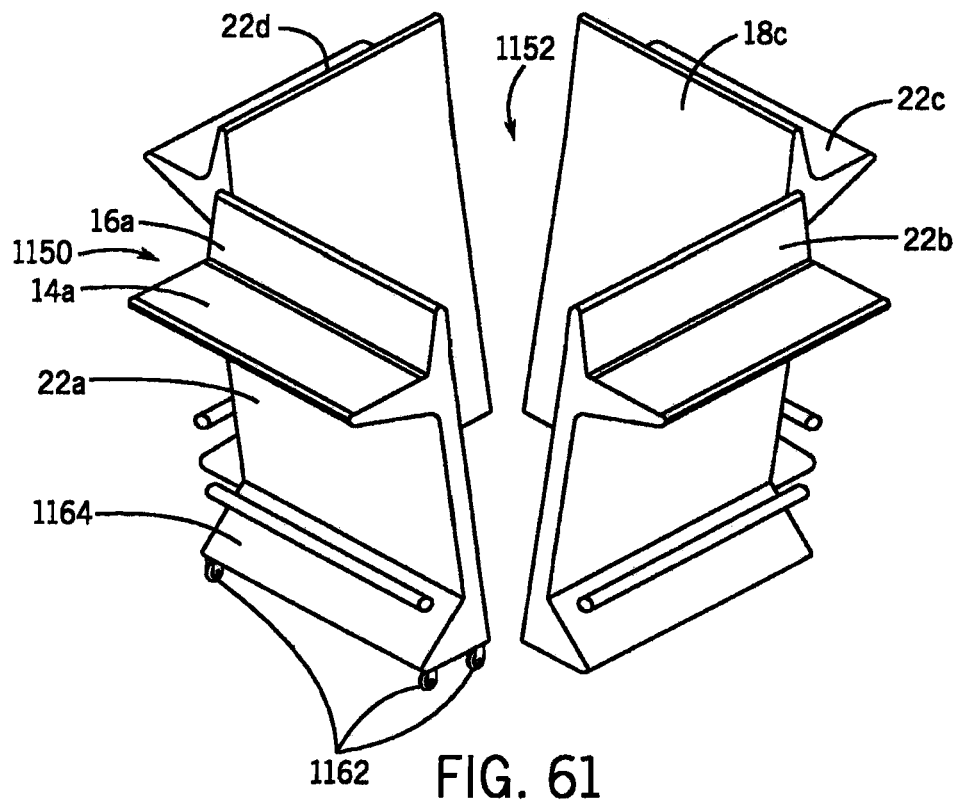
Figure 62:
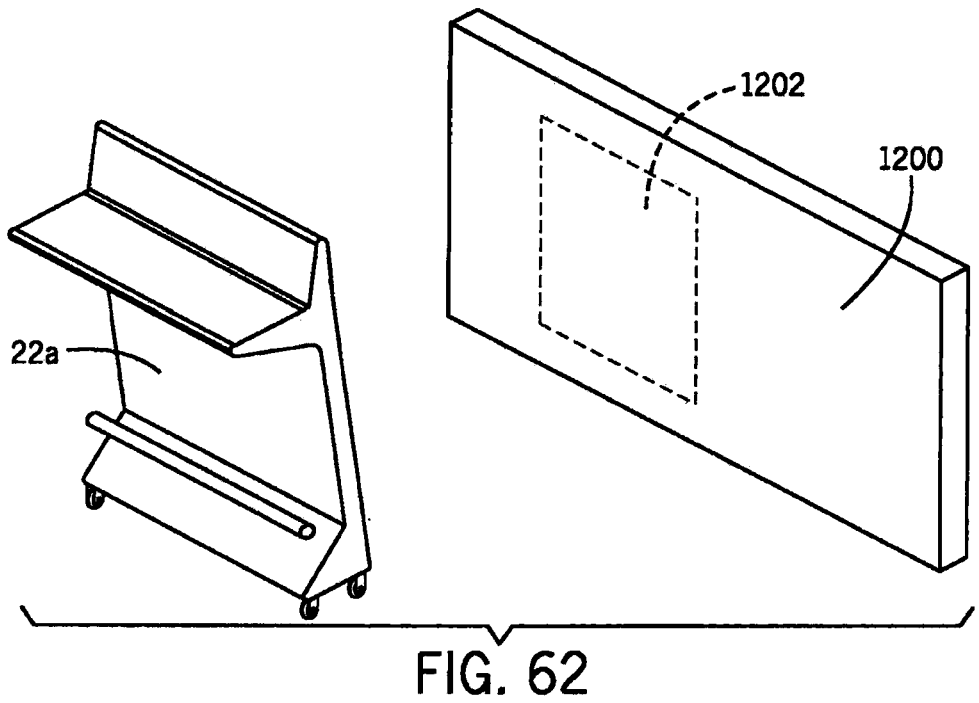
Figure 63:
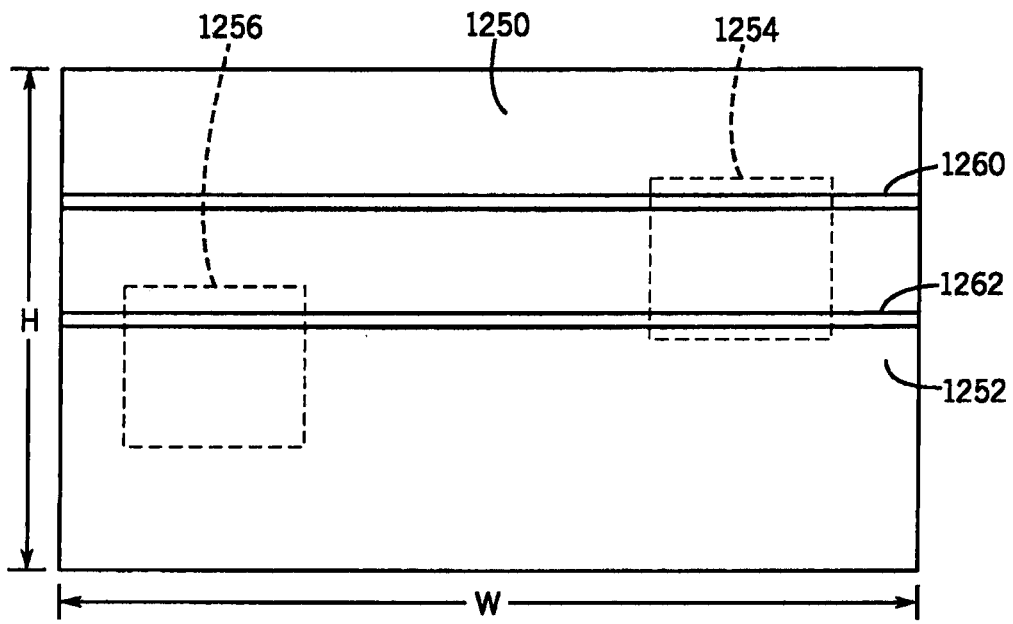
Figure 64:
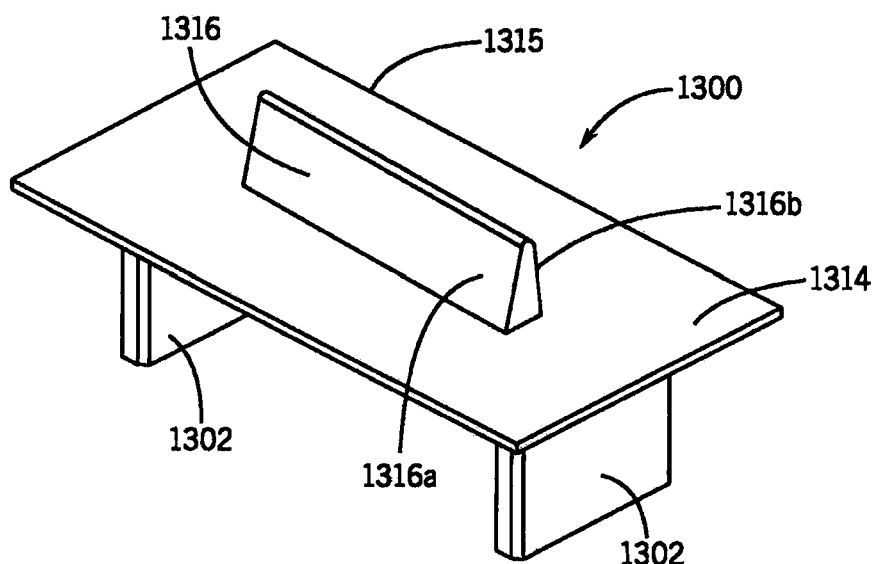
Figure 65:
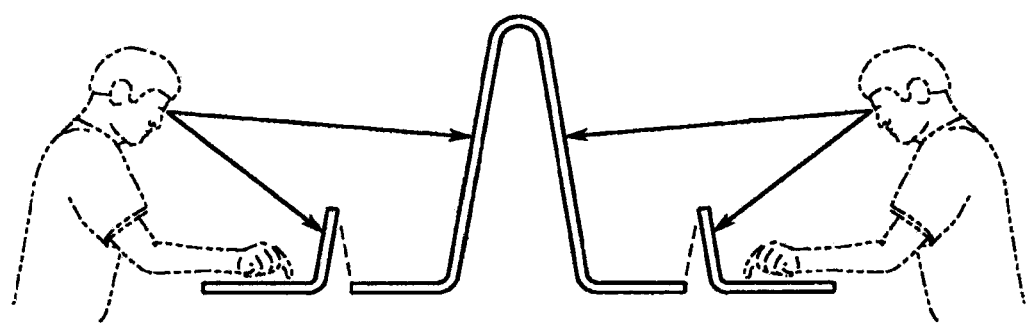

FIG. 7 seven is the rear plan view of the subassembly shown in FIG. 5;

FIG. 8 is a side to plan view of the subassembly of FIG. 5;

FIG. 9 is a top plan view of the subassembly of FIG. 5;

FIG. 10 is a bottom plan view of the subassembly of FIG. 5;

FIG. 11 is a partial cross sectional view of one version of the FIG. 5 subassembly;

FIG. 12 is a cross sectional view of a second version of the FIG. 5 subassembly;

FIG. 13 is a schematic diagram showing a set of components that may be used to configure a sharing system according to at least some aspects of the present disclosure;

FIG. 14 is a partial cross sectional view showing how two subassemblies like the subassemblies of FIG. 5 may be secured together as shown in FIG. 1;

FIG. 15 is a view of a virtual desktop that may be formed on the emissive surface portion of the FIG. 5 subassembly;

FIG. 16 is a view of emissive surface portions of an exemplary workstation indicating at least one information presentation paradigm;

FIG. 17 is similar to FIG. 16, albeit showing an exemplary opt in action by a system user where, after the opt in action, the information presentation paradigm is modified;

FIG. 18 is similar to FIG. 16, albeit where the information presentation paradigm is again different after a user logs on to the system;

FIG. 19 shows an information presentation paradigm that may occur on the emissive surfaces of two workstation subassemblies that face each other as shown in FIG. 1;

FIG. 20 is similar to FIG. 19, albeit showing another information sharing paradigm;

FIG. 21 is similar to FIG. 19, albeit showing another information sharing paradigm for use with emissive surfaces of four workstation subassemblies as shown in FIG. 1;

FIG. 22 is similar to FIG. 19, albeit showing another information sharing paradigm;

FIG. 23 is a schematic of an information sharing icon that may be used to share content on different portions of emissive surfaces;

FIG. 24 is a schematic showing another sharing icon or tool;

FIG. 25 is similar to FIG. 24, albeit showing another sharing icon or tool;

FIG. 26 is similar to FIG. 4, albeit showing a top plan view of four workstation subassemblies as in FIG. 5 arranges about four sides of a square;

FIG. 27 is similar to FIG. 15, albeit showing interface tools corresponding to the arrangement of workstations shown in FIG. 26;

FIG. 28 is similar to FIG. 26, albeit showing another arrangement of workstation subassemblies;

FIG. 29 is similar to FIG. 26, albeit showing another arrangement of workstation subassemblies;

FIG. 30 is similar to FIG. 1, albeit showing an assembly including relatively long workstation subassemblies;

FIG. 31 shows a top plan view of a long workstation subassembly where a user's desktop can move along to different locations along the length of the workstation;

FIG. 32 is similar to FIG. 31, albeit showing a condition where a user's desktop is enlarged;

FIG. 33 is similar to FIG. 32, albeit showing a condition where a user's desktop is reduced in size when a second system user requires a desktop at the side of an assembly;

FIG. 34 is a perspective view of an emissive surface subassembly that is consistent with at least some aspects of the present invention;

FIG. 35 is a perspective view of cameras supported proximate the top edge of an emissive surface to capture images of conferees spaced apart there from;

FIG. 36 is similar to FIG. 35, albeit showing a larger number of cameras;

FIG. 37 is similar to FIG. 36, albeit showing a ribbon of surface pixels that can operate to provide a virtual camera at any location along the top portion of the assembly;

FIG. 38 is a partially exploded perspective view of another workstation subassembly that is consistent with at least some aspects of the present disclosure;

FIG. 39 is a perspective view of two emissive surface shapes that are consistent with at least some aspects of the present disclosure;

FIG. 40 is a side plan and partially schematic view of another configuration that is consistent with at least some aspects of the present disclosure;

FIG. 41 is similar to FIG. 40, albeit showing another configuration;

FIG. 42 is a perspective view of another station configuration that is consistent with some aspects of the present disclosure;

FIG. 43 is a side plan view of the assembly of FIG. 42;
FIG. 44 is a top plan view of the assembly of FIG. 42;

FIG. 45 is a cross sectional view of the assembly of FIG. 42;

FIG. 46 is similar to FIG. 44, albeit showing three virtual desktops at different locations about the assembly;

FIG. 47 shows a base portion of the assembly of FIG. 42;

FIG. 48 shows a cross sectional view of the base portion of FIG. 47;

FIG. 49 shows a top plan view of the base portion of FIG. 47;

FIG. 50 is a side plan view similar to FIG. 43, albeit showing an assembly that includes a relatively shorter base portion;

FIG. 51 is similar to FIG. 50, albeit showing a flat base portion;

FIG. 52 is a perspective view of another structure consistent with at least some aspects of the present disclosure;

FIG. 53 is a side plan view of the structure of FIG. 52;

FIG. 54 is a side plan view of another configuration consistent with at least some aspects of the present disclosure;

FIG. 55 is a side plan view of another configuration including workstation subassemblies as well as other far emissive surfaces that reside behind conferees within a space;

FIG. 56 is similar to FIG. 55, albeit including a different workstation subassembly;

FIG. 57 is similar to FIG. 56, albeit where the configuration does not include the far emissive surfaces and where the workstation assembly is for supporting conferees at a sitting height;

FIG. 58 shows yet another workstation configuration in side schematic view;

FIG. 59 shows a workstation configuration is schematic view where portions of the station can change shape;

FIG. 60 is similar to FIG. 59, albeit including a different set of components where relative juxtapositions of emissive surfaces can be altered to accommodate conferees using the workstations for different purposes;

FIG. 61 is a perspective view of four portable workstations that have been moved into an arrangement suitable for sharing content;

FIG. 62 is a perspective view of a portable workstation juxtaposed with respect to another emissive surface for configuring a multi-emissive-surface configuration;

FIG. 63 is a front elevational view of an emissive wall structure that is consistent with at least some aspects of the present disclosure;

FIG. 64 is a perspective view of yet another workstation structure including emissive surfaces arranged according to at least some aspects of the present disclosure; and FIG. 65 is a side plan view of yet one more curved emissive surface configuration that is consistent with at least some aspects of the present disclosure.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE DISCLOSURE

The various aspects of the subject disclosure are now described with reference to the figures wherein like reference numerals correspond to similar elements throughout the several views. It should be understood, however, that the figures and detailed description hereafter relating thereto are not intended to limit the claimed subject matter to the particular form disclosed. Rather, the intention is to cover all modifications, equivalents, and alternatives falling within the spirit and scope of the claimed subject matter. To this end, the word "exemplary" is used herein to mean serving as an example, instance, or illustration. Any aspect or design described herein as "exemplary" is not necessarily to be construed as preferred, advantageous or required over other aspects or designs.

Furthermore, to the extent that the disclosure describes computers or computer processes, the disclosed subject matter may be implemented as a system, method, apparatus, or article of manufacture using standard programming and/or engineering techniques to produce software, firmware, hardware, or any combination thereof to control a computer or processor based device to implement aspects of the disclosure detailed herein. The phrase "article of manufacture" (or alternatively, "computer program product") as used herein to refer to software of computers is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick).

Hereinafter the phrase "emissive surface" will be used to refer to any surface that is configured to be able to or is capable of displaying visual output of computer software programs, computer systems, video drivers or the like. For instance, an emissive surface may be constructed using plasma, LCD, LED, OLED or any other technology used in televisions and computer monitors today or any other technology developed in the future for generating images via a surface. As another instance, an emissive surface may include a light receiving surface that either reflects projected light or that glows when subtended by a projected light beam as in the case of front or rear projected imaging technology. As one other instance, glass or transparent plastic see through displays or monitors may also be emissive surfaces. Companies that have developed transparent display technology include Samsung, Planar and Hewlett Packard (see U.S. Pat. No. 8,212,744). Other types of emissive surfaces are contemplated and clearly new technologies for providing emissive surfaces are being developed today and will be developed in the future and at least some embodiments of the present disclosure will be able to be used with any types of emissive surfaces.

In general, the present disclosure provides emissive surfaces that are arranged or juxtaposed with respect to other furniture artifacts or components such that the surfaces and other components provide work stations or spaces that are optimized for various types of work and collaborative activities. To this end, referring generally to FIGS. 1 through 4 wherein like reference numerals correspond to similar elements throughout the several views, an exemplary standing height table configuration 10 includes emissive surfaces and other furniture artifacts configured to optimize four work stations 12a, 12b, 12c and 12d for both individual work by persons at the stations and collaborative work between two, three or four persons at the stations.

In addition to providing horizontal emissive surfaces for persons at each work station, configuration 10 also provides substantially vertical emissive surfaces for persons at each work station where the term "substantially" means nearly, approximately, within a small range of, etc. For example, for station 12a, configuration 10 provides horizontal emissive surface 14a as well as generally vertical near and far emissive surfaces 16a and 18b, respectively. For collaborative work, configuration 10 enables persons at stations 12a through 12d to share information with others at other stations about configuration 10 via emissive surfaces facing the other stations. For instance, to share information with a person at station 12c, a person at station 12a may cause at least a subset of that person's content (e.g., the output of a software application, a desktop image, etc.) to be displayed on surface 18d which faces the person at work station 12c. In other cases the person at station 12a may share with a person at station 12c by presenting content on surface 16c (i.e., the near surface for station 12c). The person at station 12a may share with persons at all of other stations 12b through 12d at the same time by presenting content on one or more emissive surfaces facing persons at each of stations 12b through 12d.

Because emissive surfaces 16a, 16b, etc., are near persons that use those surfaces when compared to surfaces 18a, 18b, etc., surfaces 16a, 16b, etc., are referred to herein generally as "near surfaces" and surfaces 18a, 18b, etc., are referred to herein generally as "far surfaces". In addition, because content in many systems consistent with at least some aspects of the present disclosure may be shared among station users by presenting the content within the space 20 open in the center of configuration 10, space 20 is referred to generally herein as a "sharing space". Moreover, in at least some parts of this disclosure, because surfaces 16a, 16b, etc., face outwardly of configuration 10 and surfaces 18a, 18b, etc., face inwardly toward sharing space 20, surfaces 16a, 16b, etc. are sometimes referred to as outer emissive surfaces and surfaces 18a, 18b, etc., are sometimes referred to as inner emissive surfaces.

It should be appreciated that while configuration 10 enables persons to work independently using various emissive surfaces and also encourages collaborative sharing with others about configuration 10, the configuration leaves lines of sight between persons about configuration 10 completely unobstructed during sharing activity while still providing shared information at locations that are easy to view without appreciably turning away from a person with which information is being shared via configuration 10. To this end, see FIG. 2 where configuration 10 components are generally located below a line of sight between persons (see phantom) at facing stations on opposite sides of configuration 10. The locations of the emissive surfaces and the lines of sight provide at least semi-private emissive surfaces 16a, 16b, etc. (e.g., the near surfaces), and enable persons to view collaborative materials while still being able to easily establish eye to eye contact with each other. For instance, in FIG. 2, a person at station 12b may share content with a person at station 12a via emissive surface 18b while viewing the same content on surface 18a and the two persons can easily look slightly up from the shared content to make eye to eye contact with minimal effort. This juxtaposition not only enables sharing, the juxtaposition encourages collaborative content sharing.

In general many configurations that are consistent with at least some aspects of the present invention include emissive shapes that are arranged in a plain, ridge and valley juxtaposition. For instance, referring again to FIGS. 1 and 2, configuration 10 includes horizontal plain surfaces collectively labelled 14 akin to a geographical plain in that the surfaces are generally flat and substantially horizontal. Configuration 10 also includes ridge structures collectively labelled 16 that rise up from the plain surfaces (e.g., 14a) and that support ridge emissive surfaces (e.g., 16a). In the FIGS. 1 and 2 embodiment, each ridge structure 16 slopes downward into an open valley space 20 to provide valley emissive surfaces 18a, 18b, etc. This general plain-ridge-valley structure is particularly useful in many configurations as can be seen from a perusal of other embodiments shown in the figures and described hereafter.

Referring again to FIGS. 1 through 4, exemplary configuration 10 components include first through fourth emissive totem assemblies or stations 22a, 22b, 22c and 22d, first and second spacer table top members 24 and 26 and first and second end table top members 28 and 30. Each of totem assemblies or stations 22a through 22d has a similar construction and operates in a similar fashion and therefore only assembly 22a will be described here in detail.

Referring now to FIGS. 5 through 10, totem assembly 22a has an overall shape with features that result in advantageous juxtapositions of emissive surfaces. While the shape of totem assembly 22a is described here as including separate members or components that together form the illustrated shape in order to simplify this explanation, it should be appreciated that subsets of the structural components or members that define the totem shape may be integrally formed. For instance, assembly 22a in FIG. 8 includes, among other components, a base member 32, a wall member 34 and a horizontal member 36 that together form the illustrated shape. In at least some embodiments the base, wall and horizontal members may be integrally formed or constructed.

In addition, it should be appreciated that the structure of the totem may take any of several different forms depending upon the technology used to provide the emissive surfaces and that it is the emissive surfaces and their relative juxtapositions irrespective of the structure used to suspend the emissive surfaces in space that comprise at least one aspect of the present disclosure. For instance, in FIG. 2, the relative juxtapositions of emissive surfaces 14a, 16a and 18a render totem assembly 22a useful in constructing configurations like the FIG. 1 configuration that facilitates and encourages individual and collaborative use of the assembly and the structure provided to suspend the surfaces in their relative juxtapositions, while necessary, may take any of several different forms. For example, the supporting structure 30 may be a solid integrated structure as illustrated in FIGS. 1 and 8 or may include a plurality of flat panel arm support structures like arm structures currently manufactured by various companies including Steelcase of Grand Rapids Mich. where each arm assembly supports one or more flat panel emissive surfaces.

As another example, in the case of thin LED display screens that form the emissive surfaces, the structure to support the surfaces would be very different than the structure used to form a projector imaging surface for receiving projected content from a projector within or outside the totem assembly 22a. For this reason, unless indicated otherwise, the shape of totem assembly 22a is described in the context of the juxtaposition of the emissive surfaces specifically as opposed to by describing the specific mechanical structure that suspends the surfaces in space.

Referring specifically to FIG. 8, exemplary totem assembly 22a includes support structure 30 including base member 32, upright and generally vertical wall member 34 that has vertical ridge structure 16 disposed at a top end and generally horizontal work surface forming member 36. Base member 32 includes a horizontally extending foot member which is configured to contact or secure to a floor surface (not illustrated) and to hold totem assembly 22a in the illustrated upright orientation. In other embodiments base member 32 may include mechanical fasteners of some type to rigidly secure totem assembly 22a to a supporting floor surface.

Wall member 34 is connected to and extends upward from base member 32 and, in at least some embodiments, ridge member 16 is integrally formed with and extends upward from wall member 34. Horizontal member 36 extends to a front side of the wall/ridge structure 34/16 with ridge structure 16 extending generally upward from a rear edge of horizontal member 36. In the case of the exemplary standing height table configuration of FIGS. 1 through 10, the top end of totem assembly 22a is approximately 46 inches above the supporting floor surface but may be anywhere from 40 inches (i.e., in the case of a table for use by children) to 55 inches from the supporting floor surface. In sitting or lounging embodiments described hereafter, the height of the top end of totem assembly 22a will be lower. In general, the height of the top end of totem assembly 22a should be high enough that a ridge emissive surface supported thereby is useable by a totem assembly user as a primary near display screen but low enough that the wall and components supported thereby will not obstruct a user's view over the top end and into a valley or sharing space (see again 20 in FIG. 1) there behind or an eye to eye view with a person standing on the opposite side of the wall 34.

Referring still to FIG. 8 and also to FIG. 11, support structure 30 supports substantially horizontal emissive surface 14a, near or outer emissive surface 16a and far or inner emissive surface 18a. Far emissive surface 18a is supported on the rear side of support wall member 34 to face a direction opposite the direction in which member 36 extends. While surface 18a is generally vertical, surface 18a is slightly angled to slope from bottom to top along a rear to front trajectory so that surface 18a is more easily observable by a person standing to the side of assembly 22a opposite the side on which a user of the assembly 22a would stand than it would be if surface 18a were completely vertical. For instance, in at least some embodiments surface 18a may form an inner surface angle a1 with a horizontal plane 17 (see FIG. 8) through the lower edge of surface 18a anywhere in the range of 60 degrees to 90 degrees. In some embodiments the inner surface angle with the horizontal plane may be between 75 and 85 degrees. In other embodiments the inner surface angle with the horizontal plane may be within the range of 77 and 84 degrees. In particularly advantageous embodiments experiments have shown that the inner surface angle a1 with the horizontal plane may be 82 degrees.

The inner surface angle a1 should be selected depending on how totem assembly 22a is ultimately going to be used with other totems to configure table, lounge or other configurations. For instance, where totem 12a is to be configured along with other totems (e.g., 22b, 2c, etc.) to form a sharing configuration as in FIG. 1, angle a1 may be selected in part as a function of the dimension across the sharing space 20 between facing inner surfaces 18a and 18b. For example, where the dimension between surfaces 18a and 18b is relatively small (e.g., 12 inches), angle a1 may be smaller (e.g., 65 degrees) so that surface 18a opens relatively more upward to better face a person using totem 22b across from surface 18a. Where the dimension between facing inner surfaces 18a and 18b is relatively large (e.g., 30 inches), angle a1 may be larger (e.g., 82 degrees) so that surface 18a opens relatively less upward to better face a person using totem 22b across from surface 18a.

While emissive surface 18a is shown in FIG. 11 as covering only a portion of the rear surface of totem assembly 22a, in other embodiments emissive surface 18a may completely cover the rear surface of assembly 22a. In this regard, see again FIG. 1 where it should be appreciated that while a person using station 12a will be able to see most of surface 18b within the valley space 20, very few people would be able to easily see the bottom portion of surface 18b and therefore surfaces 18a, 18b, etc., may, as in FIG. 11, not extend all the way or substantially all the way to the supporting floor surface. Experiments have demonstrated that a particularly useful configuration includes a surface 18a that extends from the top edge of totem 22a downward approximately 22.5 inches. If emissive surface materials and structures become extremely inexpensive as expected, it may be useful to provide emissive surface material that extends to the supporting floor surface for some additional purpose such as to provide a glowing light source within the valley space either all the time or whenever a configuration is used by a configuration user.

Referring still to FIGS. 1 and 8, near or outer emissive surface 16a is supported on the front side of support structure 30 to face a direction opposite the direction in which far or inner emissive surface 18a faces. While surface 16a is generally vertical, surface 16a is slightly angled to slope upward from bottom to top along a front to rear trajectory so that the surface 16a is more easily observable by a person standing to the front of totem assembly 22a than it would be if the surface were completely vertical. In the illustrated embodiment, emissive surface 16a is sloped at an outer surface angle a2 with a horizontal plane 19 that is approximately 77 degrees while angles within a range of 60 to 90 degrees are contemplated. In other embodiments the angles a1 and a2 may be substantially similar (e.g., both angles a1 and a2 may be approximately 77 degrees).

The outer surface 16a, in general, will only be used by a person located on the front side of totem 22a adjacent support member 36 and therefore angle a1 should be selected to optimize viewing from the front side of totem 22a. To this end, angle a1 should be selected based on the height above a supporting floor at which the support structure suspends surface 16a in space and the eye height of an average person that is going to use totem 22a.

While emissive surface 16a is shown in FIG. 11 as covering substantially the entire front surface of ridge structure 16, in other embodiments emissive surface 16a may be framed by a bezel or otherwise cover only a portion of the front surface of structure 16.

In at least some embodiments a particularly advantageous height dimension of ridge 16 between a top surface of member 36 (i.e., between horizontal emissive surface 14a) and the top end of totem 22a is approximately eight inches. This dimension provides surface 16a with a height dimension that is particularly useful for presenting information to a station user and that allows support of horizontal surface 14a at a height that is ergonomically correct for most configuration users. In particular, the 8 inch ridge height dimension is similar to the height dimensions of laptop computers that are in common use today and that have a form factor that people are generally used to and comfortable using. Other ridge heights are contemplated and may include a height anywhere within the range of five inches and 15 inches.

Horizontal emissive surface 14a is supported at the lower edge of near emissive surface 16a and extends horizontally therefrom to the front side of totem assembly 22a. Surface 14a is suspended at approximately thirty-eight inches from the support surface in the illustrated embodiment. Surface 14a may be suspended at other heights within a range between thirty and forty inches from the support surface. While shown as horizontal, in at least some embodiments surface 14a may be sloped slightly downward from a rear edge toward a front edge to accommodate a user that prefers an angled input surface. Experiments have shown that a particularly useful depth dimension of surface 14a between a front edge 171 and a rear edge 172 is approximately twelve inches which gives enough space for various types of virtual input devices and also enables a station 12a user to be close enough to near surface 16a to contact that surface if that surface is touch sensitive. Other embodiments are contemplated where the depth dimension of surface 14a is between seven and twenty inches.

Each of surfaces 14a, 16a and 18a have similar width dimensions in the illustrated embodiment. Although the common width dimension may be anywhere within a range including 24 to 52 inches, experiments have shown that particularly useful embodiments include width dimensions in the 28 to 32 inch range with a particularly useful width of 30 includes. The particularly useful range of 28-32 inches is comfortable for a user to gesture on and provides viewing surfaces that are narrow enough for typical users to view without causing substantially fatigue. In other embodiments it is possible that the surfaces provided by one totem 22a may have different width dimensions. For instance, surface 18a may extend from edge to edge of the totem 22a while surface 16a may have 4 inch non-emissive portions along each lateral edge.

Referring once again to FIG. 11, in the illustrated embodiment emissive surfaces 14a, 16a and 18a are formed as separate flat panel surfaces which may be configured using various flat panel or thin display technologies (e.g., LED, LCD, etc.). In other embodiments, it is contemplated that one or all of the emissive surfaces 14a, 16a and 18a may be integrally formed with bent or curved emissive surface sections there between. To this end, see FIG. 12 that shows a single emissive surface 75 that includes planar portions 14a, 16a and 18a that are integrally formed with curved portions 74 and 76 there between. The curved portions 74 and 76 may have various radii of curvature anywhere within a range of 0.25 inches to 3 inches. In particularly useful embodiments it is believed that radii of curvature of approximately 0.5 inches for portion 76 and 1.0 inches for portion 74 will be advantageous. Various companies including Sony, Phillips, LG, Microsoft and Samsung have developed emissive surface technology which enables configuration of curved or flexible or bendable display screens (see, for instance US patent application Nos. 1999/0219247 and 2010/0060548). Any of these technologies may be used to configure the integrated and contoured multi-plane emissive shape shown in FIG. 12 or other contoured shapes disclosed in this specification. For instance, in FIG. 12, where emissive surface 75 is flexible, surface 75 may simply be adhered to a support structure 30 having the illustrated shape to configure totem assembly 22a.

Referring now to FIG. 13, in addition to the support structure 30 and the emissive surfaces 14a, 16a, 18a, totem assembly 22a, in at least some embodiments, will include a processor 50, a local memory 52, horizontal, near and far surface drivers 54, 56 and 58, respectively, a network link 60 and a device coupler 62.

Processor 50 may be any of several different computer processors from Intel, AMD, Apple, or other manufacturers. Processor 50 is linked to each of memory 52, drivers 54, 56 and 58, network link 60 and device coupler 62. Processor 50 provides content to drivers 53, 56 and 58 for driving emissive surfaces 14a, 16a and 18a, respectively. Local memory 52 stores a basic operating program and temporarily stores content such as the output of computer applications including user controlled applications, internet or other network news and content feeds, etc.

The operating system run by processor 50 receives content for the emissive surfaces and runs programs to determine how to arrange the content received based on whether or not the totem 22a is being used to provide emissive surfaces for individual station use or to share content among two or more configuration 10 users, user preferences, user input via emissive surfaces 14a and 16a, content received from other user work stations located at configuration 10 and, in at least some embodiments, content received from other workstations provided on other emissive surfaces, and arranges the content to generate output to drive the emissive surfaces 14a, 16a and 18a. For instance, referring again to FIG. 1, a first user at totem 22a may want to use surfaces 14a, 16a and 18b to access content to facilitate individual activities. In this case processor 50 would drive surfaces 14a and 16a and would provide content as output to the processor associated with totem 22b to drive surface 18b. Similarly, if a second user at totem 22b is performing individual activities, the totem 22b processor would drive emissive surfaces 14b and 16b as well as provide content to first totem 22a processor 50 to drive valley surface 18a for viewing as a far surface for the second user. If the first user at totem 22a decides to share some first user content with the second user at second totem 22b, processor 50 may provide content for each of valley surfaces 18a and 18b so that both the first and second user can view the shared information at the same time.

Referring still to FIG. 13, in at least some embodiments each totem processor 50 may be linked to other totems via network links 60 and a system server 70 that manages the exchange of content between the totem processors. Link 60 may be wired or wireless. Server 70 may be located remotely from configuration 10 or may be housed within one of the configuration 10 totems. Server 70 may also be linked to other configurations 131, 133, etc., to enable content sharing and general communication with additional work stations provided via additional emissive surfaces either within the conference space in which configuration 10 resides or in other locations (e.g., other conference spaces within a facility, other spaces remote from the facility in which configuration 10 resides, etc.).

Content may be obtained from at least two primary sources. A first content source includes user personal portable computing devices. In this regard, referring again to FIG. 13, device coupler 62 may be linked to a user's portable device to obtain content therefrom. Portable devices may take many different forms including laptop computers, smart phones, pad type computing devices, simple memory devices, etc. Coupler 62 may also take many different forms including one or more cables including device linking sockets at distal ends, wireless couplers using IR, RF or other wireless communication technologies, etc. In particularly useful embodiments the coupler 62 may include a wireless sensor located below a portion of horizontal surface 14a. In this case, when a user intends to couple a portable device to processor 50, processor 50 may generate an image of a coupler (e.g., an antenna) above the wireless sensor to encourage the user to place the device on surface 14a within an area within a sensing zone associated with the sensor. The coupler image may be removed after content is obtained from the device to signal that the device may be removed and stored after content retrieval.

Once a portable personal device is linked to totem processor 50, the portable device can either be used to provide user content which is then presented via programs run by server processor 50 or the totem can simply operate as an input/output configuration for the portable device where the portable device itself runs application programs controlled by input from the totem and providing output to the totem to drive emissive surfaces. For instance, a user's portable device may provide a file including a word processor document which is used as input to a word processor program run by processor 50 to generate content for a window provided on surface 16a or the user's portable device may be used to run an instance of the word processor program where the application program receives input when a user contacts a virtual interface provided via the emissive configuration surfaces and provides output to the processor 50 to be used to drive the surfaces.

Referring still to FIG. 13, the second primary source or user content includes one or more content servers 69 linked to the totem processor 50 via system server 70. In at least some embodiments it is contemplated that a system user will not need to carry any personal computing device and instead, all of her personal content will be available at any location where the user's identity can be confirmed and where the user has access to emissive surfaces that can be used to present the content. In this case, the user's content, including application programs, preferences, documents, databases (e.g., contacts, calendars, etc.) are all stored via content server 69 and are accessible after user identity is confirmed.

Some systems will be equipped to enable users to access content from both portable user devices and remote content servers (e.g., 69). For instance, as with laptop and desk top computers today, a totem user may have several windows opened up on station emissive surfaces where some of the windows present content from linked user devices while other windows present content obtained from a network linked database.

A third content source may include one or more news servers or other information service servers (not illustrated) that may mine information of interest to specific users and present that information via at least a portion of one of the emissive surfaces that form a work station.

While configuration 10 is described above as including totems that each include a separate processor 50 where the totem is linked to a larger information and communication system via a system server 70, it should be appreciated that other embodiments may include only a single processor 50 for driving all of the configuration 10 emissive surfaces. In addition, system server 70 may be eliminated in some embodiments and the processes performed thereby may be performed by one or more of the totem processors 50. In other embodiments server 70 may run user application programs as well as the programs to determine which content to present on which emissive surfaces and to format content to present via the emissive surfaces and processors 50 may simply run stripped down programs to provide user input and information related to conditions sensed by totem sensors to server 70 and to receive content or application program output to present via the surfaces. For this reason, hereafter, unless indicated otherwise, the processor or processors and/or server that control system surfaces and run programs to perform the various processes described herein will be referred to generally as a system processor or system processors.

Referring again to FIGS. 1 through 4, in most embodiments horizontal emissive surfaces like surface 14a will include a touch sensitive surface so that a user can interact with and control content presented thereon. For instance, referring again to FIG. 13 and also to FIG. 15, in at least some embodiments a totem processor 50 will be programmed to provide a virtual keyboard 90 via horizontal surface 14a for use by a person at the first station 12a (see also FIG. 1). Keyboard 90 can be used to interact with software applications run by processor 50 for entering text, numbers, etc. In addition, other touch sensitive input tools may be provided via surface 14a such as a virtual touch pad 92 for controlling a cursor or the like on surfaces 16a and 18b.

Near emissive surface 16a, in at least some embodiments, will be positioned close enough to a station user that the user will be able to physically contact surface 16a with a finger or the like. In at least some embodiments near emissive surface 16a may also be touch sensitive so that a user can gesture via surface 16a and can use virtual input tools presented thereon to interact with software applications run by processor 50, server 70 or a personal computing device. For instance, virtual touch pad 92 shown in FIG. 15 may be presented on surface 16a as opposed to on surface 14a.

Referring again to FIG. 15, in at least some embodiments the top portion of the ridge 16 may include a functional area 100 that includes, among other things, a camera 99, virtual icons for accessing applications that are routinely utilized by a specific user such as a calendar icon, a contacts icon, a Facebook icon, a Twitter icon, etc., one or more microphones, input surfaces reserved for specific user control gestures, etc.

Referring once again to FIGS. 1 through 4, table top members 24, 26, 28 and 30 are, in at least some embodiments, simple and rigid planar table top members forming work surfaces that can be mounted between adjacent lateral edges of totem assemblies 22a through 22d to provide a larger table configuration as shown. Any mechanical fastening mechanism may be used to mount members 24, 26, 28 and 30 to the totems. For instance, referring to FIG. 14, metal brackets 80 and 82 are shown mounted to support structures (e.g., 30) and secure to undersides of member 24 so that the totem structures, in addition to supporting the totem components, also support table top member 24. Similar brackets may be provided for each of the other table top members 26, 28 and 30.

Referring again to FIGS. 1 through 4, in the illustrated embodiment, totem assembly 22b is positioned opposite totem assembly 22a with a valley or sharing space 20 there between separating far surface 18a from far surface 18b. In at least some advantageous embodiments the distance between top edges of facing surfaces 18a and 18b may be approximately 26 inches. In other cases other valley dimensions are contemplated where surfaces 18a and 18b are separated by anywhere between 12 and 40 inches, dispending on the configuration to be formed. Totem assembly 22d is positioned opposite totem assembly 22c with valley or sharing space 20 there between separating far or inner surface 18c from far or inner surface 18d. Assemblies 22c and 22d are positioned laterally adjacent assemblies 22a and 22b so that far surfaces 22a and 22c are coplanar and surfaces 22c and 22d are coplanar. Spaces are provided between adjacent surfaces of assemblies 22a and 22c and between adjacent surfaces of assemblies 22b and 22d to accommodate top members 24 and 26 that are mounted there between. End table members 28 and 30 are mounted between aligned ends of totems 22a and 22b and totems 22c and 22d, respectively.

Referring again to FIG. 1, in at least some embodiments horizontal emissive surfaces 14a through 14d are all flush with the top surfaces of members 24, 26, 28 and 30. In other embodiments the emissive surfaces 14a through 14d may be either recessed from top surfaces of members 24, 26, 28 and 30 or may stand proud thereof. Where the emissive surfaces and top surfaces of members 24, 26, 28 and 30 are flush, the entire top surface including the emissive surfaces and top surfaces of members 24, 26, 28 and 30 may be provided by a single piece of glass or other material to provide a particularly attractive and seamless appearance. In addition to being attractive, the single glass top surface would also be easy to keep clean and would likely be more sanitary than a structure that includes seams between adjacent surfaces.

The spaces formed between totem assemblies 22a, 22b, 22c and 22d, in addition to providing additional personal space for station users, also operate to delineate one person's space from another person's space at configuration 10. In this regard, when a person walks up to configuration 10, the person will naturally be guided by the different appearances of the emissive surfaces and the table top surfaces to one of the station locations 12a through 12d. The additional space enhances the sense of privacy that a station user feels regarding information presented on the near surfaces 16a, 16b, etc. For instance, having an open space as in FIG. 1 between surfaces 16a and 16c clearly delineates one station user's space and content at station 12a from another person's space and content at the adjacent station 12c.

In at least some embodiments a system processor may run software for identifying system user identities based on biometrics. For instance, processor 50 in FIG. 13 may be linked to camera 99 (see FIG. 15) to receive images of a person at station 12a and to perform user recognition algorithms such as face recognition algorithms to determine the identity of the user located at totem 22a. Other biometric identification processes are contemplated such as finger print imaging, retina imaging, voice recognition systems, gesture recognition (e.g., a specific sequence of winks, smiles, frowns, etc.), etc.

Prior to recognizing a specific person adjacent a station (e.g., 12a), a system processor (e.g., 50 in FIG. 13) may be programmed to obtain and present general content such as newscasts, stock tickers, company logos, etc., on each of the near and far surfaces of configuration 10. In the alternative, a system processor may simply drive configuration 10 surfaces with light so that configuration surfaces appear to glow when not in use by particular users. In at least some cases configuration 10 may be controlled to glow until at least one person is within a short distance (e.g., 5 feet) of any of the configuration stations 12a through 12d and may, after sensing a proximate person, provide general content (e.g., news, stock ticker, etc.) to the person near the configuration. By glowing or providing content when not in current use by a system user, the configuration 10 provides an indication to persons within the space in which configuration 10 resides that configuration 10 is functional, active and ready for use. General content such as a stock ticker, videos of news stories, a cable or satellite television feed, etc., all encourage persons within a space to approach configuration 10.

Once a specific person adjacent one of the stations is recognized (e.g., via face, retina, other biometric analysis), a system processor associated with the station, in at least some embodiments, greets the specific recognized person with a personal message such as "Welcome Bill Brown". In at least some embodiments, it is contemplated that the welcome will be presented as an "opt in" token which can be used in an intuitive fashion by the greeted user to take control of one of the configuration stations (e.g., 12a). In FIG. 16 an exemplary opt in token is a round virtual opt in icon 170 presented on surface 14a. Icon 170 may be stationary or it may be animated in some fashion designed to encourage the greeted user to opt in and take control of or use the station. For instance, in at least some embodiments token 170 may move around on surface 14a repeatedly bouncing into and off a rear edge 172 of surface 14a simulating a "desire" to move past the edge and onto surface 16a to opt in. Here, in at least some cases the user can opt in by placing a finger or hand on icon 170 and moving the icon 170 from surface 14a to surface 16a.

Referring to FIG. 17, after a user drags icon 170 to surface 16a and releases the icon 170, processor 50 recognizes that the greeted person is opting to take at least some level of control of station 12a. In at least some embodiments, when a person initially opts in to control a station 12a, the system will be programmed to provide only semi-private or user specific "public" content via surfaces 14a, 16a and 18b until the user performs an additional or second level of opt in activity to ensure that the person clearly indicates a desire to access personal and potentially sensitive information. In this regard, user specific public content may include, for instance, a newscast including stories that a specific user has previously indicated an interest in or that are related to general topics of interest associated with the user, a stock ticker providing information on stocks that a particular user follows, weather or sports updates of interest to a particular user, etc. While the user specific public content is of interest to the specific user, this content would not include any information of a sensitive nature such as working documents, personal pictures, medical records, etc.

In the alternative, a user may not even want user specific private content to be displayed via far surface 18b when the user performs the first level of opt in activity. In this case, the user specific public content may only be provided via surfaces 14a and 16a while general public content continues to be presented via far surface 18b after the first level of opt in activity occurs.

The second level of opt in activity may include any type of user activity. For instance, in at least some embodiments, the second level of opt in activity may require a user to enter a user name and password to access user specific "private" content. As seen in FIG. 17, in this case, after the first level of opt in activity occurs, a system processor may be programmed to provide user name and password fields 180 and 182 via surface 16a as well as virtual keyboard 90 and virtual touch pad 92 via surface 14a for user name and password entry. As another instance, the second level of opt in activity may include an opt in gesture on one or both of surfaces 14a and 16a to access private information. An exemplary opt in gesture may require a sequence of movements on surface 14a akin to a user's signature or entry of a binary code of taps on surfaces 14a and 16a known only to the specific user. Other second level opt in activities are contemplated.

Referring to FIG. 18, after the second level of opt in activity successfully occurs, a system processor may access and present user specific private information on any of the surfaces 14a, 16a and 18b facing the user at station 12a or on a subset of the surfaces. Here, private information may include calendars, e-mails or text messages, personal documents or photos, output of various personal software applications, medical records, access/control screens for investment or bank accounts, etc. In some embodiments personal content may only be presented via surfaces 14a and 16a, at least initially, where the virtual on surface interface tools such as virtual touch pad 92 enables the user to move personal content onto far surface 18b. In other embodiments personal information may also initially be presented via far surface 18b.

In at least some embodiments it is contemplated that a user will have a travelling virtual desktop that specifies user specific public content and private content as well as which surfaces (e.g., near and far) and generally locations on the surfaces at which specific information should be initially presented when the different opt in activities occur. For instance, one user's desktop may present user specific public content via all surfaces 14a, 16a and 18b upon occurrence of the first level of opt in activity and may initially present user specific private content only on surface 16a upon occurrence of the second level of opt in activity, giving the user the option to move private content onto surface 18b if desired. While not shown, it is contemplated that the system processors would enable a user to set and change personal preferences via one of the stations 12a through 12d or via any other station which would then be used until subsequently modified by the user.

In at least some embodiments, control of content presented on emissive surfaces will have an initial intuitive default wherein all emissive surfaces that primarily face a system user at a specific station will initially be assigned to that user to display that user's content. Thus, for instance, referring to FIG. 19, when a first user logs on to the system at work station 12a, the first user may initially have control of each of emissive surfaces 14a, 16a and 18b. Similarly, when a second user logs on to the system at work station 12b, the second user may initially have control of each of emissive surfaces 14b, 16b and 18a.

After initial default control, control of at least a subset of the emissive surfaces may be completely egalitarian. For instance, control of the far emissive surfaces 18a through 18d may be available to any work station user on a simple request basis so that, regardless of who is currently controlling the far surfaces, any user can take over control of those surfaces to share content. For instance, referring again to FIG. 19, where a second user is currently presenting second user content via each of surfaces 16b and 18a, a first user at station 12a may simply enter a command that first user content currently on surface 18b should be presented via far surface 18a to share the first user content with the second user at station 12b. Once the command to share is received, referring to FIG. 20, the first user's shared content on surface 18b is duplicated on surface 18a for the second user to view. Similarly, referring to FIG. 21, first user content from surface 18b may be shared with each of second, third and fourth users via surfaces 18a, 18d and 18c, respectively, to facilitate four person collaborative sharing about configuration 10 (see again FIG. 1).

When the first user is sharing content via surfaces 18a through 18d, a second user at station 12b may take control of surfaces 18a through 18d by simply indicating that content from the second user's station should be shared with users at the other stations. In the alternative, the second user may simply opt to take control of a subset of surface 18a through 18d.

In at least some embodiments, when one user takes control of a surface from another user, the content previously presented by the other user on the surface being taken over may be presented in some persistent fashion on a surface still controlled by the other user. For instance, in FIGS. 1 and 2, assume that initially a first user at station 12a is viewing personal content via surface 18b when a second user at station 18b takes control of surface 18b to share information with the first user. In this case, when the second user takes control of surface 18b, referring again to FIG. 15, a small window 185 may be opened on surface 16a to present the content being replaced on surface 18b by the shared content from the second user. In this manner content and its arrangement by the first user is not lost when the second user takes control of surface 18b from the first user. After the second user takes control of surface 18b, if the first user wants to reassume control of surface 18b from the second user to continue previous individual activities, the first user can simply move window 185 to surface 18b to reassume control and represent the user's previous content in the initial fashion. Similarly, after the second user takes control of surface 18b, if the second user relinquishes control of surface 18b without another user taking control, window 185 from surface 16a may simply be automatically moved from surface 16a to surface 18b and represented in a suitable large surface format in the initial fashion.

In at least some embodiments, referring to FIG. 22, a configuration user may be able to share content from both the user's near and far emissive surfaces. In FIG. 22 the surfaces of stations 12a and 12b are shown with the first user's content shown on surfaces 16a and 18b for the first user and duplicated on surfaces 16b and 18a for the second user to view. While not shown, in at least some cases users may also share content on the horizontal surfaces (e.g., 14a, 14b, etc.).

While egalitarian control of at least the far surfaces 18a through 18d may be advantageous in some embodiments, in other embodiments it is contemplated that users at stations 12a through 12d may have to opt in to the egalitarian control paradigm to control surfaces facing other users as well as to allow other users to control surfaces that face the specific user. For instance, assume users at each of stations 12a through 12d are initially working individually and are not sharing any content. A first user at station 12a may want to share information with other users and may use surface 14a to send a general request to collaborate with others at stations 12b through 12d. Assuming a second user at station 12b accepts the invitation to share and that third and fourth users at stations 12c and 12d decline to accept, the user at station 12a would then be able to share content in an egalitarian fashion with the second user at second station 12b but not with users at either of stations 12c or 12d.

In still other embodiments, when a first user is sharing content, a second user may only be able to take control of the surfaces used to share the content after the first user relinquishes control. For instance, assume that a first user is sharing content via surfaces 18a and 18b in FIG. 1 and that a second user at totem 22b wants to take control of surfaces 18a and 18b to share a second set of content. Here, the second user may perform a gesture or sequence of gestures (e.g., select second set of content to share and a sharing icon (e.g., a hand icon as in FIG. 15) to indicate a desire to share. The second user's gestures would place the second set of content to be shared in a content queue and may cause a system processor to indicate (e.g., a small message window on surface 16a) to the first user that another user intends to share content after the first user has relinquished control. The indicator message may also provide the first user with an "relinquish control" or other similar icon to enable the first user to give up control to the second user. Once the first user relinquishes control of surfaces 18a and 18b, the second user's content would automatically be displayed via surfaces 18a and 18b.

In at least some embodiments it is contemplated that a user may be able to simultaneously present different content on different far emissive surfaces to achieve other desirable uses of the emissive surfaces. For instance, referring again to FIG. 1, while emissive surface 18d is not located directly in front of station 12a, a person located at station 12a may still have a fairly good view of the information presented on surface 18d. In at least some embodiments when there is no user at station 12c, a person at station 12a may either automatically have the ability to control surface 18d or may be given the option to control surface 18d. In at least some cases if a second user takes control of station 12c, a first user's content on surface 18d may be removed so that the second user can control content on surface 18d. In at least some cases when a second user takes control of surface 18d from a first user at station 12a, the first user's content from surface 18d may be represented in a smaller persistent fashion via, for instance, a new window opened up on a portion of surface 18b across from the first user.

As another instance, a first user at station 12a may want to share two different sets of content with other users about configuration 10. In this case, the first user at station 12a may cause a first set of content to be displayed via surfaces 18b and 18c and a second set of content to be displayed via surfaces 18a and 18d so that persons at stations 12a and 12c can see the first and second sets of content on surfaces 18b and 18d, respectively, and persons at stations 12b and 12d can see the first and second sets of content on surfaces 18c and 18a, respectively.

As still one other instance, a first user at station 12a may want to share different sets of content with different persons about configuration 10. In this case, the first user at station 12a may cause a first set of content to be displayed via surface 18c and a second set of content to be displayed via surface 18a so that persons at stations 12d and 12b view different sets of content on surfaces 18c and 18a, respectively.

Virtual tools for controlling content on the emissive surfaces 18a through 18d, in at least some embodiments, will be provided via the horizontal and/or near emissive surfaces (e.g., 14a and 16a, respectively). In this regard, see again FIG. 15 where exemplary control icons 110, 112, 114 and 116 that may be presented via horizontal surface 14a of station 12a in FIG. 1 are illustrated. Icon 110 includes a hand icon where a hand is opened to the left as shown to indicate a gesture for providing content to the station 12b to the left of station 12a (see again FIG. 1). Here, it is contemplated that when a user selects icon 110, content currently selected may be shared with a user at station 12c by presenting the information on one of the emissive surfaces associated with the user at station 12c. For instance, the sharing gesture associated with icon 110 may cause content to be shared to be presented via far surface 18d facing station 12c.

In at least some embodiments content may be selected for sharing by simply selecting a virtual window running an application on one of surfaces 16a or 18b. In other embodiments processor 50 may be programmed to share an exact duplication of content from a far surface on a far surface associated with a station selected to receive the shared content. For instance, in FIGS. 1 and 15, all content on surface 18a may be duplicated on surface 18d when icon 110 is selected to share with a person at station 12c. In still other embodiments, referring to FIG. 15, a user may simply drag and drop windows or other application output on to one of icons 110, 112, 114 or 116 to share content on surfaces associated with the icons.

In at least some embodiments when a window or application output is selected for sharing, an indication of the window or application may be provided within a share field 190 (see again FIG. 15) as a thumbnail icon 192, text indicating content to be shared, or as a small version of the actual window or output that appears on one of the station surfaces. In some cases a system processor may highlight content on station surfaces currently represented in field 190 for sharing. For instance, a window 194 open and displayed on surface 16a may have a yellow highlight indicating that the window is currently represented by an icon in field 190. Windows and application output that are currently shared may be differently highlighted on station surfaces and/or differently presented in field 190 based on whether or not the window or output is currently shared or has simply been selected to be shared. For instance, shared content windows or field icons may be highlighted green while window field icons selected to be shared but not yet shared may be highlighted yellow.

In some embodiments, when a first user shares content with a second user, a system processor may be programmed to present the shared content to the first user in the exact same fashion that the content is presented to the second user to ensure that the first and second users are viewing the exact same content in the exact same fashion. For instance, where first user content is shared with a second user via a large version of the content that takes up the entire area of surface 18a, the exact same large version of the first user's content may be presented via surface 18b so that both user's have the exact same information on their far surfaces 18a and 18b. Where shared information is presented in the same fashion to a sharing user that it is presented to others at configuration 10, the initial first user content on surface 18b may be presented in a smaller persistent window like window 185 (see again FIG. 15) for the first user so that the first user can flip back to the content and content arrangement viewed prior to the sharing activity when the sharing activity is complete. Other ways of selecting and indicating content for sharing are contemplated.

Referring again to FIG. 15, hand icon 112 may be selected to share selected content with a user at station 12d by presenting the shared content on surface 18c facing the user at station 12d. Similarly, hand icon 114 may be used to share selected content with a user at station 12b by presenting the shared content on surface 18a facing the user at station 12b. Multiple direction hand icon 116 may be selected to share selected content with users at all of the other stations 12b through 12d. Where a user at station 12a only wants to share content with two users at configuration 10, the station 12a user may sequentially select two of the three hand icons 110, 112 and 114 corresponding to the stations with which content is to be shared. Icons akin to icons 110, 112, 114, and 116 would be presented via surfaces of other stations 22b through 22d, albeit spatially arranged to align with the other configuration 10 stations in an intuitive fashion.

In other embodiments content in a specific window may be shared by dragging the content off a surface controlled by a station user toward another station. For instance, referring again to FIGS. 1 and 15, a first user at station 12a may touch and drag window 194 to the left edge of surface 16a to share content with a second user at station 12c. This dragging gesture may cause the window 194 selected to be shared to be presented via far surface 18d for viewing at station 12c. The dragging gesture may also cause the shared window 194 to be presented via surface 18b for viewing by the first user. Similarly, the first user may touch and drag window 194 to the top edge of surface 16a to share the content in window 194 via surface 18a with a user at station 12b.

In still other embodiments the dragging gesture to share may be replaced by a swipe gesture. For instance, to share window 194 content with a user at station 12c, the first user may contact a finger to window 194 and swipe to the left toward station 12c thereby duplicating the content in window 194 on surface 18d.

Where a system processor recognizes a sharing gesture but cannot determine from the gesture which content to share or which surfaces on which the content should be shared, the system processor may be programmed to provide tools to perform a short and intuitive process for selecting content and/or surfaces for sharing. For instance, where a totem processor 50 cannot determine which of three open windows include content to share based on an ambiguous gesture, processor 50 may highlight the three windows (e.g., via a yellow outline about each window) and present a command for the user to select one or more of the windows for sharing. As another instance, where the processor 50 cannot determine which station to share content with based on an ambiguous gesture, processor 50 may be programmed to present highlighted sharing hand icons (see 110, 112 and 114) for the user to select.

In at least some embodiments an additional step to indicate desire to share with another station may be required to ensure that content is not inadvertently and unintentionally shared with another system user. For instance, in FIG. 15 a "share" icon 197 is presented. In this case a sequence of activities to share content may require at least one selection of share icon 197. For example, referring also and again to FIG. 1, to share content from window 194 with a second user at station 12b, a first user at station 12a may select window 194, select sharing hand icon 114 and then select share icon 197 to complete the sharing sequence. As another example, the first user may swipe across window 194 toward station 12b and then select share icon 197 to complete a sharing sequence. Other virtual controls are contemplated.

Where content is shared, the shared content may be reformatted to fit the surface or surfaces on which the content is being duplicated or represented. For instance, where a user selects a relatively small window including content to be shared on a large far emissive surface (e.g., surface 18a), the content may be automatically reformatted to fit the larger surface in an optimized fashion. Similarly, when content is to be duplicated on a relatively smaller near surface (e.g., 16a), the content may be reformatted as appropriate.

In at least some cases a user may be able to select far or near surfaces as target surfaces on which to share information. In this regard, see FIG. 23 where an exemplary far/near virtual icon 120 is shown. Exemplary icon 120 includes a hand gesture image 122 indicating sharing with a station to the left of the station that presents the icon to a user. Icon 120 also includes near and far designators 124 and 126 which are independently selectable to duplicate selected content on the near and far surfaces associated with the station to the left. For instance, referring again to FIG. 1, where a user at station 12a selects content to share and then selects designator 124, the content to share would be duplicated on near surface 14c of station 12c and when designator 126 is selected, the content to share would be duplicated on far surface 18d across from a user at station 12c. Near/far designators akin to designators 124 and 126 in FIG. 20 are contemplated for each of the other stations at configuration 10.

Where user's log on with identifying information to use a station 12a, 12b, etc., or where the stations automatically recognizes identities of specific users, each sharing icon may also include the name or another identifying label for an associated user. Names or other labels on sharing icons may help user's feel more certain and comfortable with sharing information to facilitate collaboration and likely will make the overall system more intuitive to operate.

While configuration 10 is particularly advantageous for sharing information among a small group of persons located at stations 12a through 12d provided by configuration 10, in other cases it is contemplated that information may be shared among persons at two or more configurations 10, 131, 133, etc. linked together via a computer or communication network. Where content can be shared among persons at different configurations 10, 131, 133 in a space, it is contemplated that virtual icons for sharing content would be enhanced to enable a user to select persons at other configuration stations for sharing.

In some cases processor 50 may be programmed to present a spatial interface for a user to use to select persons at different configurations to share with. For instance, the spatial interface may include a map of configurations within a space and may indicate user identities to avoid confusion. Here, each user identity may be determined when a user logs on to one of the work stations and the user's identity may be presented as a selectable icon on a virtual table representation. In this regard, see exemplary table icon 140 in FIG. 24 that includes selectable icons 142, 144, 146 and 148 associated with users currently using stations at a configuration associated with icon 140. Here, to send content to one of the persons associated with one of the icons 142 through 148, after selecting content to share, a user simply selects the icon 142, 144, 146 or 148 to share with a specific one of the persons associated therewith.

In still other embodiments it is contemplated that a configuration icon including various emissive shapes of the configuration 10 (see again FIG. 1) may be presented for selecting surfaces on which to share content. To this end, see FIG. 25 that shows an icon 150 representing configuration 10 (see also again FIG. 1) that spatially represents locations of current users via names and station icons 152, 154, 156 and 158 where each station icon includes a near icon 160 and a far icon 162 indicating near and far emissive surfaces associated with each user. By selecting one of the near or far icons a user can share content with another user via one of the near or far surfaces facing the other user.

Whatever virtual interfaces or tools (e.g., a virtual keyboard) are provided on the horizontal surfaces (e.g., 14a) and the near surfaces (e.g., 16a), in at least some cases a user will be able to modify the interfaces by moving the interfaces and/or tools around the emissive surfaces, by altering the sizes of the interfaces, by changing the appearance of the interfaces, by hiding or exposing the interfaces or tools, etc. For instance, referring again to FIGS. 1 and 15, a user at station 12a using both far displays 18b and 18d to present information may want to move keyboard interface 90 to the left most portion of surface 14a to be positioned near the center between surfaces 18d and 18b. As another instance, a user may want to periodically use horizontal surface 14a as a desktop surface for writing using an ink pen on paper. In this case the user may opt to temporarily close the virtual keyboard 90 and other virtual interface tools to clear surface 14a for conventional work.

Referring again to FIG. 15, in at least some embodiments functional area 100 will include desktop or station control icons, several of which are collectively identified by numeral 199. Icons 199, for instance, may present information akin to the information presented via tiles that are used in the Windows 8 software provided by Microsoft Corporation. In this regard, for instance, one icon 199 may be a photo sharing icon where, when a new photo is received from a friend, an indicator of the new photo may be presented via the icon 199. Another icon 199 may relate to e-mail or a text message account where the icon 199 indicates the number of new or unopened messages. Still another icon 199 may include a Facebook account icon, a Twitter account icon, a Linked-in account icon, etc., where the icon indicates current statuses of those accounts. Another icon 199 may be a calendar icon to indicate imminent meetings or conferences for a specific user. Other icons may include application icons to enable a user to quickly open specific routinely used or most recently used applications. In some embodiments icons in functional area 100 will be user configurable.

Referring again to FIG. 12, where curved emissive portions 76 and 74 are provided between adjacent surfaces 14a, 16a and 18a, in at least some embodiments gestures within the curved portions may have special or application specific meanings. For instance, referring also to FIG. 1, where a first user is using station 12a to perform individual (i.e., non-collaborative) activities using surfaces 14a, 16a and 18b, after a user selects content on near surface 16a, a gesture in which the first user contacts curved surface 74 with a finger or a palm at the top of ridge 16 and pushes away from the user and toward surface 18b may cause the selected content to be displayed on far surface 18b for viewing only by the first user. A similar gesture whereby the first user selects content on surface 18b and pulls or rolls back on surface 74 may cause the selected content to be pulled back from surface 18b and be presented via near surface 16a.

When the first user is using station 12a to share content with a second user at station 12b using surface 18a, after the first user selects content on near surface 16a, a gesture in which the first user contacts curved surface 74 with a finger or a palm at the top of ridge 16 and pushes away from the user and toward surface 18b may cause the selected content to be displayed on surface 18a for viewing only by the second user at station 12b. The shared content may also be presented on surface 18a so that the shared content on surfaces 18a and 18b viewed by the first and second users is identical. A similar gesture whereby the first user selects content on surface 18b and pulls or rolls back on surface 74 may cause the selected content to be pulled back from surfaces 18a and 18b and be presented via near surface 16a thereby stopping the sharing activity.

In at least some embodiments it is contemplated that system processors will provide totem users with the ability to control applications used by other users to generate shared content. For instance, referring again to FIG. 1 when a first user at totem 22a is running a word processor program to generate a document that is being shared via valley surfaced 18a and 18b, a second user at totem 22b viewing the shared document on surface 18a may be able to provide input via totem 22b to the word processor program to alter the content (i.e., edit the presented document). Similarly, if the document is shared with other users via surfaces 18c and 18d, the other users may be able to edit the document by controlling the word processor application program.

Referring once again to FIG. 1, while configuration 10 includes hardware that restricts the ways in which the emissive surfaces can be used, it has been recognized that in many cases such restrictive structure is particularly advantageous as the restrictions enable a simplified intuitive interface that encourages particular useful behaviors. For instance, if only configurations like configuration 10 were provided to customers, system users would become very familiar with configuration 10 and how to use interface features associated with individual and collaborative activities. As more embodiments are provided and supported, while the embodiments may be slightly more optimized for highly specific uses, customized or modified interface tools to support each embodiment may lead to less familiarity with different configurations and therefore less overall use.

In addition to the FIGS. 1 and 2 configuration 10 described above, totems 22a, 22b, etc., and other components may be assembles to provide many other useful configurations. For instance, referring to FIG. 26 a top plan view similar to the view shown in FIG. 4 is presented, albeit showing a second embodiment 200 including four totems 22a through 22d, arranged with four corner table top members 202, 204, 206 and 208. The components are assembled to provide four work stations or spaces 12a, 12b, 12c and 12d about a sharing space 220. In configuration 200, however, while totems 22a and 22b face each other and totems 22c and 22d face each other on opposite sides of sharing space 220, a line between totems 22c and 22d is perpendicular to a line between totems 22a and 22b. Here, all of the features and combinations thereof described above with respect to first configuration 10 may be included in configuration 200, albeit where control icons and virtual tools are modified to intuitively enable selection of different emissive surfaces for control purposes. For instance, referring to FIG. 27, a schematic similar to the FIG. 15 schematic is presented that includes virtual interface tools for station 12a in FIG. 26 that are similar to the tools shown in FIG. 15. The main difference between the FIG. 27 and FIG. 15 virtual tools is that the sharing hand icons 112 and 114 align with stations 12c and 12d, respectively, to provide intuitive directional sharing icons. Table members 202, 204, 206 and 208 may be mounted to totems 22a through 22d in a fashion similar to that described above.

Referring to FIG. 28, a top pan view of a third embodiment 300 is illustrated that includes first, second, third, fourth, fifth and sixth totems 22a through 22f, respectively, and intermediate table members 302, 304, 306, 308, 310 and 312 arranged about a sharing space 320 to provide first through sixth work stations 12a through 12f, respectively. Stations 12a through 12c are arranged in a fashion similar to the way in which stations 12a through 12d were arranged in the first configuration 10 (see again FIG. 4). Stations 12e and 12f are provided on opposite ends of the arrangement of stations 12a through 12d and face each other so that a line between stations 12e and 12f is perpendicular to a line drawn between stations 12a and 12b.

Because stations 12e and 12f are at opposite ends of a long dimension of the configuration 300, the primary sharing surfaces 18e and 18f are spaced relatively long distances from stations 12f and 12e, respectively, which would make it difficult for users of stations 12e and 12f to use the facing far surfaces for either individual activities or during sharing activities. For this reason, in at least some embodiments an additional emissive surface structure 330 (see phantom in FIG. 28) may be provided within sharing space 320 that extends between table members 302 and 308. Structure 330 may include first and second intermediate emissive surfaces 332 and 334 akin to the far surfaces (e.g., 18a) described above in both dimensions and angle, that face in opposite directions and that generally face totems 22f and 22e. Surface 332 facing station 12f may be used for individual activities by a user of station 12f and may also be used when content is shared with the user of station 12f. Similarly, surface 334 facing station 12e may be used for individual activities by a user of station 12e and may also be used when content is shared with the user of station 12e. Where structure 320 is provided, totems 22e and 22f may be modified so that they do not include far surfaces 18e and 18f, respectively, as the functions performed by those surfaces would be provided by surfaces 332 and 334, respectively.

The virtual interface tools presented to users of configuration 300 would be modified to enable intuitive directional sharing with all or a subset of the users at stations 12a through 12f.

Referring now to FIG. 29, a top plan view of a fourth configuration 400 is illustrated. Configuration 400 is similar second configuration 200 shown in FIG. 26. The main differences between configurations 400 and 200 is that the totems 22a' through 22b' in configuration 400 have been modified so that the horizontal emissive surface (e.g., 14a') of each totem has a curved front edge 171' as opposed to a straight edge (see again FIG. 26) and the intermediate table members have been replaced by table members having curved outer edges. The curved front and outer edges of the surfaces and table top members enable a configuration having a round footprint which may be useful in various applications. The virtual control interface tool options in this embodiment would be similar to the options available in configuration 200 described above.

Referring to FIG. 30, a fifth configuration 500 is shown. Configuration 500 includes first and second totems 522a and 522b as well as first and second end table members 524 and 526, respectively. Each totem 522a and 522b is similar in construction and operation and therefore only totem 522a will be described here in any detail in order to simplify this explanation. Physically/mechanically, totem 522a is similar to totem 22a described above except that totem 522a has a much greater width dimension than totem 22a. More specifically, totem 522a may have a width dimension that is twice, three times, or more the width of totem 22a. Operationally, a processor associated with totem 522a may be programmed to provide two, three, or more virtual stations as opposed to a single station along one side of configuration 500. Here, the phrase "virtual station" is used to refer to a station that can be generated at any location along the width of a totem which is different than the stations described above in the context of totems 22a, 22b, etc., where the totem itself has a width dimension that is similar to an optimal dimension for a user station. Thus, a virtual station may have all of the features of the stations described above with respect to totem 22a, the only different being that the virtual station is not restricted by mechanical constraints to be created at a single location on emissive surfaces. For instance, when a single user is located at totem 522a, a system processor associated with totem 522a may recognize that a single user is present adjacent the front side of the totem 522a and may generate a single virtual user station interface akin to the interfaces described above with respect to, in particular, FIG. 15.

In addition, referring still to FIG. 30, in at least some embodiments, a system processor may be programmed to identify the location of the single user adjacent totem 522a via a totem camera (see 99 in FIG. 15) or via some other position sensor and to provide the virtual user station interface at the sensed location of the user. For example, where a single sensed user is centrally located along the front side of totem 522*a*, the processor may present the virtual interface centrally along the width direction of totem 522*a* half way between table members 524 and 526. Consistent with the description above, in at least some embodiments the virtual station or interface would include a portion of horizontal surface 514*a* and portions of near and far surfaces 516*a* and 518*b* that are aligned with the designated portion of horizontal surface 514*a* assigned to the user's station.

In addition to cameras, the system may employ other types of position or location sensors to identify persons located adjacent configuration 500. For instance, referring to FIG. 31, proximity sensors 519 and 521 may be provided at first and second ends of a totem 522*a* which can sense user location. Coupling the location sensed by sensors 519 and 521 with user identity identified via a log on process, the system can know user identity and location and provide user specific content to a user specific location. As another instance, where surface 514*a* is touch sensitive, surface 514*a* may be used to sense where along a length of the surface 514*a* a user interacts with the surface.

As one other instance, ambient (e.g., ceiling mounted) access points may be used to identify user location via the location of a user carried portable device (e.g., a badge, a smart phone or portable computing device, etc.) To this end, a signal from a user's portable device may be used to triangulate user location relative to a configuration and associate a user with a specific virtual station provided by configuration 500.

Prior to logging onto the system using totem 522*a*, when the system recognizes that a user is proximate the front side of totem 522*a*, a totem processor may provide a token 170 (see again FIG. 30) akin to the token 170 in FIG. 17 and described above to welcome the user to the configuration and to encourage the user to log on to the system. Here, because user location along the width dimension of totem 522*a* is known, the processor may cause token 170 to move with the user along the width of totem 522*a*. When the user stops, the token 170 may also stop. When the user starts moving again, the system processor may again move the token along with the user. If the user moves from a first location adjacent a first totem to a location adjacent a second totem, a system processor may present the token to the user on one of the surfaces of the second totem and may cause the token to move along with the user on the second totem surface as the user continues to move. In addition to providing a moving token via a totem, the token may be provided via any emissive surface within a space that can be used to provide a virtual station such as, for instance, a wall emissive surface like surface 1200 shown in FIG. 62. The moving token provides a clear indication to a potential user that the user has the capability to use any emissive surface that the token appears on to at least attempt to access user's content. When first a user passes by a second user that is currently using a virtual station, the token may simply pass through the virtual station from one side to the other without affecting the second user's content.

In at least some cases when a user stops adjacent a totem or an emissive surface, the appearance of the token may be modified to gain the user's attention or top indicate more clearly that the system is tracking user movement and is ready to facilitate content access. For instance, in at least some embodiments the token may change color, size or shape. In other embodiments the token may change shape and size to simulate a throbbing appearance to gain the user's attention. Other appearance changes are contemplated.

Where a user's identity has been previously determined and is associated with a user moving through a space, the opt in token 170 may include additional user specific information. For instance, a token may update a user with a summary indicating number of unread e-mails with the current date, an indication of new photos received from a friend, an indication that a medical record has been received from a physician, an indication that a stock has hit a target price, an indication that new articles have been published about a specific company being tracked by the user, etc.

In at least some embodiments, when a user that is currently controlling a virtual work station provided at one location along the width of totem 522*a* via configuration 500 moves to a second location, a totem or system processor may be programmed to move the virtual work station to the user's new location assuming that no other user is occupying the new location. In this regard see FIG. 31 where a user is shown using a virtual station at a first location 530 along the width of configuration 500 to view user content. The user is shown in phantom at a second location 532 with the virtual work station also in phantom after the work station has been moved to be aligned with the second location.

Where virtual stations move along with configuration users, it is contemplated that the algorithm that controls movement would have hysteresis built in so that a virtual station would not move each time a user moves slightly with respect to the totem. In other embodiments the system may require a user to perform some task in order to move a virtual station. For instance, a user may be required to make a double clockwise circle gesture on the portion of surface 514*a* currently assigned to the user's virtual station to indicate that the station should be moved along with the user during subsequent user movement. After the double circle gesture, the user may move to the second location and make an inverse (i.e., clockwise instead of counterclockwise) double circle gesture on surface 514*a* to move the virtual station. Here, after the double clockwise gesture, the user's virtual station may simply be removed from configuration 500 and, when the inverse gesture is sensed at the second location, the system may recreate the virtual station at the second location with the exact same information that was presented to the user prior to the move.

In at least some embodiments, when a user moves away from a virtual station, the movement may be sensed and the station may be virtual removed from the surfaces to protect the user's information from viewing by others. When the user returns to the station, if the configuration can automatically reestablish the user's identity, the system may automatically regenerate the virtual station with the user's content represented in the same way that the user left the content when the user moved away from the station.

Referring again to FIG. 13, in at least some embodiments an enterprise location tracking system 139 may be linked to the configurations 10, 131, 133, 500, etc., to provide user location information to the system. For instance, tracking system 139 may include wireless area access points within a large conference space including ten configurations 10, 131, 133, 500, etc where information sensed by the access points can be used to triangulate the location of a user device such as a badge, a smart phone, a computing device, etc. Here, after a user logs on to the system at a first location adjacent configuration 10 and establishes a virtual station (see again FIG. 15), the user's identity, location and immediate station content (i.e., a current state of a virtual desktop) may be associated in a database.

When the user moves away from configuration 10, location system 139 may track the user's location and provide that information to one of the system processors. The system processors may remove the user's virtual station or content from the first location but still associate the content with the user as the user moves within the large conference space. Once the user moves to a second location adjacent a second configuration (e.g., configuration 133), the system, receiving the updated location information for the user and knowing the locations of the configurations 10, 131, 133, 500, etc. within the larger conference space, may automatically present the user with the user's content at the second location. If the user moves from the second location to a third location at which the system includes surfaces on which the user's content may be represented, the system may remove the content from the second location and regenerate the content at the third location automatically or upon sensing a gesture at the third location (e.g., a simple tap on an opt in token presented via an emissive surface).

Referring still to FIG. 13, in other embodiments location system 139 may include cameras or other sensors that can identify locations of persons in the large conference space instead of wireless access points. Here, the system processors would be programmed in a fashion similar to that described above, where user content would be associated with locations of specific users so that after a user's identity is associated with a person at a specific location, the content associated with the user's identity would be made available to the user as the user moves within the conference space without requiring the user to carry a user device. For instance, when a first user enters the conference space, location system 139 would sense a new user in the space and begin tracking the user's location. When the first user logs on to configuration 500 at a first location, the user's identity and content would be associated with the first user at the first location. When the first user moves from the first location to a second location adjacent a second configuration 500, system 139 provides the user's changing location to the system processors and the processors continue to associate the user's identity and content with the changing location even though the virtual station may have been removed from the first location. When the user moves to a second location adjacent a second configuration, the system processors recognize that the first user is at the second location and may automatically, or at the sensing of a specific gesture, present the user's content at the second location without requiring a second log on process.

In at least some embodiments, when a first user moves to a second location after previously logging on to the system and accessing personal content, the system processors may not automatically present user content at the second location if a second person is at a location at which the second person may be able to view the surfaces on which the content is to be presented at the second location. For instance, system 139 may sense locations of all persons within a conference space. When a first user moves to a second location and a second person is near the first user at the second location, locations of the first user and the second person may be provided by system 139 to one or more of the system processors. The processors may to programmed to, instead of automatically presenting the first user's content at the second location, present a virtual opt in token akin to the token 170 shown in FIG. 16 or some other opt in tool that can be used by the first user to affirm that the first user's content should be regenerated at the second location. The opt in tool may indicate that a second person is present near the first user or may simply indicate that an opt in gesture is required.

While enterprise location system 139 is described above as including sensors for sensing locations of persons within a large conference space, it should be appreciated that system 139 may include sensors throughout an entire building or even on an entire campus associated with an entity so that after a user's identity within a monitored space (e.g., a building, a campus, etc.) is known, the user's content may be moved automatically with the user and automatically, or after a required gesture, presented whenever the user is adjacent one or more surfaces that can present the user's content to the user.

In still other embodiments where user's carry devices that have location identifying capabilities already built in as in the case of smart phones and other portable computing devices, user devices themselves may provide user identities and locations to the system processor via wireless access points that make up part of location system 139. In this case the system processors may be programmed to use user identities and locations from the user devices to identify user content and provide that content on surfaces adjacent the users.

In any of the above cases, system processors may routinely run redundant security processes to routinely reconfirm user identity. For instance, after user identity is initially identified via a log in process or the like, each time a user is located in front of a system camera (e.g., see 99 in FIG. 15), the system may run a redundant security process including a facial recognition process to obtain a user image, examine the user image for identifying characteristics and confirm that the person in front of the camera is in fact the person associated with the content being provided to the user. Other identity confirming processes are contemplated. Where identity is confirmed, the content is continually presented and the user has no idea the redundant process occurred. Where identity cannot be confirmed for some reason, the processor may be programmed to present a user with a new log in process useable to reestablish user identity.

In at least some embodiments the dimensions of a virtual station used by a first user may be reduced or increased automatically when a second user is initially sensed at a location at which the second user may be able to view one or more of the emissive surfaces assigned to the first user. For instance, referring to FIG. 32, a first user along the front side of virtual station 512a may initially be provided a relatively large virtual station 512a when no second person is present at a location in which the second person could see surfaces associated with virtual station 512a. However, when a second person is sensed at a location adjacent the first user (see FIG. 32), the width of virtual station 512a may automatically be reduced appreciably to the size shown in FIG. 31 at 512a to maintain privacy, to operate as an indicator to the first user that someone is present and to make space to accommodate a station for the second user. In other embodiments the totem processor may, when a second person is present, automatically change station content to non-sensitive or public information or hide the station altogether by reducing the station down to the size of a small icon selectable by the first user to re-access the station by selection of the icon. In still other embodiments a system processor may simply provide some indication via one of the emissive surface portions associated with station 512a that a second user is present and offer the option to reduce station size, change station content to non-sensitive or public information or to hide the station altogether.

In at least some embodiments, the portions of surfaces 514a, 516a, etc., that are assigned to a first user's virtual work station may be made relatively large if the portions used to configure the station are not needed to provide a second user's station. For instance, where only a first user is currently adjacent and using totem 522*a*, the first user virtual work station may include the entirety of surfaces 14*a*, 16*a* and 18*b* or a relatively large portion (e.g., the middle two thirds) thereof. When a second user desires to use a second virtual work station presented in part by totem 522*a*, the processor may automatically reduce the size of the first user's virtual station if need be to provide the second virtual station. In this regard see, for instance, the large virtual station 512*a* shown in FIG. 32 and the resized station 512*a* that accommodates a second station 512*b* in FIG. 33.

In some embodiments the virtual station size may be a function of other circumstances. For instance, when four users are located about configuration 500 in FIG. 30, two on each side, if a first user is presenting to the second through fourth user's via far surfaces 518*a* and 518*b*, the first user may be assigned more than half (e.g., two thirds) of surfaces 514*a* and 516*a* so that the first has better ability to access and control the present information. Here, if one of the second through fourth users takes control from the first user, the space on surfaces 514*a* and 516*a* assigned to the first user may be made smaller.

System processors may encourage establishment of virtual stations at optimized locations on emissive surfaces or along the width of a totem. For instance, referring again to FIG. 30, in at least some embodiments it is contemplated that the system processors may be programmed to provide virtual stations at specific designated locations along totem lengths. For instance, assume a first user is using a station adjacent totem 522*a* when a second user arrives adjacent totem 522*a* to use a second virtual station. In this case, if the first user's virtual station is already provided by the right half of configuration 500, the second virtual station can be provided for the second user without disturbing the first user and frustration from having to deal with a resized or repositioned first station can be avoided.

As another instance, in FIG. 30, if a first user is currently using a virtual station located at the left end of totem 522*a*, when a second user arrives at totem 522*a*, the system processors may present an opt in token (see again 170 in FIG. 30) near the right end of totem 522*a* as opposed to in the middle of the totem. By offering the token near the right end, the system processors encourage the second user to take up a space separated from the first user at the left end which enables the first and second users to have relatively large virtual stations or, in the alternative, smaller stations that are separated by an unused space there between when additional content privacy is desired.

Referring still to FIG. 30, in at least some embodiments, configuration 500 may be used to video conference with remote conferees. To this end, any of the surfaces 514*a*, 516*a*, 518*a*, etc., may be used to present live video of remote conferees to persons using virtual stations at configuration 500. For instance, where two remote persons are conferring with four users located about configuration 500, images of the two remote persons may be presented on far surfaces 518*a* and 518*b*, the first remote person on the left half of each of surfaces 518*a* and 518*b* and the second remote person on the right half of each of surfaces 518*a* and 518*b*. In this case, each of the users located adjacent totem 522*a* in FIG. 30 would be able to see each of the first and second remote persons on surface 518*b* while the users located adjacent totem 522*b* would be able to see each of the first and second remote persons on surface 518*a*. Where a third remote person joins the conference, the space on surfaces 518*a* and 518*b* could be reconfigured to provide three live video images of the three remote users for local conferees to view. In the alternative, where one of the local users shares information with other conferees, the space on surfaces 518*a* and 518*b* could be divided into three spaces, two for the first and second remote persons and a third for the shared information. Other space divisions of configuration surfaces are contemplated.

One additional advantage associated with restricting locations of virtual stations is that users can be guided to generally optimal locations with respect to configuration hardware (e.g., cameras 99 in FIG. 15, device couplers 62 (see FIG. 13, etc.). For instance, assume that first and second cameras 99*a* and 99*b* (see FIG. 30) are provided along the top edge of surface 516*a* that have fields of view that cover spaces adjacent the right and left halves of totem 522*a*. Here, by providing virtual stations at the right and left halves of totem 522*a*, the system processors guide users to locations within the camera fields of view. In other embodiments more than two cameras may be provided along the top edge of surface 516*a* and the processor may provide virtual stations at other locations aligned with camera FOVs. Similarly, where wireless device couplers (e.g., a wireless transceiver) are provided below specific portions of surface 514*a*, system processors may guide users toward separate station spaces associated with different device couplers. As another instance, where camera or other gesture sensor systems (e.g., a sensor system like the Primesense system used in some gaming systems) are provided at intermittent locations along the length of an emissive surface, the processors may guide users toward station spaces aligned with the different sensor systems.

In at least some embodiments cameras in addition to or instead of the cameras provided at the top edge of surface 516*a* may be provided at the top edge of the far or valley surfaces like surface 518*b*. For instance, in FIG. 35 a plurality of cameras including sets of cameras 531, 533 and 535 are shown along the top edge of surface 518*b* that face spaces along a front side of totem 522*a*. In the illustrated example, set 531 is located across from a space adjacent a left portion of totem 522*a*, set 533 is located across from a space adjacent a central portion of totem 522*a* and set 535 is located across from a space adjacent a right portion of totem 522*a*. Each set 531, 533 and 535 includes three cameras. For instance, set 531 includes first, second and third cameras 521, 523 and 525, respectively. In the illustrated example each camera in a set is aimed at a different space adjacent totem 522*a*. For instance, camera 521 is aimed at the space adjacent the left portion of totem 522*a*, camera 523 is aimed at a the space adjacent the central portion of totem 522*a* and camera 535 is aimed at a space adjacent the right portion of totem 522*a*. Similarly, a separate camera in each of sets 533 and 5345 is aimed at the spaces adjacent the left, central and right portions of totem 522*a*.

The cameras in the sets 531, 533 and 535 may be used for several different purposes including security functions (e.g., via face recognition), video conferencing, entry of information into the system, etc. For instance, when three remote persons link into the system during a video conference, live feeds of the first, second and third remote persons may be presented on surface 518*b* below sets 531, 533 and 535, respectively. Where two local users are located in spaces adjacent the left and right portions of totem 522*a* and use virtual stations provided at those locations, the first and third cameras 521 and 525 of set 531 may be used to generate live views of the first and second users for a first remote user whose image is presented below set 531. In this way the remote user will be able to pick up on visual queues and determine when one of the first and second local users is looking at the remote user's image on the left portion of surface 518b and eye to eye communication is simulated. Similarly, two cameras in set 533 aimed at the first and second local users may provide directional images of the first and second local users to the second remote user and two cameras in set 535 aimed at the first and second local users may provide directional images of the first and second local users to the third user.

In the above example, when a third local user arrives and causes the system to create a third virtual station along a central portion of totem 522a, the system may automatically reconfigure so that the third camera in each of the sets 531, 533 and 535 obtains a live and directional video feed of the third local user and presents a different directional feed to each of the remote users. Similarly, if the second local user moves away from totem 522a or virtually leaves the conference, the system may automatically reconfigure so that the live video feeds of the second local user are discontinued.

When a user leaves a conference, the user may automatically retake control of surfaces associated with the user's location adjacent a totem. For instance, in FIG. 30, if a user adjacent the left half of totem 522a leaves a video conference with three remote persons whose images are presented on surface 518b, the second user may regain control of the left half of surface 518b for personal use. Here, if a first user adjacent the right half of totem 522a still continues to participate in the conference, the images of the three remote users may be automatically resized to fit on the right half of surface 518b.

Again, to align users with camera sets 531, 533 and 535, system processors may be programmed to restrict or at least strongly encourage virtual station spaces to locations aligned with the camera sets.

Referring to FIG. 36, in still other embodiments it is contemplated that a plurality of wide angle cameras 560 may be provided along the top edges of the far surfaces (e.g., 518b) for obtaining wide angle images or video of users on the opposite side of configuration 500. Here, system processors may be programmed to divide wide angle video into a set of smaller field of view videos centered on virtual user stations along the opposite side of configuration 500. Once separate videos are generated, separate directionally true videos (i.e., videos where remote and local users have the illusion of seeing eye-to-eye) may be presented to different remote users when a video conference occurs. In at least some embodiments it is contemplated that system cameras (e.g., 99, 521, 523, 525, 560, etc.) may be built right into the emissive surfaces so that there is emissive surface surrounding each camera opening or lens.

In some cases the camera lenses may be so small that it is difficult to even perceive their existence. Where a row of control icons are presented along the top edge of a ridge surface, in at least some embodiments the system processors may be programmed to provide the icons at locations that help to hide the appearance of the lenses or lens openings. To this end, where a lens has a black appearance as is often the case, when several icons in a set include black portions, the system processors may identify an optimized icon configuration (e.g., size, order of presentation within a row, etc.) in which black portions of at least a set of the icons are aligned with the lenses to give the allusion that the lenses do not exist.

In still other embodiments it is contemplated that all or at least a subset of the pixels that form one or more of the emissive surfaces 516a, 518b, etc., may be formed using dual purpose pixels where each pixel may be used to both output light to generate a portion of an image and to sense light impinging on the pixel and generate data representing a portion of a scene located within a camera FOV. To this end, see U.S. Pat. No. 7,535,468 which is titled "Integrated Sensing Display" which issued in 2009 to Apple Inc. which is incorporated herein in its entirety and which describes dual purpose pixels for both generating images and sensing FOV scenes.

Referring to FIG. 37, exemplary surface 518b is shown with a top ribbon 570 thereof including dual purpose pixels where any adjacent subset (e.g., 572) of the pixels may be used to obtain scene images including images of configuration users. In this case, because any adjacent subset of pixels may be used to generate an image, a virtual station may be created at any location along an edge of a totem 522a without concern for aligning a user with one or more discrete cameras. Here, when user location is identified, system processors may be programmed to simply select a subset of pixels (e.g., 572 in FIG. 32) within the ribbon 570 aligned with a user's location and a user's virtual station to be used as a camera for that specific user.

While an entire emissive surface 518b may include dual purpose pixels, it has been recognized that dual purpose pixels are relatively specialized and will likely be relatively expensive in at least the near future. For this reason, in at least some embodiments it is contemplated that a surface 518b may have portions that are dual purpose like ribbon 570 in FIG. 32 while other portions (e.g., the balance of surface 518a in FIG. 32) may only be able to generate images (i.e., may not be able to be used as camera pixels). In order to be best aligned with configuration users, in at least some embodiments dual purpose pixels will only be provided along one or both of the top edges of totem surfaces 516a and 518a (See again ribbon 570 on surface 518b in FIG. 32). In other embodiments the dual purpose ribbon 570 may only be provided intermittently along the top edges with single purpose pixels there between to reduce cost.

Referring again to FIG. 8, support structure 30 for the emissive surfaces that comprise a totem may take any of several different forms depending at least in part of the type of technology used to provide the emissive surfaces. To this end, one other exemplary structure that is consistent with at least some aspects of certain embodiments of the present invention is illustrated in FIG. 38 where an emissive surface member 550 and associated support structure 552 are shown.

Support structure 552 is simply a rigid structure that includes a stabilizing base and components that are shaped to support surface 550 in an upright orientation. In some embodiments structure 552 may be constructed out of aluminum or steel bars bent and welded or otherwise mechanically fastened together in the illustrated shape. The base includes first and second spaced apart shoulder members 580 that extend along parallel trajectories aligned along a front to rear direction. Foot members extend downward at each end of each of shoulder members 580 to contact a supporting floor surface and provide a stable four point base structure. A rigid rectangular upright frame 582 extends upward from the shoulder members 580 and includes a substantially horizontal top bar or rail 584 that extends perpendicular to the shoulder members 580. Rail 584 is, in at least some embodiments, at a height of approximately forty-six inches. First and second support arm members 586 extend to one side of frame 582 at a work surface height which is, in at least some embodiments, approximately thirty-eight inches.

Surface structure or member 550 includes an integrated rigid and curved member that forms plain, ridge and valley surface portions 564, 566 and 568, respectively, that are juxtaposed in a fashion similar to that described above with respect to totem 22a. Member 550 may be formed in any fashion known in the art. For instance, member 550 may be constructed of a rigid glass or plastic material formed into the illustrated shape. The glass may be transparent or at least semi-transparent and may include at least somewhat transparent circuitry controllable to generate images akin to any images that can be generated using flat panel and curved panel technology. In other embodiments surface member 550 may include a curved panel applied to a rigid support substrate such as a bent sheet of aluminum, circuit board material or the like. In still other embodiments, where surface member 550 is generally transparent, a rear or bottom surface of member 550 may be opaque to provide a background or the surface member 550 may be controllable to block out the see through aspect of all or at least a portion of the surface when information is presented thereon.

Referring still to FIG. 38, an undersurface of surface member 550 forms a channel 590 where portions 566 and 568 are connected together where the channel is dimensions to generally receive rail 584 from support structure 552. Top surfaces of members 584 support an undersurface of portion 564 when rail 584 is received in channel 590. While not shown, some type of mechanical securing structure would also be provided in at least some embodiments for securing member 550 to support structure 552. In other embodiments surface member 550 may simply be adhered to support structure 552.

Referring to FIG. 39, two elongated surface members 550a and 550b akin to surface member 550 described above with respect to FIG. 38 are shown. While the support structures are not illustrated in FIG. 39, surface members 550a and 550b are shown suspended in space so that they are juxtaposed with respect to each other in a fashion similar to that described above with respect to the surfaces that form parts of totems 22a and 22b. Any combination of the virtual control tools described above may be provided via surface members 550a and 550b to facilitate and encourage individual and sharing activities. Because surface members 550a and 550b have relatively long width dimensions, two or more virtual work stations may be presented on each side of the configuration shown in FIG. 39.

Other embodiments may include emissive surfaces that present projected images. For instance, referring to FIG. 40, a schematic similar to the view of FIG. 2 is shown, albeit where the illustrated configuration 600 includes projectors to generate images on emissive surfaces. Configuration 600 includes first and second totems 622a and 622b that are similarly constructed and operate in a similar fashion and therefore, unless indicated otherwise, only totem 622a will be described in detail. Totem 622a includes a structure having a shape similar to the shape of totem 22a described above and, to that end, forms a horizontal emissive surface 614a at a work surface height, a ridge emissive surface 616a that faces a side to which horizontal surface 614a extends and forms a valley emissive surface 618a that faces generally in the direction opposite the direction in which surface 616a faces.

The support structure for the emissive surfaces forms an open cavity 630 near a top end thereof adjacent rear sides 634 and 636 of surfaces 614a and 616a, respectively.

Surfaces 614a and 616a are formed of rear projection material that generates images on surfaces 614a and 616a when images are projected on rear surfaces 634 and 636, respectively. In addition, each of surfaces 614a and 616a includes a touch sensor subassembly (not illustrated) for sensing user touch on the surfaces to be used as input to programs run by the totem processor. A projector 632a is mounted within cavity 630 and is directed toward rear surfaces 634 and 636. Projector 632a and the touch sensor system would be linked to a system processor for control thereby. The system processor is programmed to compensate for distortion in the projected images caused by the non-perpendicular projector to surface angles between projector 632a and rear surfaces 634 and 636.

Referring still to FIG. 40, valley surface 618a includes a projector surface suitable to reflect images projected thereon. In at least some embodiments surface 618a may be formed of the same material as surfaces 614a and 616a if the material can be used for both front and rear projection. In at least some embodiments all of the surfaces 614a, 616a and 618a may be integrally and seamlessly formed as an integrated single piece of material.

Totem 622a further includes a second projector 640a supported below valley surface 618a that is arranged to project images across a sharing space and on to a second valley surface 618b provided by second totem 622b when configuration 600 is constructed. In addition to providing second valley surface 618b, second totem 622b also includes a first projector 632b that projects images on rear surfaces of emissive surfaces 614b and 616b and a second projector 640b arranged to project images on first totem valley surface 618a. Surfaces 614b and 616b would also include touch sensors for sensing input activity by users of stations provided on the right side of totem 622b as illustrated in FIG. 40. Where the width dimension of totems 622a and 622b is relatively long, each totem may provide more than one virtual station or size adjustable stations as described above.

Referring to FIG. 41, a view similar to the view shown in FIG. 40 is shown, albeit where the second projectors 640a and 640b of FIG. 40 have been replaced by second projectors 650a and 650b that project images on rear sides of emissive surfaces 618a and 618b, respectively. Other hybrid embodiments including some projected emissive surfaces and some emissive surfaces provided using other technology (e.g., LED, LCD, plasma, etc.) are contemplated.

Configurations having shapes in addition to the shapes described above are also contemplated. To this end, see the configuration in FIGS. 42 through 45 and 49 that is referred to generally as a "teacup" configuration 700. Configuration 700 includes a plurality of emissive surfaces 714, 716 and 718 that are supported or suspended in space by a support structure 730. While configuration 700 is generally round, configuration 700 has several features or characteristics that are similar to the characteristics described above with respect to other configurations. In this regard, configuration 700 includes plain, ridge and valley emissive surfaces 714, 716 and 718, respectively.

Plain surface 714 is generally horizontal and is doughnut shaped when viewed from above (see FIG. 44). Ridge surface 716 is substantially cylindrical and is convex outward facing surface 714. More specifically, ridge surface 716 is an outer surface that has a truncated (e.g., cut off) cone shape that extends at an angle between a first circular top edge 750 and a second circular bottom edge 752 where the second circular bottom edge has a greater or larger radius or circumference than the first circular top edge (i.e., the outer emissive surface 716 slopes from the first circular edge 750 to the second circular edge 752 so that the outer emissive surface 716 faces at least somewhat upward.

Valley surface 718 is substantially cylindrical and is concave inward toward a sharing space 720 defined by configuration 700. More specifically, referring also to FIG. 45, valley surface 718 is an inner surface that has a truncated (e.g., cut off) and inverted cone shape that extends at an angle between the first circular top edge 750 and a third circular bottom edge 758 where the third circular bottom edge 758 has a greater or larger radius or circumference than the first circular top edge 750 (i.e., the inner emissive surface 716 slopes from first circular edge 750 to the third circular edge 758 so that the inner valley emissive surface 718 faces at least somewhat upward. In the illustrated embodiment inner surface 718 has a height dimension that is approximately twice a height dimension of surface 716. Each of the emissive surfaces 714, 716 and 718 may be provided via any emissive surface technology including LED, LCD, plasma, OLED, projection, etc.

A depth dimension of surface 714 from edge 752 to an outer edge 760 is similar to the depth dimension of surfaces 14a, 514a, etc. described above and in a particularly advantageous embodiment may be approximately 14 inches. The height of surface 714 above a support floor may be within the range described above with respect to surface 14a and in a particularly useful embodiment may be substantially thirty eight inches. The height dimensions of surfaces 716 and 718 may be within the ranges described above with respect to surfaces 16a and 18a. In a particularly useful embodiment the height of edge 750 above surface 714 may be substantially eight inches and the height of edge 750 above third circular edge 758 may be twenty-two inches. A shared space diameter dimension D1 (see again FIG. 45) between top edge portions of edge 750 may be between twenty four and forty eight inches and, in a particularly useful embodiment, may be substantially 32 inches.

While different portions of emissive surfaces 714, 716 and 718 may be provided via separate emissive surfaces, in at least some embodiments it is contemplated that all of surfaces 714, 716 and 718 may be integrally formed with curved emissive surface portions between adjacent surfaces 714, 716 and 718.

Where surfaces 714, 716 and 718 are integrally formed, in at least some embodiments virtual work stations may be provided at any location about configuration 700, each station including portions of surfaces 714, 716 and 718. For instance, referring again to FIG. 42, one virtual station 712a may be provided as illustrated where station 712a includes plain, ridge and valley emissive surface portions 714a, 716a and 718b (staying with the far and near labelling scheme using "a" and "b" to indicate surfaces near and far, respectively, as above). For instance, where the configuration surfaces are to be divided into six separate virtual work stations, each of the virtual stations would take up a slice of one sixth of the total emissive surface space. In this case, the arc length corresponding to one station 712a along the outer edge 760 would be substantially thirty two inches given the particularly advantageous dimensions described above. As another instance, where the configuration surfaces are to be divided into three separate equi-sized virtual work stations, each of the virtual stations would take up a slice of one third of the total emissive surface space. In this case, the arc length corresponding to one station 712a along the outer edge 760 would be substantially sixty-three inches given the particularly advantageous dimensions described above. Other work station divisions and dimensions are contemplated.

Because at least some portions of some of the emissive surfaces used by a person adjacent one side of configuration 700 will not be perpendicular to the line of sight of the person viewing from the one side, in at least some embodiments it is contemplated that the system processor or processors will be used to compensate for the skewed viewing angles by altering the images used to drive the surfaces so that, from the view of a person at the one side, the image appears to be viewed head on. In at least some cases images will be corrected assuming that a person at the first location is directly in front of a virtual station provided at the location. In this case left and right portions of images should be corrected in a similar but opposite fashion to provide an optimized view from the user's assumed location.

In other embodiments cameras or other sensors built into ridge or valley surfaces may track the location of a user's eyes relative to a virtual station and may adjust the appearance of content presented via one or both of the valley and ridge curved surfaces to compensate for non-perpendicular viewing angles on portions of the emissive surfaces. Here, the automatic compensation would include hysteresis so that the system would only adjust compensation periodically to avoid a case where the image appearance is always changing to accommodate a user that is routinely moving about at a station.

Although not shown in detail, it is contemplated that many of the interface and control features described above may be used to control and share information about configuration 700. Here, however, aspects of many of the features would be modified so that they are consistent with the shape of configuration 700. For instance, sharing hand icons akin to icons 110, 112, 114 and 116 in FIG. 15 may be provided at each virtual station (e.g., 712a) generated by configuration 700 where the hands are directed toward other stations about configuration 700.

In other embodiments, referring to FIG. 46, a circular thumbnail image 790 having the appearance of a top plan view of configuration 700 may be provided at each virtual station where the thumbnail 790 includes selectable virtual station icons 792, 794 corresponding to virtual stations created about configuration 700. Here, the juxtapositions of icons 792, 794, etc., on thumbnail 790 would change as virtual stations are created and moved so that a user would always have a current thumbnail image that represents virtual stations and the locations of those stations currently presented by configuration 700. In this regard, when a system processor generated a new virtual station, a new icon (e.g., 792) corresponding to the new station would be provided on thumbnail 790. If a user moves about configuration 700 to a new location, the users virtual station may be moved along with the user and the thumbnail 790 would be updated to reflect the new location of the moved user and associated work station.

In at least some embodiments it is contemplated that the teacup shape of configuration 700 in FIGS. 42 through 45 may be used to enhance various interfaces. For instance, in at least some cases it is contemplates that a user may send information about configuration emissive surfaces during sharing by simply gesturing on one of surfaced 714 or 716 left or right via a swiping action to cause information to be shared to rotate around the valley surface 718 into sharing positions viewable at each virtual station that exists about configuration 700. In another instance, a user may retract shared information via a surface gesture either in the opposite direction or via a gesture whereby two points on one of surfaces 714 and 716 are moved together in a pinching action. For instance, the pinching action may be via two fingers on a single hand or via movement of two fingers from both of a users hands toward each other.

As one other instance, when a first user at a first location about configuration 700 selects content to share, an indicator may be presented at the top edge of ridge surface 716 in front of the first user. The first user may be able to gesture on the indicator either left or right to cause the indicator to rotate about the circular top edge 750. The speed with which the user gestures may affect the speed with which the indicator rotates as well as how far the indicator moves around edge 750. When the indicator stops at a second virtual station at a second location about configuration 700, if the second station is a target station, the first user may select a share icon (see again 197 in FIG. 15) to share the selected content. If the second station is not the intended target, the first user may again gesture on top edge 750 to cause the indicator to move to a different virtual station. Other gestures are contemplated.

In at least some embodiments it is contemplated that configuration 700 may be formed of several different subassemblies that can be cobbled together to provide configurations that have different heights for different uses. For instance, in FIG. 43 configuration 700 includes an emissive surface subassembly 800 and a base subassembly 802. Referring also to FIGS. 45, 52 and 53, surface subassembly 800 includes a support structure for the emissive surfaces described above.

Referring to FIGS. 47 and 48, base subassembly 802 provides support for surface subassembly 800 as well as, in at least some embodiments, some power and data connectivity. More specifically, base subassembly 802 includes a truncated conical foot member 810 at a bottom end and a wall member 812 that extends upward from foot member 810 to a top edge 814. A mechanical coupler in the form of a circular rib 816 is provided at top edge 814. As seen in FIG. 45, at a bottom edge 818 surface subassembly 800 forms a circular recess or channel 820 that is designed to receive rib 816 and align subassemblies 800 and 802 during assembly. As see in FIG. 48, power and/or data cords 820 run through subassembly 802 and include couplers 822 at top edge 814 for linking to couplers 824 in channel 820. In at least some embodiments the couplers 822 and 824 may be positioned to automatically align and link when subassembly 800 is mechanically coupled to subassembly 802. In other embodiments there may be restrictions on how subassembly 800 mounts to subassembly 802 so that coupling between couplers 822 and 824 is automatic.

Referring to FIG. 50, in at least some cases the base subassembly 802 of FIG. 42 may be replaced by a second base assembly 840 to configure a lower version configuration 700a. In this regard, base subassembly 840 is similar to base subassembly 802, the main difference being that subassembly 840 has a lower height dimension than subassembly 802 so that the overall height of configuration 700a is lower than the height dimension of configuration 700. For instance, in at least some embodiments the height of subassembly 802 may be twenty-four inches while the height of subassembly 840 may be fourteen inches so that the overall height of configuration 700a is 34 inches. The lower height dimensions associated with subassembly 840a may render configuration 700a suitable for use at a sitting height for persons in task seating units (not illustrated).

Referring to FIG. 51, yet another base subassembly 850 may be provided that can be swapped for subassembly 802 to yield a configuration 700b that is suitable for use in a relatively low lounge configuration. In this regard, the height of subassembly 850 may be substantially 2 inches so that the overall height of configuration 700b is substantially 24 inches. By providing swappable base subassemblies, one type of emissive surface subassembly 800 may be used with different bases to provide several different height configurations thereby reducing overall manufacturing costs by reducing the number of different types of emissive surface assemblies required.

While the modular aspect of an emissive shape configuration has been described above in the context of the teacup configuration of FIGS. 42-53, it should be appreciated that the modular aspect may also be applied to other configurations described above. For instance, referring again to FIG. 12, totem 22a may include a valley emissive surface 18a that stops at plane 870 and the portion of totem 22a above plane 870 may comprise an emissive subassembly akin to subassembly 800 described above while the portion of totem 22a below plane 870 may comprise a base subassembly that could be swapped with other shorter or taller base subassemblies to provide totem structures having different heights for different application.

In at least some embodiments other configurations may provide plain, ridge and valley emissive surfaces for individual and sharing or collaborative activities. For instance, referring to FIG. 54, one additional configuration 900 is illustrated that includes an emissive surface structure 902 supported by a support structure 904. Surface structure 902 forms a first horizontal emissive surface 914a, a first ridge or near emissive surface 916a, a first valley or far emissive surface 918a, a second horizontal emissive surface 914b, a second near or ridge emissive surface 916b and a second valley or far emissive surface 918b where the surfaces have juxtapositions similar to the juxtapositions described above with respect to configuration 10 in FIG. 1. The main differences between the configurations 10 and 900 is that a single structure 902 forms all of the emissive surfaces in configuration 900 and the valley surfaces 918a and 918b are not as deep as surfaces 18a and 18b in FIG. 1.

Referring now to FIG. 55, one additional configuration 930 is shown that includes a configuration 10 akin to configuration 10 described above with respect to FIG. 1 as well as two additional large flat panel emissive surfaces 932 and 934 arranged to face the ridge surfaces 16a and 16b, respectively. Surfaces 932 and 934 are spaced from totems 22a and 22b to provide user spaces between totems 22a and 22b and the emissive surfaces 932 and 934. Here, a user may be able to use one of the surfaces 932 or 934 that faces the user as an additional surface for individual activities. For instance a user using a station adjacent totem 22a may use a portion of horizontal surface 14a, a portion of ridge surface 16a, a portion of valley surface 18b and a portion of surface 134 to perform individual activities in different planes at different distances from the user. In addition, a user may also use one or both or portions of surfaces 132 and 134 to share content with others at configuration 10. For instance, a user adjacent totem 22a may place content on surface 932 to share with a second user located adjacent totem 22b. Sharing via surfaces 132 and 134 may be in addition to or instead of sharing via other configuration 10 surfaces.

Interface tools similar to the tools described above may be provided virtually for each station created at configuration 10 that make sharing extremely intuitive so that users can simply walk up to configuration 930 and use configuration features. By sharing and collaborating with surfaces in front of and behind other users a true feeling of being immersed in the information being shared occurs. Because surfaces 132 and 134 are set back and are on the horizon of user's views, surfaces 132 and 134 are referred to generally as first and second horizon emissive surfaces, respectively in keeping with their relative juxtapositions to the plain, ridge and valley surfaces.

Referring to FIG. 56, another configuration 950 that is consistent with at least some aspects of the present invention includes an emissive surface subassembly 952 and first and second large horizon emissive surfaces 954 and 956, respectively. Here, subassembly 952 includes a support structure 958 that supports an integrated and integral single emissive surface 960 that forms first and second horizontal emissive surfaces 964a and 964b as well as first and second ridge surfaces 966a and 966b, respectively. The main different between configuration 10 in FIG. 1 and subassembly 952 in FIG. 56 is that subassembly 952 does not include valley surfaces like surfaces 18a and 18b and instead the top edges of ridge surfaces 966a and 966b are connected by a curved emissive surface section 967. Surfaces 964a and 964b are substantially horizontal and ridge surfaces 966a and 966b angle rearward from bottom edges to top edges to face at least somewhat upward for viewing by users on opposite sides of subassembly 952. Surfaces 954 and 956 are spaced away from opposite sides of subassembly 952 to form user spaces between surfaces 954 and 956 and subassembly 952. Here, a user of a station created or generated by configuration 950 may use any surfaces or portions of surfaces facing the user to perform individual activities. For instance, a user to the left of subassembly 952 in FIG. 56 as illustrated may use portions of surfaces 964a, 966a and 956 to perform individual activities. In addition, users of generated stations may use any of the emissive surfaces to share content. For instance, in some embodiments a user left of subassembly 952 may use portions of surfaces 954 and 956 to share with other users adjacent subassembly 952.

Referring still to FIG. 56, in some embodiments subassembly 952 may include an emissive top subassembly 970 and a swappable base subassembly 972 akin to the emissive top and swappable base described above with respect to FIGS. 42 through 53. In this regard see exemplary configuration 950a in FIG. 57' where a relatively short swapped base subassembly 974 is shown with top subassembly 970 mounted thereto to accommodate seated users. Other height swappable base subassemblies are contemplated.

Referring again to FIG. 2, in at least some embodiments it is contemplated that at least a subset of the physical dimensions of the emissive surfaces may be changed by a station user to accommodate immediate user preferences. For instance, when a station user intends to perform individual tasks, an optimized station configuration may include a ridge 16 that is higher than an optimal ridge height during sharing activities. For example, while ridge 16 is approximately eight inches high when content is shared within sharing space 20, an optimal ridge height during individual activities may be twenty inches high which provides a larger near emissive surface as well as additional privacy from others on an opposite side of configuration 10. As another instance, a station user may want to alter the angle that a ridge surface 16a makes with an adjacent horizontal emissive surface 14a to better suit the particular user's viewing angle with respect to the ridge surface 16a. As still one other instance, a user may want to raise the height of the valley emissive surface (e.g., 18b) facing the user during individual activities.

Various assemblies may be configured to provide different adjusting functionality. For instance, in at least some embodiments it is contemplated that at least portions of some emissive surfaces may be flexible and therefore that their shapes may be modified in one or both dimensions. For example, see FIG. 58 where a totem 1022a includes a support structure 1030, a sliding ridge member 1026 and an emissive surface forming subassembly 1000. Support structure 1030 is a rigid configuration that supports ridge member 1026 and surface forming subassembly 1000. In the exemplary embodiment support structure 1030 directly supports portions of subassembly 1000 while other portions of subassembly 1000 are supported by ridge member 1026. Support member 1030 includes a horizontal shoulder member 1036 that extends to one side and that supports a horizontal emissive surface portion 1014 of subassembly 1000. Support member 1030 forms an upward opening slot 1002 near a rear edge of shoulder member 1036. Guide tracks or rails 1004 are provided within slot 1002 for guiding and supporting ridge member 1026 during movement. A second set of guide tracks or rails 1040 are mounted to a rear side of support structure 1030.

Ridge member 1026 forms a lower end 1006 that is receivable within slot 1002 and includes an upwardly extending top end 1008. Between lower and top ends 1006 and 1008 ridge member forms a substantially flat forward facing support surface 1028 and at top end 1008 ridge member 1026 forms a curved support surface 1032. The support surfaces 1028 and 1032 guide and support an underside of surface forming subassembly 1000. Ridge member 1026 may include a carriage or the like that is designed to couple for sliding motion to rails 1004 within slot 1002.

Referring also to FIG. 59, a motor 1010 is supported by support structure 1030 adjacent slot 1006. Motor 1010 is provided to drive ridge member 1026 upward and downward between an extended or raised position (see FIG. 59) and a retracted or lowered position (see FIG. 58). To this end, motor 1010 may, for instance, be coupled to a threaded shaft 1012 that rotates as a motor rotor turns. A nut 1022 mounted to rigid member 1026 may be fitted onto threaded shaft 1012 and move up and down as the shaft is rotated. Although not shown, motor 1010 may be linked to a totem processor to receive control signals therefrom via a virtual interface tool that is provided on one of the emissive surfaces 1014 or 1017.

Referring still to FIGS. 58 and 59, emissive surface forming subassembly 1000 includes components that provide an integral emissive surface that has the appearance of a single emissive structure having different portions in different planes. Generally consistent with several of the embodiments described above, subassembly 1000 includes horizontal emissive surface or portion 1014, a ridge emissive surface or portion 1016 and a valley emissive surface or portion 1018.

In at least some embodiments ridge member 1026 is moveable up and down to change a height dimension of ridge emissive surface 1016. To enable the height dimension and hence the overall area of the ridge emissive surface 1016 to be changed, the portion of subassembly 1000 adjacent the top end of ridge member 1026 is flexible or rollable so that any part of the flexible portion can be either flat or curved around the top end 1008 of ridge member 1026. In addition, in the illustrated embodiment at least the lower portion of valley emissive surface 1018 is mounted to a carriage 1042 which is in turn mounted on rails 1040 for sliding motion up and down along the rear surface of support structure 1030.

Referring to FIG. 58, ridge member 1026 and subassembly 1000 are shown in a lowered or retracted state where ridge surface 1016 has a relatively low height (e.g., 8 inches above horizontal surface 1014). In this state, the flexible portion of subassembly 1000 would start just below top end

1008 of ridge member 1026, extend over top end 1008 and extend down the rear side of support structure 1030 to form an emissive surface portion over end 1008 as well as a top portion of valley emissive surface 1018. The state in FIG. 58 may be optimal for content sharing within a sharing space 1020 between totems 1022*a* and 1022*b*.

Referring still to FIG. 58 and also to FIG. 59, to increase the height or ridge surface 1016, motor 1010 rotates threaded shaft 1012 which causes ridge member 1026 to move upward along rails 1004. As ridge member 1026 moves up, top end 1008 pushes upward on the undersurface of the flexible portion of subassembly 1000 which in turn pulls upward on valley surface 1018. The flexible portion of subassembly 1000 moves upward and over top end 1008 to provide more emissive surface area at the top of ridge surface 1016. After ridge member 1026 is raised, ridge surface 1016 may have a height dimension anywhere within a range or fifteen to twenty-four inches, depending on configuration design. Again, the greater height and larger ridge surface 1016 provides additional near surface area for individual activities as well as additional privacy from others working across from a totem user.

Referring still to FIG. 59, in at least some embodiments valley surface 1018 will extend down the rear portion of support structure 1030 to a level such that even when ridge member 1026 is in the extended position, the lower edge of surface 1018 is at a level that still allows a user at a totem 1022*b* across from surface 1018 to use surface 1018 as a far valley surface for individual activities. Thus, different users across from each other at a single configuration, in at least some embodiments, can configure surfaces for individual activities the way they prefer irrespective of how others choose to configure the surfaces they control.

Other assemblies that facilitate ridge surface height and area changes are contemplated. For instance, referring again to FIG. 58, integrated emissive surface subassembly 1000 may be replaced by a dual surface assembly including a stationary valley surface 1018 and an integrated horizontal and ridge surface subassembly where the integrated subassembly includes a flexible portion adjacent top end 1008 where a rear edge thereof rolls into a stored state at top end 1008 when ridge member 1026 is in the lowered or retracted position (see FIG. 58) and unrolls to provide additional ridge surface area when ridge member 1026 is raised to the extended position (see FIG. 59).

As another instance, see FIG. 60 where another configuration 1058 includes first and second totem assemblies 1052*a* and 1052*b* that can be used to adjust the heights of the top edges of a ridge surfaces as well as the ridge surface areas. Each of the totems 1052*a* and 1052*b* have similar constructions and therefore only totem 1052*a* will be described here in any detail. Totem 1052*a* includes a support structure 1060 and a slidable ridge member 1062 mounted thereto for sliding between a lower or retracted position (see totem 1052*b*) and an upper or extended position (see totem 1052*a*). Although not illustrated in FIG. 60, totem 1052*a* may also support rails for guiding and facilitating sliding of ridge member 1062 and ridge member 1062 may be mounted to a carriage that is in turn mounted to the support rails to facilitate movement. Totem 1052*a* supports a motor 1070 for moving ridge member 1062 up and down where the motor may drive a threaded shaft coupled to a ridge member nut as described above to facilitate the sliding action. Support structure 1060 forms an internal cavity 1080 that is aligned with a bottom edge of a ridge emissive surface 1076.

Referring still to FIG. 60, in addition to ridge emissive surface 1076, totem 1052*a* includes a stationary horizontal emissive surface 1074 and a valley emissive surface 1078. Ridge and valley emissive surfaces 1076 and 1078 are mounted to opposite sides of ridge member 1062 and angle toward each other from bottom edges to top edges so that each surface 1076 and 1078 faces at least somewhat upward for viewing by configuration users. As ridge member 1062 moves up and down, the bottom portion of ridge surface 1076 moves out of and into cavity 1080 adjacent a rear edge of horizontal surface 1074. When ridge member 1062 and ridge surface 1076 move up, the height of the top edge of ridge surface 1076 is raised and the total surface area of ridge surface 1076 is increased. Thus, the FIG. 60 assembly can be constructed using LCD, LED, plasma or other flat emissive surface technology that is routinely employed to provide flat panel surfaces today.

In any of the embodiments where a ridge member can be raised to increase the height of a top edge of a ridge surface, the same configuration may be used by a configuration user facing a valley surface to raise the valley surface to a preferred height for individual activities. For instance, in FIG. 60, a configuration user adjacent totem 1052*b* and facing surface 1078 may be provided controls to raise ridge member 1062 and thereby raise valley surface 1078 to a preferred height for individual use. As another instance, in FIG. 59, a configuration user adjacent totem 1022*b* may raise ridge member 1026 to raise valley surface 1018 to a preferred height.

When surface dimensions are altered, in at least some embodiments, content that is presented on the surface may be automatically reformatted by a system processor to fit the new surface are in an optimized fashion. For instance, when a ridge surface area is doubled by raising a top edge thereof to a higher level in any of the ways described above, a totem processor may automatically identify the new surface area and reformat a user's content to best fit the new size. This feature would be accomplished in a manner similar to the way in which content within a Microsoft application window is automatically reformatted when the size of the window is changed. The process would include identifying a surface resize activity, identifying the new surface size, accessing a current content format file and optimized format rules, applying the format rules to the current content and surface size to identify a new content format, applying the new content format to the current content and then driving the emissive surface to present the content in the new format. In the above examples where sizes of ridge and valley surfaces are changing simultaneously, the reformatting algorithm would be performed simultaneously for each of the ridge and valley surfaces.

Assemblies similar to the assemblies described above for changing the height of the top edge of the ridge surfaces may be employed to change other physical totem characteristics. For instance, referring again to FIGS. 58 and 59, instead of providing a slidable ridge member 1026, totem 1022*b* includes a slidable horizontal support member 1090 that can be slid horizontally between retracted (see FIG. 58) and extended (see FIG. 59) positions to change a viewing angle a1 that ridge surface 1092 makes with adjacent horizontal surface 1094. Here, in at least some embodiments, emissive surface forming subassembly 1102 may include flexible portions 1096 and 1098 where valley surface 1106 and ridge surface 1092 meet and where ridge surface 1092 and horizontal surface 1094 meet so that the emissive surface formed by subassembly 1102 appears to be a continuous surface. In other embodiments ridge surface 1092 may simply pivot about top and bottom edges as the viewing angle a1 thereof is modified.

Although all of the components are not shown in FIG. 59, totem 1022b may include rails and a carriage for supporting horizontal member 1090 for sliding motion between the extended and retracted positions as well as a threaded shaft and nut linked to a motor 1100 to motivate member 1090 in a manner similar to that described above with respect to totem 1022a. As member 1090 moves, the angle a1 of ridge surface 1092 is altered. The range of angle a1 may be between 90 and 110 degrees in at least some embodiments.

Referring now to FIG. 61, another configuration 1150 is illustrated that includes four totems 22a through 22d that are akin to the totems used to configure configuration 10 shown in FIG. 1. In FIG. 62, the totems are arranged on four sides of a sharing space 1152 so that valley surfaces of totems 22a and 22c face each other and valley surfaces of totems 22b and 22d face each other. Configuration 1150 does not include intermediate table top members between adjacent totems and instead is open between the totems. Here, it should be appreciated that each totem 22a, 22b, etc., may be portable or at least moveable within a large space to position the totems relative to each other in different useful configurations. In this regard, see that exemplary totem 22a includes casters or wheels 1160 below a supporting foot member 1164 so that totem 1150 can be ported to different locations for use.

In at least some embodiments it is contemplates that when a totem (e.g., 22a) is moved to a location within a conference, facility or enterprise space, totem location and orientation (e.g., N, S, E or W) may be identified via triangulation using wireless access points within the space, via cameras within the space or using some other sensing technology. Once totem location and orientation are identified within a space, a system processor may be programmed to recognize other totems or emissive surfaces (e.g., a wall mounted vertical and large emissive surface) that are proximate the totem and the orientations of other emissive surfaces to the located and oriented totem. Thereafter, when a user causes the system to present content to the user via the totem, the system may automatically default to an emissive surface subset that is optimized for individual use. For instance, referring again to FIG. 61 where totem 22a is located across from totem 22c, if a first user logs on to the system using totem 22a, the system may automatically recognize the relative juxtapositions of totem 22a and valley surface 18c of totem 22c and provide a work station for the first user including horizontal surface 14a, ridge surface 16a and valley surface 18c.

In addition to assigning a default set of emissive surfaces to the first user at totem 22a, the system processors may also be programmed to provide sharing icons via virtual interfaces for sharing content with others at totems adjacent totem 22a. For instance, the system may also recognize that totems 22b and 22d are located to the right and left of totem 22a and provide sharing icons akin to icons 110 through 114 in FIG. 27 where the icons indicate directional sharing activities with open hands aligned with totems 22c, 22d and 22b, respectively. If relative positions of totems 22b through 22d were changed, the directions indicated by the hand icons would be changed accordingly. As above, each sharing icon may also include an identity of the user currently using each of the associated workstations to avoid confusion when sharing.

As another instance, referring to FIG. 62, if totem 22a is moved to a location in front of a large wall or wall mounted emissive surface 1200, the system may be programmed to recognize the relative positions of totem 22a and surface 1200 when a user logs on to the system using totem 22a.

Upon logging on, the system processor may assign a portion (e.g., the central one third) 1202 of surface 1200 adjacent totem 22a to the first user that logged on using totem 22a so that the user controls surfaces 14a, 16a and surface portion 1202.

In any case where a totem user is using a first emissive surface separate from the totem as a far surface for individual activities, if the user moves the totem to a different location away from the first surface and adjacent a second emissive surface that could be used as a far surface, the far surface content may be automatically provided via the second surface if the second surface is not being used by another system user. For instance, referring again to FIGS. 61 and 62, if a first user using totem 22a is initially presenting individual information via valley surface 18c and moves totem 22a to a new location adjacent wall surface 1200 as in FIG. 62, the user's valley surface content may be moved along with totem 22a from valley surface 18c to wall surface 1200 automatically.

In at least some embodiments, as described above, user content may automatically follow a user about within a conference, facility or enterprise space. For instance, assume a first user initially logs on to the system using totem 22a in FIG. 61 within a conference space and that the space is equipped with a series of cameras that can be used to identify the locations of persons within the space relative to artifacts including emissive surfaces. In this case, as described above, when the first user leaves totem 22a and moves to a different totem 22c, the system may automatically recognize the first user's new position via tracking of the user's movement and may move or represent the first user's content via totem 22c.

Similarly, if the first user moves to any other emissive surface configuration capable of providing a work station, the system may be programmed to recognize the user's position and recreate the user's station using the other configuration. For instance, while the stations surfaces provided via facing totems 18a and 18c are optimized for some uses, a differently formatted station with similar content may be provided via a vertical, large and planar emissive wall surface like surface 1200 in FIG. 62. Thus, for instance, if the first user initially using totem 22a were to move to a location adjacent wall surface 1200 in FIG. 62, the system may use camera images to recognize the new location adjacent surface 1200, may remove the user's content from station 22a, may reformat the user's content to be optimized for presentation via surface 1200 and may provide the user with a virtual work station on surface 1200 that includes the optimized reformatted first user content. The reformatting may combine content from ridge surface 16a and valley surface 18c as well as some of the content on horizontal surface 124a in FIG. 61 and also eliminate some of the interface tools that are not needed on the wall surface 1200.

Referring to FIG. 63, an emissive wall 1250 that is consistent with at least some aspects of the present invention is illustrated. Wall 1250 forms an emissive wall surface 1252 using any display technology known in the art including but not limited to LCD, LED, OLED, plasma, etc. Surface 1252 may comprise an entire wall of a conference room or space and may be able to simultaneously provide a plurality of virtual work stations at different locations along a width dimension W and at different heights along a height dimension H. For instance, a first user standing adjacent a right hand portion of surface 1252 may be provided with a virtual station at 1254 and a second user sitting adjacent a left hand portion of surface 1252 may be provided with a virtual station 1256 where station 1256 is lower than station 1254 so that stations 1256 and 1254 accommodate the sitting and standing users, respectively. As in the other embodiments described above, as a user moves along surface 1252 or changes between sitting and standing positions, the system may automatically or upon a user gesture move the user's virtual station along with the user to a different optimized position.

In order to sense user location and height relative to surface 1252, cameras may be mounted to or integrated within surface 1252. To this end, in FIG. 63, first and second camera regions 1260 and 1262 are labelled where each region includes a horizontal band of surface 1252 that extends across width W. It is contemplated that cameras will be provided along each of regions 1260 and 1262 to identify user at least locations and heights along width W and height H. For instance, a separate camera lens may open through surface 1252 every foot along width W within region 1260 so that a camera is generally aligned with any standing user adjacent surface 1252 irrespective of location along width W. Similarly, a separate camera lens may open through surface 1252 every foot along width W within region 1262 so that a camera is generally aligned with any sitting user adjacent surface 1252 irrespective of location along width W. in this case, a virtual station may be provided at any standing or sitting height along width W and be at an optimized location for a user.

In other embodiments the cameras may be further spaced apart in regions 1260 and 1262 and the processor may simply provide virtual stations that are aligned with cameras. For instance, where the spacing between adjacent cameras in region 1260 is one yard, when a user starts a log on process, the processor may present initial content and log on information at a location that is aligned with one of the cameras to gently coax the user to move into a camera aligned position.

In still other embodiments, the dual pixel concept described above with respect to U.S. Pat. No. 7,535,468 which is owned by Apple may be used to provide camera capabilities at any location along either of regions 1260 and 1262 so that camera aligned virtual stations can be provided at any location along with W for standing or sitting users. By providing camera capability only in regions 1260 and 1262 aligned with the heights at which most people work (e.g., sitting and standing), camera and user alignment for security purposes, video conferencing, etc., can be provided relatively inexpensively.

In other embodiments one or the other of regions 1260 or 1262 may not be provided in order to reduce costs further. In this regard, for instance, where a sitting height table is provided adjacent surface 1252 so that most use of surface 1252 will be at the sitting height, region 1260 may not be replaced by emissive surface.

Referring to FIG. 64, a table configuration 1300 that is consistent with at least some aspects of the present invention is illustrated. Configuration 1300 includes support structure in the form of first and second vertically upright leg members 1302, a horizontal table emissive surface structure 1314 and a ridge member 1316 that supports ridge emissive surfaces 1316a and 1316b. leg members 1302 are secured to an undersurface of emissive surface structure 1314 and support structure 1314 in a substantially horizontal orientation. Structure 1314 is generally rectangular in shape and forms a top emissive surface 1315. Ridge member 1316 extends upward along a central portion of top structure to generally bifurcate top structure 1314 along at least a central portion of its length. Opposite long sides of member 1316 support ridge emissive surfaces 1316a and 1316b that face generally away from each other and in opposite directions toward lateral edges of structure 1314. In at least some embodiments legs 1302 are relatively short so that table configuration 1300 is at a height suitable by users in a lounge positions. In this regard, in at least some embodiments the height of surface 1315 is approximately 16 inches. Particularly useful configuration dimensions in this case include ridge member 1316 having an eight inch height dimension and a 27 inch length dimension while surface 1315 has length and width dimensions of 51 and 29 inches, respectively.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. To apprise the public of the scope of this invention, the following claims are made:

What is claimed is:

1. A workstation assembly comprising:
   a support structure extending upward from and supported by an ambient floor surface;
   a substantially horizontal surface extending from a front edge to a rear edge and facing substantially upward;
   an emissive surface arrangement including first and second emissive surface portions, the first emissive surface portion having upper and lower edges and a first width dimension and the second emissive surface portion having upper and lower edges and a second width dimension;
   the support structure supporting the first emissive surface portion adjacent and extending upward from the rear edge of the horizontal surface to the upper edge of the first emissive surface with the first emissive surface facing a space that resides above the horizontal surface;
   the support structure supporting the second emissive surface portion on a side of the first emissive surface portion opposite the horizontal surface and spaced rearward of the first emissive surface portion with the lower edge of the second emissive surface portion below a height of the upper edge of the first emissive surface portion; and
   a processor driving the emissive surface arrangement to provide content to a workstation user located within a space adjacent the front edge of the horizontal surface via both the first and second emissive surface portions in a coordinated fashion.

2. The workstation assembly of claim 1 wherein the upper edge of the second emissive surface portion is at substantially the same height as the upper edge of the first emissive surface portion.

3. The workstation assembly of claim 2 wherein the lower edge of the second emissive surface portion extends to a height lower than the lower edge of the first emissive surface portion.

4. The workstation assembly of claim 3 wherein the second emissive surface portion is substantially vertical.

5. The workstation assembly of claim 3 wherein the first emissive surface portion angles rearward from its lower edge to its upper edge.

6. The workstation of claim 5 wherein the second emissive surface portion angles rearward from its lower edge to its upper edge.

7. The workstation assembly of claim 3 wherein the surface area of the first emissive surface portion is smaller than the surface area of the second emissive surface portion.

8. The workstation assembly of claim 3 wherein the horizontal surface has a width dimension between first and second lateral edges and wherein the first emissive surface portion has a width dimension between first and second lateral edges and wherein the width dimension of the first emissive surface portion is similar to the width dimension of the horizontal surface.

9. The workstation assembly of claim 8 wherein the second emissive surface portion has a width dimension between first and second lateral edges that is similar to the width dimension of the first emissive surface portion.

10. The workstation assembly of claim 1 further including a third emissive surface portion having upper and lower edges and supported by the support structure to generally face in a direction opposite the second emissive surface portion, the third emissive surface portion located between the first and second emissive surface portions.

11. The workstation assembly of claim 10 wherein a sharing space between the third emissive surface portion and the second emissive surface portion is between 18 and 30 inches.

12. The workstation assembly of claim 11 wherein the third emissive surface portion angles forward away from the second emissive surface portion from its bottom edge toward its upper edge and wherein the second emissive surface portion angles rearward from its lower edge to its upper edge away from the third emissive surface portion.

13. The workstation assembly of claim 10 wherein the upper edge of the third emissive surface portion is at the same height as the upper edge of the first emissive surface portion.

14. The workstation assembly of claim 13 wherein the upper edge of the second emissive surface portion is at the same height as the first emissive surface portion.

15. The workstation assembly of claim 14 wherein the lower edge of the third emissive surface portion is at the same height as the lower edge of the second emissive surface portion.

16. The workstation assembly of claim 15 wherein the lower edge of the second emissive surface portion is at a height that is lower than the lower edge of the first emissive surface portion.

17. The workstation assembly of claim 16 wherein the upper edge of the first emissive surface portion is at a height between 40 and 55 inches.

18. The workstation assembly of claim 1 wherein the horizontal surface is an emissive surface.

19. The workstation assembly of claim 18 wherein the horizontal surface and the first emissive surface portion form a contiguous emissive surface.

20. A workstation assembly comprising:
a support structure extending upward from and supported by an ambient floor surface;
a substantially horizontal worksurface supported by the support structure, the horizontal worksurface extending from a front edge to a rear edge and between first and second lateral edges;
an emissive surface arrangement including first and second emissive surface portions, the first emissive surface portion having upper and lower edges and a first width dimension and the second emissive surface portion having upper and lower edges and a second width dimension;
the support structure supporting the first emissive surface portion adjacent and extending upward from the rear edge of the horizontal surface to the upper edge of the first emissive surface with the first emissive surface facing a space that resides above the horizontal surface;
the support structure supporting the second emissive surface portion on a side of the first emissive surface portion opposite the horizontal surface and spaced rearward of the first emissive surface portion to form a sharing space between the first and second emissive surface portions, the upper edge of the second emissive surface portion at a height that is substantially similar to a height of the upper edge of the first emissive surface portion and the lower edge of the second emissive surface portion at a height below a height of the horizontal surface; and
a processor driving the emissive surface arrangement to provide content to a workstation user via both the first and second emissive surface portions in a coordinated fashion.

21. A workstation assembly comprising:
a support structure extending upward from and supported by an ambient floor surface, an upper end of the support structure forming a ridge extending upward from a lower end to an upper end where the upper end is at a first height;
a substantially horizontal worksurface supported by the support structure at a second height that is below the first height, the horizontal worksurface extending from a front edge to a rear edge where the rear edge is adjacent the lower end of the ridge;
an emissive surface arrangement including a first emissive surface portion having upper and lower edges;
the support structure supporting the first emissive surface portion at a location spaced from ridge on a side opposite the horizontal member to form a sharing space between the ridge and the first emissive surface portion, the upper edge of the first emissive surface portion at a height that is substantially similar to a height of the upper end of the ridge; and
a processor driving the emissive surface arrangement to provide content to a workstation user via the first emissive surface portion.

* * * * *